(12) United States Patent
Arimura et al.

(10) Patent No.: US 6,828,030 B2
(45) Date of Patent: Dec. 7, 2004

(54) (POLY)OXYALKYLENE BLOCK SILYL ESTER COPOLYMER, ANTIFOULING COATING COMPOSITION, ANTIFOULING COATING FORMED FROM ANTIFOULING COATING COMPOSITION, ANTIFOULING METHOD USING ANTIFOULING COATING COMPOSITION AND HULL OR UNDERWATER STRUCTURE COVERED WITH ANTIFOULING COATING

(75) Inventors: Hidetaka Arimura, Ohtake (JP); Satoshi Hiyoshi, Ohtake (JP); Naoya Nakamura, Ohtake (JP); Makoto Tsuboi, Ohtake (JP)

(73) Assignee: Chugoku Marine Paints, Ltd., Hiroshima (JP)

( * ) Notice: Subject to any disclaimer, the term of this patent is extended or adjusted under 35 U.S.C. 154(b) by 284 days.

(21) Appl. No.: 09/983,181

(22) Filed: Oct. 23, 2001

(65) Prior Publication Data

US 2002/0156224 A1 Oct. 24, 2002

(30) Foreign Application Priority Data

Oct. 25, 2000 (JP) .......................... 2000-325525
Oct. 25, 2000 (JP) .......................... 2000-325526

(51) Int. Cl.$^7$ .......................... B32B 25/20; A61K 31/74; C08G 77/42
(52) U.S. Cl. .................. 428/447; 427/387; 106/287.1; 524/432; 524/588; 525/474; 525/926; 528/25; 528/26; 528/29; 528/35; 424/78.09
(58) Field of Search ................. 524/432, 588; 528/25, 26, 29, 35; 424/78.09; 525/474, 926; 106/287.1; 428/447; 427/387

(56) References Cited

U.S. PATENT DOCUMENTS

| | | | |
|---|---|---|---|
| 4,593,055 A | | 6/1986 | Gitlitz |
| 4,652,610 A | * | 3/1987 | Dowbenko et al. ......... 525/100 |
| 4,675,365 A | * | 6/1987 | Inoue et al. ............... 525/408 |
| 4,957,989 A | * | 9/1990 | Saitoh ....................... 526/279 |
| 5,393,861 A | * | 2/1995 | Sakae et al. ................ 528/265 |
| 6,458,878 B1 | * | 10/2002 | Tsuboi et al. .............. 524/432 |

FOREIGN PATENT DOCUMENTS

| | | | |
|---|---|---|---|
| EP | 1-016681 A2 | 7/2000 | ........... C08F/30/08 |
| JP | 02-196869 | 8/1990 | |
| JP | 04-264168 | 9/1992 | |
| JP | 04-264169 | 9/1992 | |
| JP | 04-264170 | 9/1992 | |
| JP | 5-32433 | 5/1993 | |
| JP | 5-82865 | 11/1993 | |
| JP | 06-157940 | 6/1994 | |
| JP | 06-157941 | 6/1994 | |
| JP | 07-018216 | 1/1995 | |
| JP | 07-102193 | 4/1995 | |
| JP | 8-3484 | 1/1996 | ........... C09D/5/16 |
| JP | 08-199095 | 8/1996 | |
| JP | 08-269388 | 10/1996 | |
| JP | 08-269389 | 10/1996 | |
| JP | 08-269390 | 10/1996 | |
| JP | 08-277372 | 10/1996 | |
| JP | 09-048947 | 2/1997 | |
| JP | 09-048948 | 2/1997 | |
| JP | 09-048949 | 2/1997 | |
| JP | 09-048950 | 2/1997 | |
| JP | 09-048951 | 2/1997 | |
| JP | 10-030071 | 2/1998 | |
| JP | 63-215780 | 9/1998 | |
| WO | WO 84-02915 | 2/1984 | |
| WO | WO 91-14743 | 10/1991 | |
| WO | WO 96-03465 | 2/1996 | |

OTHER PUBLICATIONS

English Abstract—AntiFouling Coating Material JP 63–057675 Masaoka Shigeru Mar. 1988.

English Abstract–Antifouling Coating Material JP 63–057,675 Masaoka Shigeru Mar. 1988.

* cited by examiner

*Primary Examiner*—Jeffrey B. Robertson
(74) *Attorney, Agent, or Firm*—Sherman & Shalloway

(57) ABSTRACT

A (poly)oxyalkylene block silyl ester copolymer comprising silyl ester copolymer block units (A) and block units (B), the block units (a) comprising (a) component units derived from a polymerizable unsaturated carboxylic acid silyl ester, and (b) polymerizable unsaturated monomer units other than the component units (a), the block units (B) derived from particular mercapto compounds, and an antifouling paint comprising the (poly)oxyalkylene block silyl ester copolymer. The copolymer enables the formation of an antifouling coating film which exhibits less cracking tendency, excellent adherence, less peeling tendency and controlled hydrolysis rate resulting in excellent antifouling performance and properties.

67 Claims, 26 Drawing Sheets

(POLY)OXYALKYLENE BLOCK SILYL ESTER COPOLYMER, ANTIFOULING COATING COMPOSITION, ANTIFOULING COATING FORMED FROM ANTIFOULING COATING COMPOSITION, ANTIFOULING METHOD USING ANTIFOULING COATING COMPOSITION AND HULL OR UNDERWATER STRUCTURE COVERED WITH ANTIFOULING COATING

TECHNICAL FIELD

The present invention relates to a novel (poly)oxyalkylene block silyl ester copolymer. More particularly, the present invention is concerned with a (poly)oxyalkylene block silyl ester copolymer which, when used as a vehicle of coating composition or paint, enables forming a coating having excellent transparency and being excellent in foul removing performance, i.e., capability of easily removing foul from a coating surface.

BACKGROUND ART

Ship bottoms, underwater structures, fishing nets and the like are likely to have their appearance and function damaged by the adhesion to surface and propagation of various aquatic organisms including shellfishes such as oysters, hard-shelled mussels and barnacles, plants such as laver (seaweeds) and bacteria which is caused when they are exposed to water or seawater for a prolonged period of time.

In particular, when such an aquatic organism adheres to a ship's bottom and propagates, it may occur that the surface roughness of the ship's bottom is increased to thereby lower the speed of the ship and increase the fuel consumed by the ship. Removing the aquatic organism from the ship bottom takes thousands of man-hours, so that many labors and much time are needed for this work. Also, when bacteria adhere to, for example, an underwater structure and propagate and, further, slime (sludgy matter) adheres thereto to cause putrefaction, or when a large sticky organism adheres to the surface of an underwater structure of, for example, steel and propagates to thereby damage the coating for corrosion prevention provided on the underwater structure, there is the danger that damages such as deterioration of the strength and function of the underwater structure and thus marked shortening of the life thereof are invited.

In order to avoid the above damages, for example, an antifouling paint containing a copolymer of tributyltin methacrylate and methyl methacrylate or the like and cuprous oxide ($Cu_2O$) has been applied to ship bottoms, etc. This copolymer of the antifouling paint is hydrolyzed in the seawater to thereby liberate organotin compounds such as bistributyltin oxide (tributyltin ether of the formula $Bu_3Sn$—O—$SnBu_3$ wherein Bu is a butyl group) and tributyltin halides ($Bu_3SnX$ wherein X is a halogen atom), so that an antifouling effect is exerted. Furthermore, the copolymer hydrolyzate per se has water-solubility and thus is dissolved in the seawater, as a result, no residue of hydrolyzate is left on the surface of the ship bottom coating, and then the new paint film surface in which the copolymer is not hydrolyzed is exposed to maintain the antifouling effect for long. The antifouling paint having such a performance is called as "hydrolyzable self-polishing paint".

However, the above organotin compounds are so highly toxic that apprehensions are being entertained with respect to marine pollution, occurrence of anomalous fish and anomalous shellfish and adverse effects on ecosystem through food chain. Therefore, the development of a nonstannic antifouling paint having excellent antifouling properties is desired as a substitute therefor.

For example, antifouling paints based on silyl esters as described in Japanese Patent Laid-open Publication Nos. 4(1992)-264170 (reference (1)), 4(1992)-264169 (reference (2)) and 4(1992)-264168 (reference (3)) can be mentioned as the above nonstannic antifouling paint. However, these antifouling paints have problems that not only are their antifouling capabilities poor but also cracking and peeling are likely to occur as pointed out in Japanese Patent Laid-open Publication Nos. 6(1994)-157941 (reference (4)) and 6(1994)-157940 (reference (5))

Further, Japanese Patent Laid-open Publication No. 2(1990)-196869 (reference (6)) teaches an antifouling paint comprising a blocked acid-functionality copolymer (A) which is obtained by copolymerizing trimethylsilyl methacrylate, ethyl methacrylate and methoxyethyl acrylate in the presence of an azo initiator and which contains carboxyl groups blocked with trimethylsilyl groups and a polycationic compound (B). However, the coating film obtained from the antifouling paint has a drawback in that the cracking resistance thereof is not fully satisfactory.

Published Japanese Translation of PCT Patent Applications from Other States, No. 60(1985)-500452 (reference (7)) and Japanese Patent Laid-open Publication No. 63(1988)-215780 describe a resin for antifouling paint which is obtained by copolymerizing a vinyl monomer having an organosilyl group, such as a trialkylsilyl ester of (meth)acrylic acid, with another vinyl monomer and which has a number average molecular weight of 3000 to 40,000. It is further described that the resin can be blended with an organic water binder such as trimethyl orthoformate, an antifouling agent such as cuprous oxide and a pigment such as red iron oxide. However, as described in the above Japanese Patent Laid-open Publication No. 6(1994)-157940 (reference (5)), this resin for antifouling paint has drawbacks in that it is likely to gelate during the storage thereof and that the coating film formed from the antifouling paint is poor in cracking and peeling resistances.

Japanese Patent Publication No. 5(1993)-32433 corresponding to the above Published Japanese Translation of PCT Patent Applications from Other States, No. 60(1985)-500452 (reference (7)) discloses an antifouling paint comprising a poison (a) and a polymer binder (b) having a repeating unit of the formula (—$CH_2$—CX(COOR)—(B)— wherein X is H or $CH_3$, R is $SiR'_3$ or $Si(OR')_3$ in which R' is an alkyl group, etc. and B is an ethylenically unsaturated monomer residue), which polymer binder has a specified hydrolysis rate. Further, it is described that the antifouling paint can contain a solvent, a water-sensitive pigment component, an inert pigment, a filler and a retarder. However, the coating film obtained from the antifouling paint described in the publication has a drawback in that its cracking resistance is poor.

Japanese Patent Laid-open Publication No. 7(1995)-18216 (reference (8)) discloses a coating composition comprising as principal components a polymer (A) from an organosilicon-containing monomer A having in its molecule a triorganosilicon ester group represented by the formula —COO—$SiR^1R^2R^3$ (wherein each of $R^1$, $R^2$ and $R^3$ is, for example, an alkyl group having 1 to 18 carbon atoms) and copper or a copper compound (B), which coating composition contains as an essential component other than the components (A) and (B) a silicon compound having an alkoxy group (C) represented by the formula:

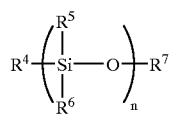

wherein each of $R^4$, $R^5$ and $R^6$ represents, for example, a hydrogen atom, or an alkoxy group or cycloalkoxy group having 1 to 18 carbon atoms; $R^7$ represents, for example, an alkyl group having 1 to 18 carbon atoms; and n is an integer of 1 to 3. In the publication, it is described that a copolymer AB obtained by copolymerizing the above organosilicon-containing monomer A and a vinyl monomer copolymerizable therewith B may be contained in the coating composition. As the monomer B, there are mentioned (meth)acrylic esters such as methyl (meth)acrylate, ethyl (meth)acrylate and dimethylaminoethyl (meth)acrylate.

However, the coating film obtained from the coating composition described in the publication has a drawback in that it is inferior in cracking resistance and antifouling properties, in particular, antifouling properties in highly fouling environment. The expression "in highly fouling environment" used herein means such situations that a ship or an underwater structure is allowed to stand still in a nutrious sea area such as an inland sea or other like sea area, or, with respect to a ship, service and anchorage are repeated frequently or navigation is conducted at a speed as low as about 10 knots or less.

Japanese Patent Laid-open Publication No. 7(1995)-102193 (reference (9)) discloses a coating composition comprising as essential components an antifouling agent and a copolymer obtained from a monomer mixture containing monomer A represented by the formula $X—SiR^1R^2R^3$ (wherein $R^1$, $R^2$ and $R^3$ all represent a group selected from among alkyl and aryl groups and may be identical with or different from each other, and X represents an acryloyloxy, a methacryloyloxy, a maleinoyloxy or a fumaroyloxy group), and monomer B represented by the formula $Y—(CH_2CH_2O)n—R^4$ (wherein $R^4$ represents an alkyl or an aryl group, Y represents an acryloyloxy or a methacryloyloxy group, and n is an integer of 1 to 25). As the antifouling agent, there are mentioned inorganic compounds such as cuprous oxide, copper powder and other copper compounds, zinc sulfate and zinc oxide, and further mentioned organometallic compounds such as oxine copper and other organocopper compounds, organonickel compounds, and zinc pyrithione and other organozinc compounds. However, there is no suggestion on a polymer having a (poly)oxyalkylene block structure and containing an organosilyl ester group in the publication, and, further, the paint described in the publication has a problem of being inferior in antifouling properties, in particular, antifouling properties in highly fouling environment.

Japanese Patent Laid-open Publication No. 8(1996)-199095 (reference (10)) discloses a coating composition comprising as essential components an antifouling agent and a copolymer obtained from a monomer mixture containing the above monomer A represented by the formula $X—SiR^1R^2R^3$ described in Japanese Patent Laid-open Publication No. 7(1995)-102193 and monomer B represented by the formula $Y—(CH(R^4))—(OR^5)$ (wherein $R^4$ represents an alkyl group; $R^5$ represents an alkyl or a cycloalkyl group; and Y represents an acryloyloxy, a methacryloyloxy, a maleinoyloxy or a fumaroyloxy group), optionally together with a vinyl monomer C copolymerizable with the monomers A and B. As the vinyl monomer C, there are mentioned, for example, acrylic esters, methacrylic esters, styrene and vinyl acetate. Moreover, as the antifouling agent, there are mentioned inorganic compounds such as cuprous oxide, copper powder and other copper compounds, zinc sulfate and zinc oxide, and further mentioned organometallic compounds such as oxine copper and other organocopper compounds, organonickel compounds, and zinc pyrithione and other organozinc compounds.

Japanese Patent Laid-open Publication No. 8(1996)-269388 (reference (11)) discloses a coating composition comprising, as essential components, bis(2-pyridinethiol-1-oxide) copper salt (copper pyrithione) and a copolymer obtained from a monomer mixture containing monomer A represented by the formula $X—SiR^1R^2R^3$ (wherein $R^1$, $R^2$ and $R^3$ all represent a hydrocarbon group having 1 to 20 carbon atoms and may be identical with or different from each other, and X represents an acryloyloxy, a methacryloyloxy, a maleinoyloxy, a fumaroyloxy or an itaconoyloxy group), and monomer B represented by the formula $Y—(CH_2CH_2O)n—R^4$ (wherein $R^4$ represents an alkyl or an aryl group; Y represents an acryloyloxy, a methacryloyloxy, a maleinoyloxy, a fumaroyloxy or an itaconoyloxy group; and n is an integer of 1 to 25). For example, dimethyl-t-butylsilyl acrylate is mentioned as the monomer A. As the antifouling agent, there are mentioned inorganic compounds such as cuprous oxide, copper powder and other copper compounds, zinc sulfate and zinc oxide, and further mentioned organometallic compounds such as oxine copper and other organocopper compounds, organonickel compounds, and zinc pyrithione and other organozinc compounds. Furthermore, for example, rosin and rosin derivatives are mentioned as a leaching rate regulator which can be added to the coating composition.

Japanese Patent Laid-open Publication No. 8(1996)-269389 (reference (12)) discloses a coating composition comprising an antifouling agent and a copolymer copolymerized a monomer mixture containing an unsaturated monomer A having a triorganosilyl group and a monomer B represented by any of the following formulae.

The monomer B can be:

monomer having a tertiary amino group, represented by the formula $CH_2=CR^4COOR^5—NR^6R^7$ (wherein $R^4$ represents H or $CH_3$; R represents an alkylene group; and $R^6$ and $R^7$ represent alkyl groups and may be identical with or different from each other), monomer containing a quaternary ammonium salt, represented by the formula $CH_2=CR^8COOR^9—NR^{10}R^{11}R^{12}(Y)$ (wherein $R^8$ represents H or $CH_3$; $R^9$ represents an alkylene group; $R^{10}$ to $R^{12}$ represent alkyl groups and may be identical with or different from each other; and Y represents a halogen atom), monomer containing a nitrogenous heterocycle, represented by the formula $CH_2=CH—Z$ (wherein Z represents a group comprising a nitrogenous heterocycle), monomer having in its molecule an alkoxy group or an aryloxyalkylene glycol group, represented by the formula $CH_2=CR^{13}COO(R^{14}O)_m(R^{15}O)_n(R^{16}O)_o—R^{17}$ (wherein $R^{13}$ represents H or $CH_3$; $R^{14}$ represents an ethylene group; $R^{15}$ represents an alkylene group having 3 carbon atoms; $R^{16}$ represents an alkylene group having 4 carbon atoms; $R^{17}$ represents an alkyl group or aryl group; and each of m, n and o is an integer of 0 or greater, provided that n and o are not simultaneously 0), (meth)acrylamide represented by the formula $CH_2=CR^{18}CONR^{19}R^{20}$ (wherein $R^{18}$ represents H or CH$_3$; and R$^{19}$ and R$^{20}$ represent alkyl groups and may be identical with or different from each other), (meth)acrylamide having a nitrogenous cyclic hydrocarbon group, represented by the formula CH$^2$=CR$^{21}$CON( )Q (wherein R$^{21}$ represents H or CH$_3$; and N( )Q is a nitrogen-containing nitrogen group wherein, for example, O, N or S may be contained in Q), (meth)acrylic ester containing a furan ring, represented by the formula CH$_2$=CR$^{23}$COOCH$_2$—T (wherein R$^{23}$ represents H or CH$_3$; and T represents a furan ring or a tetrahydrofuran ring), or

CH$_2$=CH—CN.

Further, as an optional component copolymerizable with the above monomers A and B, there are mentioned various copolymerizable monomers such as acrylic acid, ethyl acrylate, 2-hydroxyethyl (meth)acrylate and 2-hydroxypropyl (meth)acrylate.

In the Example portion, there are mentioned, for example, a copolymer from tri-n-butylsilyl acrylate (TBSA), diethylaminoethyl methacrylate (DEAEMA) and methyl methacrylate (MMA) and a copolymer from tri-n-butylsilyl acrylate (TBSA), N,N-dimethylacrylamide (DMAA) and methyl methacrylate (MMA). However, there is no suggestion on a copolymer having a (poly)oxyalkylene block structure and containing an organosilyl ester group in the publication.

Still further, as a component which can be added to the coating composition, there are mentioned the same antifouling agents as described in the above Japanese Patent Laid-open Publication No. 8(1996)-269388.

Japanese Patent Laid-open Publication No. 8(1996)-269390 (reference (13)) discloses a coating composition comprising:

a polymer from monomer A represented by the formula X—SiR$^1$R$^2$R$^3$ (wherein R$^1$, R$^2$ and R$^3$ all represent groups selected from among alkyl and aryl groups and may be identical with or different from each other, and X represents an acryloyloxy, a methacryloyloxy, a maleinoyloxy, a fumaroyloxy or an itaconoyloxy group), a polymer from monomer B represented by the formula Y—(CH$_2$CH$_2$O)n—R$^4$ (wherein R$^4$ represents an alkyl or an aryl group; Y represents an acryloyloxy, a methacryloyloxy, a maleinoyloxy, a fumaroyloxy or an itaconoyloxy group; and n is an integer of 1 to 25), and an antifouling agent. As the antifouling agent, there are mentioned the same antifouling agents as described in the above Japanese Patent Laid-open Publication No. 8(1996)-269388. Further, as a component which can be added to the coating composition, there are mentioned, for example, resins such as rosin and antisetting agents.

Japanese Patent Laid-open Publication No. 8(1996)-277372 (reference (14)) discloses a coating composition comprising a triphenylboron pyridine complex and a copolymer from a monomer mixture containing the monomer A represented by the formula X—SiR$^1$R$^2$R$^3$ described in the above Japanese Patent Laid-open Publication No. 8(1996)-269388 (reference (11)) and the monomer B represented by the formula Y—(CH$_2$CH$_2$O)n—R$^4$ described in the same reference, and further comprising a resin component and a marine organism adhesion inhibitor which consist only of a nonmetallic polymer and a nonmetallic organic inhibitor, respectively. Further, for example, rosin and rosin derivatives are mentioned as a leaching rate regulator which can be added to the coating composition.

Japanese Patent Laid-open Publication No. 10(1998)-30071 (reference (15)) discloses a coating composition comprising at least one rosin compound (A) consisting of rosin, a rosin derivative or a rosin metal salt, a polymer having an organosilyl ester group (B) consisting of a polymer from at least one monomer M represented by the formula X—SiR$^1$R$^2$R$^3$ (wherein R$^1$, R$^2$ and R$^3$ all represent groups selected from among alkyl and aryl groups and may be identical with or different from each other, and X represents an acryloyloxy, a methacryloyloxy, a maleinoyloxy, a fumaroyloxy, an itaconoyloxy or a citraconoyloxy group), and/or a polymer from the above at least one monomer M and at least one other polymerizable monomer, and an antifouling agent (C). Further, as another monomer acting as an optional component copolymerizable with the above monomer M, there are mentioned, for example, acrylic acid, methyl acrylate, 2-hydroxyethyl (meth)acrylate and 2-hydroxypropyl (meth)acrylate. However, there is no suggestion on a copolymer having a (poly)oxyalkylene block structure and containing an organosilyl ester group in the publication.

As the antifouling agent, there are mentioned the same antifouling agents as described in the above Japanese Patent Laid-open Publication No. 8(1996)-269388 Further, as a component which can be added to the coating composition, there are mentioned, for example, pigments, chlorinated paraffin and antisetting agents.

However, in these references (9) to (15), there is no suggestion on a copolymer having a (poly)oxyalkylene block structure and containing an organosilyl ester group. Further, with the use of coating compositions described in these references, the obtained coating film is either poor in cracking resistance, or unsatisfactory from the viewpoint of a balance of cracking resistance, peeling resistance (coating adherence), antifouling performance or antifouling properties, in particular, antifouling properties in highly fouling environment, long-term antifouling properties and self-polishing properties.

Further, for example, 2-hydroxyethyl acrylate and 2-hydroxypropyl acrylate are mentioned as a copolymerizable optional component in Japanese Patent Publication No. 5(1993)-82865 (reference (16)). Still further, silyl (meth) acrylate copolymers are described in Japanese Patent Laid-open Publication No. 9(1997)-48947 (reference (17)), Japanese Patent Laid-open Publication No. 9(1997)-48948 (reference (18)), Japanese Patent Laid-open Publication No. 9(1997)-48949 (reference (19)), Japanese Patent Laid-open Publication No. 9(1997)-48950 (reference (20)), Japanese Patent Laid-open Publication No. 9(1997)-48951 (reference (21)), Japanese Patent Publication No. 5(1993)-32433 (reference (22)), U.S. Pat. No. 4,593,055 (reference (23)), Japanese Patent Laid-open Publication No. 2(1990)-1968669 (reference (24)) and WO 91/14743 (reference (25)). However, in these references (16) to (25), there is no suggestion on a copolymer having a (poly)oxyalkylene block structure and containing an organosilyl ester group. Further, with the use of antifouling paints based on copolymers described in these references (16) to (25), the obtained coating film is either poor in cracking resistance, or has room for further improvement from the viewpoint of a balance of cracking resistance, peeling resistance (coating film adherence), antifouling performance or antifouling properties, in particular, antifouling properties in highly fouling environment, long-term antifouling properties and self-polishing properties.

Japanese Patent Laid-open Publication No. 63(1988)-215780 (reference (26)) describes copolymers formed using, for example, methyl methacrylate, n-butyl methacrylate and acrylamide as copolymerization components, and further describes antifouling paints containing the above copolymers and cuprous oxide. These antifouling paints have the same drawbacks as those of the antifouling paints of the above references.

WO 96/03465 (reference (27)) describes star-type polymers obtained using tri- to octa-functional mercapto compounds. It is described that these polymers have such a low viscosity as to enable preparation of a paint of high solid content, and that the tendency thereof toward viscosity increase or gelation during storage is low. Moreover, the use of an unsaturated carboxylic acid silyl ester as a monomer is described in the WO 96/03465. However, there is no suggestion on a copolymer having an organosilyl ester group, which copolymer has such a block structure as, like a (poly)oxyalkylene, has hydrophilicity and can improve the antifouling performance of antifouling paint, and at least an AB type or ABA type block copolymer is not taught at all in the reference.

OBJECT OF THE INVENTION

The present invention has been made with a view toward solving the above problems of the prior art. It is an object of the present invention to provide a copolymer for antifouling paint which enables forming such an antifouling coating film as exhibits less cracking tendency, excellent adherence so as to ensure less peeling tendency and desirably controlled hydrolysis rate so as to be extremely excellent in antifouling properties in highly fouling environment and long-term antifouling properties as antifouling performance (antifouling activity). It is another object of the present invention to provide an antifouling coating composition which can form an antifouling coating film exhibiting less cracking tendency, excellent adherence so as to ensure less peeling tendency and desirably controlled hydrolysis rate so as to be extremely excellent in antifouling properties in highly fouling environment and long-term antifouling properties.

It is further objects of the present invention to provide an antifouling coating film formed from the above antifouling coating composition, to provide an antifouling method effected with the use of the above antifouling coating composition, and to provide a hull or underwater structure covered with the above antifouling coating film.

DISCLOSURE OF THE INVENTION

The (poly)oxyalkylene block silyl ester copolymer of the present invention comprises silyl ester copolymer block units (A) and block units (B), the silyl ester copolymer block units (A) comprising:
(a) component units derived from a polymerizable unsaturated carboxylic acid silyl ester, and
(b) polymerizable unsaturated monomer units other than the component units (a), the block units (B) derived from a mercapto compound represented by the formula:

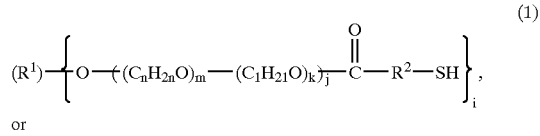

or

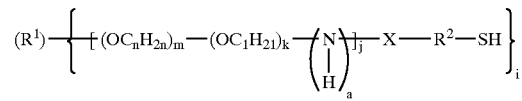

wherein $R^1$ represents a hydrocarbon group or ether-bond-containing hydrocarbon group having a valency of 1 or higher and having 1 to 30 carbon atoms; $R^2$ represents a bivalent hydrocarbon group having 1 to 30 carbon atoms or a group of the formula —CH($R^3$)— wherein $R^3$ represents a group of the formula $R^4$—O—$R^5$, $R^4$ representing a bivalent hydrocarbon group having 1 to 30 carbon atoms, and $R^5$ representing a monovalent hydrocarbon group having 1 to 30 carbon atoms; X represents:

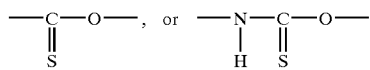

n is an integer of 1 to 5; m is an integer of 1 to 100; l is an integer of 1 to 5; k is an integer of 0 to 100; a is an integer of 0 or 1; j is an integer of 1 to 50; and i is the valency of $R^1$.

The component units derived from a polymerizable unsaturated carboxylic acid silyl ester (a) preferably contain component units (a-1) derived from a silyl (meth)acrylate are represented by the formula:

wherein R represents a hydrogen atom or a methyl group; and $R^a$, $R^b$ and $R^c$ may be identical with or different from each other and each represent a linear alkyl group, a branched alkyl group, a cycloalkyl group, a substituted or unsubstituted phenyl group or a trimethylsilyloxy group.

In the formula (I), it is preferred that at least one of the $R^a$, $R^b$ and $R^c$ represent a branched alkyl group or a cycloalkyl group.

Also, the component units derived from a polymerizable unsaturated carboxylic acid silyl ester (a) preferably comprise:

silyl (meth)acrylate component units (a-2) of the formula:

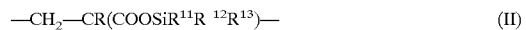

wherein R represents a hydrogen atom or a methyl group; each of $R^{11}$ and $R^{12}$ independently represents a linear alkyl group having 1 to 10 carbon atoms, a substituted or unsubstituted phenyl group, or a trimethylsilyloxy group; and $R^{13}$ represents an alkyl group having 1 to 18 carbon atoms which may have a ring structure or branch, a substituted or unsubstituted phenyl group having 6 to 10 carbon atoms, or a trimethylsilyloxy group, and silyl (meth)acrylate component units (a-3) of the formula:

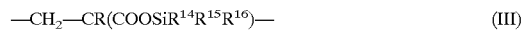

wherein R represents a hydrogen atom or a methyl group; each of $R^{14}$ and $R^{15}$ independently represents a branched alkyl or cycloalkyl group having 3 to 10 carbon atoms; and $R^{16}$ represents a linear alkyl group having 1 to 10 carbon atoms, a branched alkyl or cycloalkyl group having 3 to 10 carbon atoms, a substituted or unsubstituted phenyl group having 6 to 10 carbon atoms, or a trimethylsilyloxy group.

It is preferred that the polymerizable unsaturated monomer units (b) other than the component units (a) comprise component units (b-1) derived from an acrylic unsaturated monomer containing a polar group.

Preferably, the component units (b-1) derived from an acrylic unsaturated monomer containing a polar group have component units derived from an acrylic unsaturated monomer containing at least one polar group selected from the group consisting of a hydroxyl group, a hydroxyalkyl group, an alkoxyl group, a polyoxyalkylene group, an alkylpolyoxyalkylene group, an amino group, an N-substituted amino group, an amido group, an N-substituted amido group, an epoxy group, an oxolane group, an oxetane group, an oxirane group, a tetrahydrofurfuryl group and a morpholino group.

The use of the above (poly)oxyalkylene block silyl ester copolymer according to the present invention as a vehicle of antifouling paint enables providing an antifouling coating composition which enables forming such an antifouling coating film exhibiting less cracking tendency, excellent adherence so as to ensure less peeling tendency and desirably controlled hydrolysis rate so as to be extremely excellent in antifouling properties in highly fouling environment and long-term antifouling properties, which antifouling coating film is further excellent in a balance of these properties.

The antifouling coating composition of the present invention comprises a (poly)oxyalkylene block silyl ester copolymer, the (poly)oxyalkylene block silyl ester copolymer comprising silyl ester copolymer block units (A-1) and block units (A-2), the silyl ester copolymer block units (A-1) comprising:
(a) component units derived from a polymerizable unsaturated carboxylic acid silyl ester, and
(b) polymerizable unsaturated monomer units other than the component units (a),
the block units (A-2) derived from a mercapto compound represented by the formula:

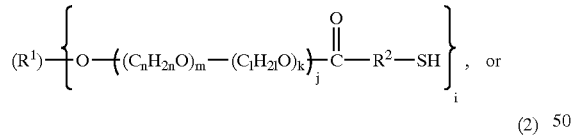

(1)

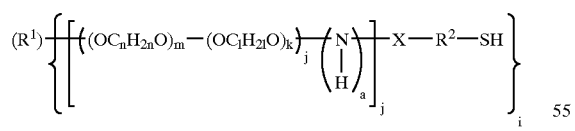

(2)

wherein $R^1$ represents a hydrocarbon group or ether-bond-containing hydrocarbon group having a valency of 1 or higher and having 1 to 30 carbon atoms; $R^2$ represents a bivalent hydrocarbon group having 1 to 30 carbon atoms or a group of the formula —CH($R^3$)— wherein $R^3$ represents a group of the formula $R^4$—O—$R^5$, $R^4$ representing a bivalent hydrocarbon group having 1 to 30 carbon atoms, and $R^5$ representing a monovalent hydrocarbon group having 1 to 30 carbon atoms; X represents:

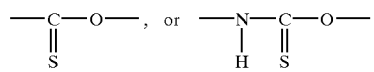

n is an integer of 1 to 5; m is an integer of 1 to 100; l is an integer of 1 to 5; k is an integer of 0 to 100; a is an integer of 0 or 1; j is an integer of 1 to 50; and i is the valency of $R^1$.

The component units derived from a polymerizable unsaturated carboxylic acid silyl ester (a) preferably contain component units (a-1) derived from a silyl (meth)acrylate of the formula:

wherein R represents a hydrogen atom or a methyl group; and $R^a$, $R^b$ and $R^c$ may be identical with or different from each other and each represent a linear alkyl group, a branched alkyl group, a cycloalkyl group, a substituted or unsubstituted phenyl group or a trimethylsilyloxy group.

In the formula (I), it is preferred that at least one of the $R^a$, $R^b$ and $R^c$ represent a branched alkyl group or a cycloalkyl group.

Also, the component units derived from a polymerizable unsaturated carboxylic acid silyl ester (a) preferably comprise:

silyl (meth)acrylate component units (a-2) of the formula:

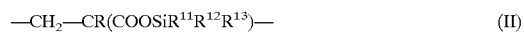

wherein R represents a hydrogen atom or a methyl group; each of $R^{11}$ and $R^{12}$ independently represents a linear alkyl group having 1 to 10 carbon atoms, a substituted or unsubstituted phenyl group, or a trimethylsilyloxy group; and $R^{13}$ represents an alkyl group having 1 to 18 carbon atoms which may have a ring structure or branch, a substituted or unsubstituted phenyl group having 6 to 10 carbon atoms, or a trimethylsilyloxy group, and silyl (meth)acrylate component units (a-3) of the formula:

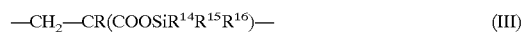

wherein R represents a hydrogen atom or a methyl group; each of $R^{14}$ and $R^{15}$ independently represents a branched alkyl or cycloalkyl group having 3 to 10 carbon atoms; and $R^{16}$ represents a linear alkyl group having 1 to 10 carbon atoms, a branched alkyl or cycloalkyl group having 3 to 10 carbon atoms, a substituted or unsubstituted phenyl group having 6 to 10 carbon atoms, or a trimethylsilyloxy group.

Preferably, the polymerizable unsaturated monomer units (b) other than the component units (a) comprise component units (b-1) derived from an acrylic unsaturated monomer containing a polar group.

It is preferred that the component units (b-1) derived from an acrylic unsaturated monomer containing a polar group have at least one polar group selected from the group consisting of a hydroxyl group, a hydroxyalkyl group, an alkoxyl group, a polyoxyalkylene group, an alkylpolyoxyalkylene group, an amino group, an N-substituted amino group, an amido group, an N-substituted amido group, an epoxy group, an oxolane group, an oxetane group, an oxirane group, a tetrahydrofurfuryl group and a morpholino group.

The antifouling coating composition of the present invention preferably further comprises an antifouling agent (B).

Also, the antifouling coating composition of the present invention preferably further comprises zinc oxide (C).

Moreover, it is preferred that the antifouling coating composition of the present invention further comprise an inorganic dehydrating agent (D).

It is also preferred that the antifouling coating composition of the present invention further comprise a leaching accelerating component (E).

The antifouling coating film of the present invention is formed from the above antifouling coating composition of the present invention.

The method of rendering antifouling a marine vessel, an underwater structure, a fishing gear or a fishing net according to the present invention comprises applying the above antifouling coating composition of the present invention to a base surface of a marine vessel, an underwater structure, a fishing gear or a fishing net and drying the applied antifouling coating composition so that a formed antifouling coating film covers the base surface.

The marine vessel, underwater structure, fishing gear or fishing net according to the present invention has a surface covered with the above antifouling coating film formed from the antifouling coating composition of the present invention.

According to the present invention, there is provided an antifouling coating composition which, because of the containing of specified (poly)oxyalkylene block silyl ester copolymer, enables forming such an antifouling coating film as exhibits less cracking tendency, excellent adherence so as to ensure less peeling tendency and desirably controlled hydrolysis rate so as to be excellent in antifouling performance (antifouling activity), antifouling properties, in particular, antifouling properties in highly fouling environment and long-term antifouling properties, which antifouling coating film is further excellent in a balance of these properties.

BEST MODE FOR CARRYING OUT THE INVENTION

Figure 1:
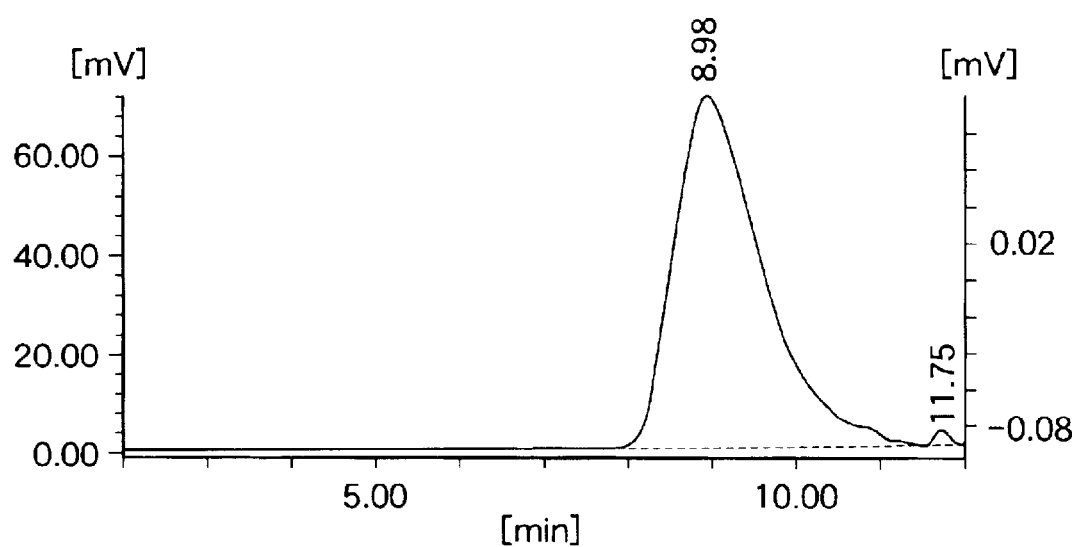
FIG. 1 is a GPC chromatogram of silyl ester copolymer BP-1.

The (poly)oxyalkylene block silyl ester copolymer and antifouling coating composition according to the present invention will be described in detail below.

(poly)oxylkylene Block Silyl Ester Copolymer

The (poly)oxyalkylene block silyl ester copolymer of the present invention is a block copolymer comprising silyl ester copolymer block units (A) and block units (B), the silyl ester copolymer block units (A) comprising:
(a) component units derived from a polymerizable unsaturated carboxylic acid silyl ester, and
(b) polymerizable unsaturated monomer units other than the component units (a),
the block units (B) derived from a specified mercapto compound.

With respect to the (poly)oxyalkylene block silyl ester copolymer, the terminology "(poly)oxyalkylene" means that an oxyalkylene or a polyoxyalkylene is contained in the silyl ester copolymer.

Silyl Ester Copolymer Block Unit (A)

First, the component units (a) and (b) for constituting the silyl ester copolymer block units (A) will be described.

Component Unit Derived from Polymerizable Unsaturated Carboxylic Acid Silyl Ester (a)

As the polymerizable unsaturated carboxylic acid silyl ester, there can be mentioned, for example, silyl esters of unsaturated monocarboxylic acids such as acrylic acid and methacrylic acid, α,β-unsaturated dicarboxylic acids such as itaconic acid, maleic acid, fumaric acid and citraconic dibasic acid, and unsaturated monocarboxylic acids having the structure of a half ester of α,β-unsaturated dicarboxylic acid.

Among the component units derived from such a polymerizable unsaturated carboxylic acid silyl ester, component units (a-1) derived from silyl (meth)acrylate are preferred.

These component units (a-1) derived from silyl (meth) acrylate are, for example, represented by the formula:

wherein R represents a hydrogen atom or a methyl group; and $R^a$, $R^b$ and $R^c$ may be identical with or different from each other and each represent a linear alkyl group, a branched alkyl group, a cycloalkyl group, a substituted or unsubstituted phenyl group or a trimethylsilyloxy group. The above linear alkyl group preferably 1 to 18 carbon atoms, still preferably 1 to 6 carbon atoms. Each of the branched alkyl group and cycloalkyl group preferably has 3 to 10 carbon atoms, still preferably 3 to 8 carbon atoms. As the substituent which can replace a hydrogen atom of the phenyl group, there can be mentioned, for example, an alkyl, an aryl and a halogen. The substituted or unsubstituted phenyl group has 6 to 18 carbon atoms, preferably 6 to 12 carbon atoms.

The silyl (meth)acrylate (a-1) from which the above silyl (meth)acrylate component units can be derived can be represented by the formula:

wherein R, like R of the above formula (I), represents a hydrogen atom or a methyl group; and $R^a$, $R^b$ and $R^c$, like $R^a$, $R^b$ and $R^c$ of the above formula (I), may be identical with or different from each other and each represent a linear alkyl group, a branched alkyl group, a cycloalkyl group, a substituted or unsubstituted phenyl group or a trimethylsilyloxy group.

For example, the above silyl (meth)acrylate (a-1) can be:
silyl (meth)acrylate wherein $R^a$, $R^b$ and $R^c$ are identical with each other, such as trimethylsilyl (meth)acrylate, triethylsilyl (meth)acrylate, tripropylsilyl (meth) acrylate, triisopropylsilyl (meth)acrylate, tributylsilyl (meth)acrylate, tri-sec-butylsilyl (meth)acrylate or triisobutylsilyl (meth)acrylate, or
silyl (meth)acrylate wherein $R^a$, $R^b$ and $R^c$ are partially or wholly different from each other, such as di-sec-butylmethylsilyl (meth)acrylate, sec-butyl-dimethylsilyl (meth)acrylate, dimethylpropylsilyl (meth)acrylate, monomethyldipropylsilyl (meth)acrylate or methylethylpropylsilyl (meth)acrylate.

The use of the copolymer containing these silyl (meth) acrylate component units (a-1) as a vehicle of antifouling paint enables forming an antifouling coating film which is excellent in not only self-polishing properties (consumability) but also long-term antifouling performance. Wherein "self-polishing" of copolymer means that the copolymer hydrolyzate per se has water-solubility and is dissolved in seawater, a new copolymer which has not been hydrolyzed yet is exposed.

In the present invention, it is preferred that at least one of the $R^a$, $R^b$ and $R^c$ of the component units (a-1) derived from silyl (meth)acrylate represented by the above formula (I) represent a branched alkyl group or a cycloalkyl group. The use of the component having a branched alkyl group or a cycloalkyl group as a vehicle of antifouling paint enables forming an antifouling coating film which is excellent in cracking resistance and peeling resistance.

Also, the component units derived from a polymerizable unsaturated carboxylic acid silyl ester (a) preferably comprise:

silyl (meth)acrylate component units (a-2) of the formula:

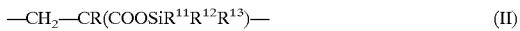

wherein R represents a hydrogen atom or a methyl group; each of $R^{11}$ and $R^{12}$ independently represents a linear alkyl group having 1 to 10 carbon atoms, a substituted or unsubstituted phenyl group, or a trimethylsilyloxy group; and $R^{13}$ represents an alkyl group having 1 to 18 carbon atoms which may have a ring structure or a branch, a substituted or unsubstituted phenyl group having 6 to 10 carbon atoms, or a trimethylsilyloxy group, and silyl (meth)acrylate component units (a-3) of the formula:

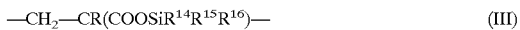

wherein R represents a hydrogen atom or a methyl group; each of $R^{14}$ and $R^{15}$ independently represents a branched alkyl or cycloalkyl group having 3 to 10 carbon atoms; and $R^{16}$ represents a linear alkyl group having 1 to 10 carbon atoms, a branched alkyl or cycloalkyl group having 3 to 10 carbon atoms, a substituted or unsubstituted phenyl group having 6 to 10 carbon atoms, or a trimethylsilyloxy group.

These component units will now be described.

Silyl (meth)acrylate Component Unit (a-2)

The silyl (meth)acrylate component unit (a-2) is represented by the formula:

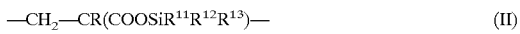

wherein R represents a hydrogen atom or a methyl group, and each of $R^{11}$ and $R^{12}$ independently represents a linear alkyl group having 1 to 10 carbon atoms, preferably 1 to 8 carbon atoms, and still preferably 1 to 6 carbon atoms, a substituted or unsubstituted phenyl group, or a trimethylsilyloxy group. As the linear alkyl group, there can be mentioned, for example, methyl, ethyl, n-propyl, n-butyl, n-pentyl, n-hexyl, n-heptyl, n-octyl, n-nonyl and n-decyl groups.

As the substituent which can replace a hydrogen atom of the phenyl group, there can be mentioned, for example, an alkyl, an aryl and a halogen.

$R^{13}$ represents an alkyl group having 1 to 18 carbon atoms, preferably 1 to 12 carbon atoms, and still preferably 1 to 9 carbon atoms, which may have a ring structure or a branch, a substituted or unsubstituted phenyl group having 6 to 10 carbon atoms, preferably 6 to 8 carbon atoms, or a trimethylsilyloxy group of the formula $(CH_3)_3SiO-$.

The alkyl group which constitutes $R^{13}$ can be any of the above exemplified linear alkyl groups, and further can be:
branched alkyl group such as isopropyl, isobutyl, sec-butyl, tert-butyl or neopentyl,
alicyclic alkyl group having an alicyclic structure (e.g., cyclohexane ring or norbornane ring), such as cyclohexyl or ethylidenenorbornyl,
or the like.

Of these, $R^{11}$, $R^{12}$ and $R^{13}$, although may be identical with or different from each other, preferably each represent methyl, ethyl, n-propyl, n-butyl, n-hexyl or trimethylsilyloxy, and still preferably each represent methyl, n-propyl, n-butyl or n-hexyl.

The silyl (meth)acrylate (a-2) from which the above silyl (meth)acrylate component units (a-2) can be derived can be represented by the formula:

wherein R is the same as the R of the above formula (II), and $R^{11}$, $R^{12}$ and $R^{13}$ are the same as the $R^{11}$, $R^{12}$ and $R^{13}$ of the above formula (II).

For example, the silyl (meth)acrylate (a-2) can be any of:
aliphatic silyl (meth)acrylates wherein $R^{11}$, $R^{12}$ and $R^{13}$ are identical with each other, such as:
trimethylsilyl (meth)acrylate,
triethylsilyl (meth)acrylate,
tri-n-propylsilyl (meth)acrylate,
tri-n-butylsilyl (meth)acrylate,
tri-n-pentylsilyl (meth)acrylate,
tri-n-hexylsilyl (meth)acrylate,
tri-n-heptylsilyl (meth)acrylate,
tri-n-octylsilyl (meth)acrylate,
tri-n-nonylsilyl (meth)acrylate, and
tri-n-decylsilyl (meth)acrylate,
aromatic or siloxane silyl (meth)acrylates wherein $R^{11}$, $R^{12}$ and $R^{13}$ are identical with each other, such as:
triphenylsilyl (meth)acrylate, and
tris(trimethylsilyloxy)silyl (meth)acrylate, and
aliphatic silyl (meth)acrylates wherein $R^{11}$, $R^{12}$ and $R^{13}$ are partially or wholly different from each other, such as:
dimethyl-n-propylsilyl (meth) acrylate,
isopropyldimethylsilyl (meth) acrylate,
di-n-butyl-isobutylsilyl (meth)acrylate,
n-hexyl-dimethylsilyl (meth) acrylate,
sec-butyl-dimethylsilyl (meth) acrylate,
monomethyldi-n-propylsilyl (meth)acrylate,
methylethyl-n-propylsilyl (meth) acrylate,
ethylidenenorbornyl-dimethylsilyl (meth) acrylate, and
trimethylsilyloxy-dimethylsilyl (meth)acrylate ($CH_2=C(CH_3)COOSi(CH_3)_2(OSi(CH_3)_3)$ and $CH_2=CHCOOSi(CH_3)_2(OSi(CH_3)_3)$).

These silyl (meth)acrylates (a-2) can be used individually or in combination.

Silyl (meth)acrylate Component Unit (a-3)

The silyl (meth)acrylate component units (a-3) are represented by the formula:

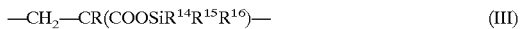

$$-CH_2-CR(COOSiR^{14}R^{15}R^{16})-\qquad (III)$$

wherein R represents a hydrogen atom or a methyl group, and each of $R^{14}$ and $R^{15}$ independently represents a branched alkyl group having 3 to 10 carbon atoms, preferably 3 to 8 carbon atoms, or a cycloalkyl group having 3 to 10 carbon atoms, preferably 3 to 9 carbon atoms.

The branched alkyl group, like that of the above formula (II), can be, for example, any of isopropyl, isobutyl, sec-butyl, tert-butyl and neopentyl.

The cycloalkyl group can be, for example, cyclohexyl or ethylidenenorbornyl.

$R^{16}$ represents a linear alkyl group having 1 to 10 carbon atoms, preferably 1 to 8 carbon atoms, and still preferably 1 to 6 carbon atoms; a branched alkyl or cycloalkyl group having 3 to 10 carbon atoms, preferably 3 to 9 carbon atoms; a substituted or unsubstituted phenyl group having 6 to 10 carbon atoms, preferably 6 to 8 carbon atoms; or a trimethylsilyloxy group.

As the linear alkyl group, branched alkyl or cycloalkyl group and phenyl group represented by $R^{16}$, there can be mentioned, for example, the same specific groups as listed above.

Of these, when $R^{14}$, $R^{15}$ and $R^{16}$, although may be identical with or different from each other, are identical with each other, it is preferred that isopropyl, sec-butyl or isobutyl be represented thereby. It is especially preferred that isopropyl or sec-butyl be represented thereby.

When $R^{14}$, $R^{15}$ and $R^{16}$ are partially or wholly different from each other, it is preferred that $R^{14}$ and $R^{15}$, although may be identical with or different from each other, represent isopropyl, isobutyl, sec-butyl or tert-butyl. It is preferred that $R^{16}$ represent a group selected from among methyl, ethyl, propyl, isopropyl, n-butyl, isobutyl and trimethylsilyloxy.

The silyl (meth)acrylate (a-3) from which the above silyl (meth)acrylate component units (a-3) can be derived can be represented by the formula:

$$CH_2=CR(COOSiR^{14}R^{15}R^{16})\qquad (iii)$$

wherein R, $R^{14}$, $R^{15}$ and $R^{16}$ are the same as the R, $R^{14}$, $R^{15}$ and $R^{16}$ of the above formula (III).

The silyl (meth)acrylate (a-3) can be, for example, any of:
silyl (meth)acrylates wherein $R^{14}$, $R^{15}$ and $R^{16}$ are identical with each other, such as:
triisopropylsilyl (meth)acrylate,
triisobutylsilyl (meth)acrylate, and
tri-sec-butylsilyl (meth)acrylate, and
silyl (meth)acrylates wherein $R^{14}$, $R^{15}$ and $R^{16}$ are partially or wholly different from each other, such as:
diisopropyl-cyclohexylsilyl (meth)acrylate,
diisopropyl-phenylsilyl (meth)acrylate,
diisopropyl-trimethylsiloxysilyl (meth)acrylate,
di-sec-butyl-methylsilyl (meth)acrylate,
di-sec-butyl-ethylsilyl (meth)acrylate,
di-sec-butyl-trimethylsilyloxysilyl (meth)acrylate, and
isopropyl-sec-butyl-methylsilyl (meth)acrylate.

In the present invention, these silyl (meth)acrylates (a-3) can be used individually or in combination.

Among the above silyl (meth)acrylate component units, the following combination is especially preferred from the viewpoint of easiness in the synthesis of silyl ester copolymer block units (A-1) and from the viewpoint of the film forming property, storage stability and easy control of consumability of an antifouling coating composition comprising the block copolymer containing silyl ester copolymer block units (A-1).

Preferred use is made of a combination of a component unit derived from at least one silyl (meth)acrylate (a-2) selected from among:
trimethylsilyl (meth)acrylate,
triethylsilyl (meth)acrylate,
tri-n-propylsilyl (meth)acrylate,
tri-n-butylsilyl (meth)acrylate,
n-hexyl-dimethylsilyl (meth)acrylate,
n-octyl-dimethylsilyl (meth)acrylate,
isopropyl-dimethylsilyl (meth)acrylate,
ethylidenenorbornyl-dimethylsilyl (meth)acrylate,
trimethylsilyloxy-dimethylsilyl (meth)acrylate,
bis(trimethylsilyloxy)-methylsilyl (meth)acrylate, and
tris(trimethylsilyloxy)silyl (meth)acrylate, with a component unit derived from at least one silyl (meth)acrylate (a-3) selected from among:
triisopropylsilyl (meth)acrylate,
triisobutylsilyl (meth)acrylate, tri-sec-butylsilyl (meth)acrylate, di-sec-butyl-methylsilyl (meth)acrylate, diisopropyl-trimethylsilyloxysilyl (meth)acrylate, and di-sec-butyl-trimethylsilyloxysilyl (meth)acrylate.

Still preferred use is made of a combination of a component unit derived from tri-n-butylsilyl (meth)acrylate as a silyl (meth)acrylate (a-2) with a component unit derived from triisopropylsilyl (meth)acrylate as a silyl (meth)acrylate (a-3).

Unsaturated Monomer Component Unit (b)

The unsaturated monomer component unit (b) is used to constitute the silyl (meth)acrylate copolymer block unit in cooperation with the above component unit (a) derived from polymerizable unsaturated carboxylic acid silyl ester and is a component unit which is different from the component unit (a) derived from polymerizable unsaturated carboxylic acid silyl ester.

The unsaturated monomer from which this unsaturated monomer component unit (b) can be derived can be, for example, any of:

hydrophobic (meth)acrylates such as methyl (meth)acrylate, ethyl (meth)acrylate, n-butyl(meth)acrylate, iso-butyl(meth)acrylate or tert-butyl (meth)acrylate, 2-ethylhexyl (meth)acrylate and cyclohexyl (meth) acrylate;

hydrophilic (meth)acrylates such as 2-hydroxyethyl (meth)acrylate, 2-hydroxypropyl (meth)acrylate, 2-hydroxybutyl (meth)acrylate, 4-hydroxybutyl (meth) acrylate, 2-methoxyethyl (meth)acrylate, methylpolyoxyethylene (meth)acrylate and methylpolyoxypropylene (meth)acrylate;

styrenes such as styrene, vinyltoluene and α-methylstyrene;

vinyl esters such as vinyl acetate, vinyl benzoate, vinyl propionate and vinyl butyrate; and crotonic acid esters, itaconates, fumarate and maleates.

Of these, (meth)acrylates, styrenes and vinyl esters are preferred from the viewpoint that an antifouling coating film of appropriate strength can be obtained.

In particular, when hydrophilic (meth)acrylates are employed, the consumability of coating film can be increased. For this purpose, also, use can be made of a hydrophilic comonomer such as an acrylamide derivative.

Moreover, in the present invention, component units (b-1) derived from an acrylic unsaturated monomer having a polar group are suitable for use as the unsaturated monomer component units (b).

As the polar group of the component units (b-1), there can preferably be employed at least one group selected from the group consisting of hydroxyl, hydroxyalkyl, alkoxyl, polyoxyalkylene, alkylpolyoxyalkylene, amino, N-substituted amino, amido, N-substituted amido, epoxy, oxirane, oxolane, oxetane, tetrahydrofurfuryl and morpholino groups.

The above component units (b-1) derived from an acrylic unsaturated monomer having a polar group are represented by, for example, the formula:

wherein $R^5$ represents a hydrogen atom or a methyl group; and W represents a polar group.

The polar group W is represented by the formula $ZR^6$ wherein Z represents an oxygen atom or $-NR^7$.

When Z is an oxygen atom, $R^6$ represents a substituted or unsubstituted hydroxyalkyl or hydroxycycloalkyl group, or a polyalkylene glycol group of the formula:

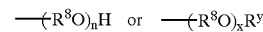

(wherein $R^8$ represents an alkylene group; n is an integer of 2 to 50; x is an integer of 1 to 100; and $R^y$ represents an alkyl group), or an epoxy or oxetane group of the formulae:

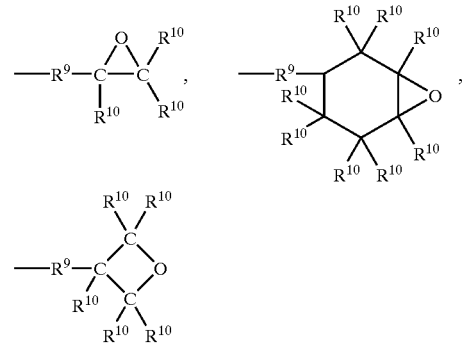

(wherein $R^9$ represents an alkylene group of 1 to 10 carbon atoms having or not having an ether bond; and $R^{10}$s may be identical with or different from each other and each represent H or an alkyl group having 1 to 5 carbon atoms; provided that $R^{10}$s bonded to neighboring carbon atoms may be bonded with each other to thereby form a ring structure).

In the above formula (IV), the hydroxyalkyl group preferably has 1 to 18 carbon atoms, still preferably 2 to 9 carbon atoms. The hydroxycycloalkyl group preferably has 3 to 10 carbon atoms, still preferably 3 to 8 carbon atoms. The alkylene group $R^8$ has 1 to 8 carbon atoms, preferably 2 to 4 carbon atoms. The substitutent of the hydroxyalkyl group or hydroxycycloalkyl group can preferably be a halogen atom such as a chlorine atom, a phenyl group or a hydroxyl group.

When Z is $-NR^7$, $R^7$ represents an alkyl group having carbon atoms as mentioned above, which may be substituted with any of a halogen, a hydroxyl group, an amino group, a substituted amino group, an acyl group and an alkoxyl group. $R^6$ represents a hydrogen atom.

The copolymer containing the above unsaturated monomer component units having a polar group (b-1), when employed as a vehicle of antifouling paint, realizes excellent antifouling performance especially in highly fouling sea area.

The unsaturated monomer (b-1) from which the unsaturated monomer component units having a polar group (b-1) can be derived can be represented by the formula:

 (IV-a)

wherein $R^5$ and W are the same as those defined in the formula (IV), namely, W is $ZR^6$.

The unsaturated monomer (IV-a), when, in the formula (IV-a), Z represents an oxygen atom and $R^6$ represents a substituted or unsubstituted hydroxyalkyl or hydroxycycloalkyl group, or polyalkylene glycol group, can be, for example, any of 2-hydroxyethyl acrylate, 2-hydroxyethyl methacrylate, 2-hydroxypropyl acrylate, 2-hydroxypropyl methacrylate, 3-chloro-2-hydroxypropyl methacrylate, 3-phenoxy-2-hydroxypropyl acrylate, 4-hydroxybutyl acrylate, 2-hydroxybutyl acrylate, 2-hydroxybutyl methacrylate, 6-hydroxyhexyl acrylate, 1,4-cyclohexanedimethanol monoacrylate, polyethylene glycol monomethacrylate (n=2), polyethylene glycol monomethacrylate (n=4), polyethylene glycol monomethacrylate (n=5), polyethylene glycol monomethacrylate (n=8), polyethylene glycol monomethacrylate (n=10), polyethylene glycol monomethacrylate (n=15), polypropylene glycol monomethacrylate (n=5), polypropylene glycol monomethacrylate (n=9), polypropylene glycol monomethacrylate (n=12), 2-methoxyethyl acrylate, 3-butoxypropyl methacrylate and methoxypolyethylene glycol monomethacrylate (n=35).

When Z is an oxygen atom, the unsaturated monomer (IV-a) having an epoxy group or an oxetane group can be, for example, any of:

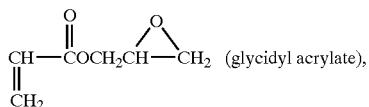 (glycidyl acrylate),

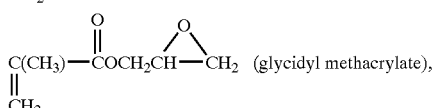 (glycidyl methacrylate),

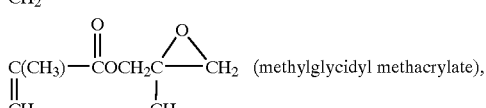 (methylglycidyl methacrylate),

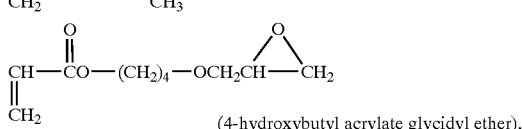
(4-hydroxybutyl acrylate glycidyl ether),

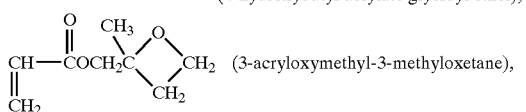 (3-acryloxymethyl-3-methyloxetane),

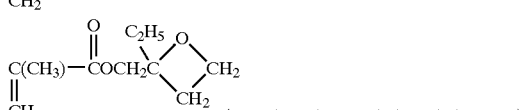 (3-methacryloxymethyl-3-ethyloxetane),

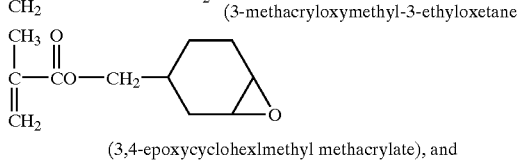
(3,4-epoxycyclohexlmethyl methacrylate), and

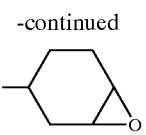
(3,4-epoxycyclohexymethyl acrylate).

The unsaturated monomer, when, in the formula (IV-a), Z represents $—NR^7$, can be, for example, any of N-methylolacrylamide, N-methoxymethylacrylamide, N-ethoxymethylacrylamide, N,N-dimethylaminopropylacrylamide, N,N-dimethylaminopropylmethacrylamide and diacetoneacrylamide.

The above unsaturated monomers can be used individually or in combination.

These unsaturated monomers (b) can be used individually or in combination.

From the viewpoint of prevention of coating film cracking and from the viewpoint of the peeling resistance, strength and consumability of coating film, it is preferred that the silyl ester copolymer block units (A) contain the component units (a) derived from a polymerizable unsaturated carboxylic acid silyl ester in an amount of 10 to 95% by weight, especially 20 to 85% by weight, and contain the unsaturated monomer component units (b) other than the component units (a) in an amount of 5 to 90% by weight, especially 15 to 80% by weight (provided that component units (a)+ component units (b)=100% by weight). When the silyl (meth)acrylate component units (a-2) and (a-3) are contained as the component units (a) derived from a polymerizable unsaturated carboxylic acid silyl ester, it is preferred that the silyl (meth)acrylate component units (a-2) be contained in an amount of 0.1 to 60% by weight, especially 0.5 to 40% by weight, while the silyl (meth)acrylate component units (a-3) be contained in an amount of 10 to 70% by weight, especially 30 to 65% by weight (provided that the amount of component units (a-2)+(a-3) falls within the above range of amount of component units (a)).

Block Unit Derived from Mercapto Compound (B)

The block units (B) are derived from a mercapto compound represented by the formula:

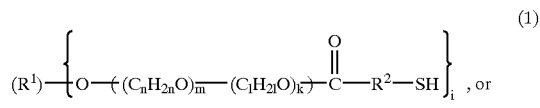 (1)

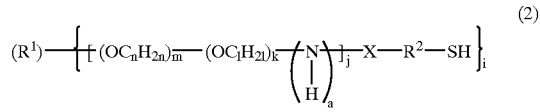 (2)

wherein $R^1$ represents a hydrocarbon group or ether-bond-containing hydrocarbon group having a valency of 1 or higher and having 1 to 30 carbon atoms, preferably 1 to 20 carbon atoms. The group $R^1$ may be an aliphatic hydrocarbon group, an alicyclic hydrocarbon group or an aromatic aliphatic hydrocarbon group unsubstituted or substituted with an alkyl group. When the valency of $R^1$ is 2 or higher, only one carbon atom as a constituent of $R^1$ may be bonded with a plurality of oxygen atom bonding groups (—O—), or a plurality of carbon atoms as constituents of the hydrocarbon group may be respectively bonded with oxygen atom bonding groups. For example, $R^1$ may be represented by the formula:

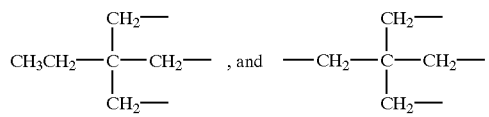

$R^2$ represents a bivalent hydrocarbon group having 1 to 30 carbon atoms, preferably 1 to 20 carbon atoms, or a group of the formula —CH($R^3$)— wherein $R^3$ represents a group of the formula $R^4$—O—$R^5$ in which $R^4$ represents a bivalent hydrocarbon group having 1 to 30 carbon atoms, preferably 1 to 10 carbon atoms, while $R^5$ represents a monovalent hydrocarbon group having 1 to 30 carbon atoms, preferably 1 to 20 carbon atoms.

X represents:

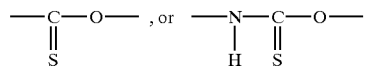

n is an integer of 1 to 5, preferably 1 to 4.

m is an integer of 1 to 100, preferably 1 to 60.

l is an integer of 1 to 5; k is an integer of 0 to 100; a is an integer of 0 or 1; j is an integer of 1 to 50; and i is the valency of $R^1$.

When two or more different types of alkylene oxide chains ($OC_nH_{2n}$) exist in the mercapto compound, alkylene oxide chains of the same type may form a block, or the two or more different types of alkylene oxide chains $(OC_nH_{2n})_m$ may be arranged randomly, in the mercapto compound.

This mercapto compound can be, for example, any of:

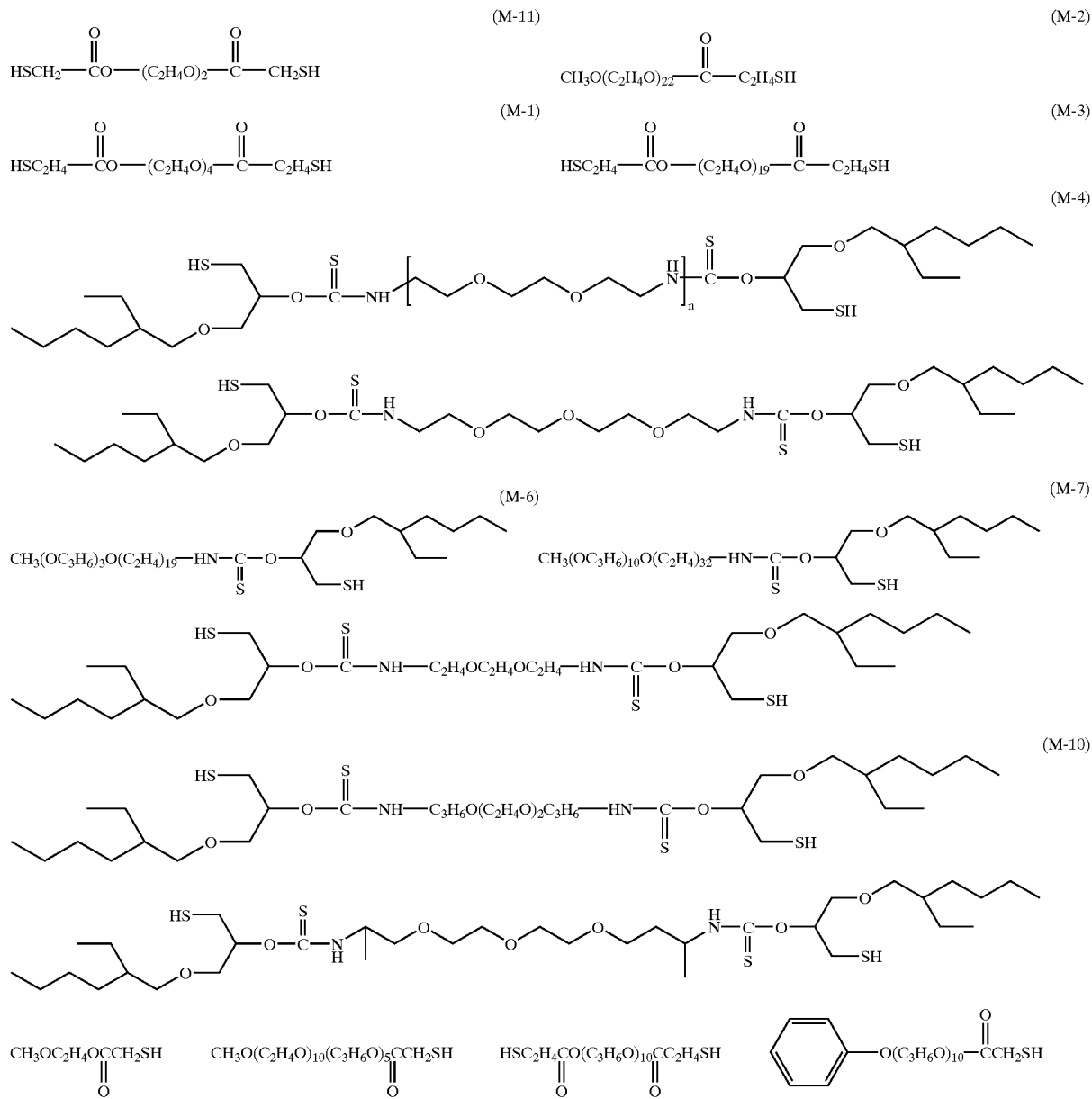

-continued

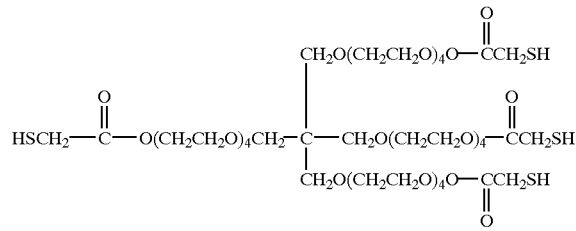
(M-12)

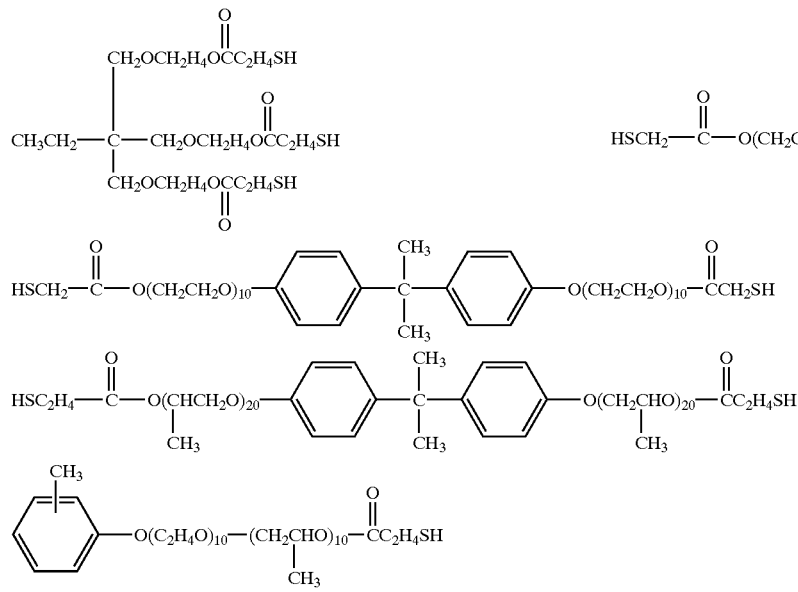

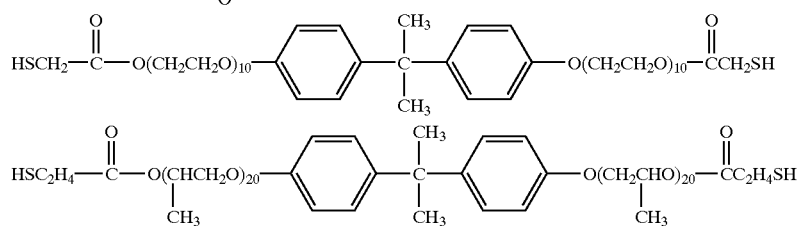

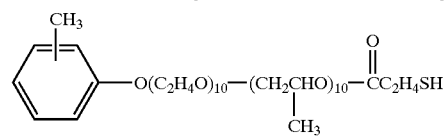

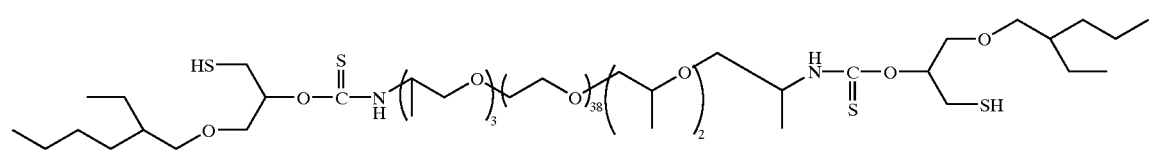
(M-8)

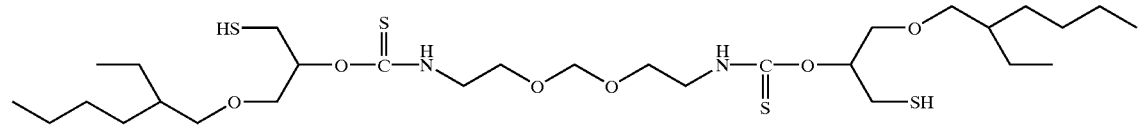
(M-9)

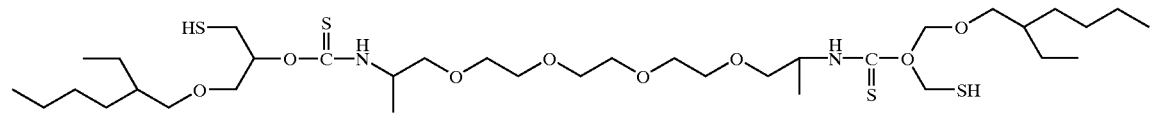
(M-5)

Among the above mercapto compounds, those of the formulae (M-1) to (M-12) are employed in Examples described later.

It is preferred that the number average molecular weight of these mercapto compounds be in the range of 100 to 10,000, especially 150 to 8000, and still especially 150 to 5000.

When the block units derived from these mercapto compounds are contained, there can be obtained a block copolymer having advantageous properties such that an excellent surface renewability is exhibited in the event of the use of the block copolymer as a vehicle of antifouling paint. The expression "excellent surface renewability" means that, in the surface renewal, while undergoing consumption, of the self-polishing antifouling paint coating film, the thickness of a porous layer (known as "skeleton layer") which is the outermost surface layer constituted of traces of leaching of antifouling agent is small, so that a highly active coating surface is constantly exposed.

The (poly)oxyalkylene block silyl ester copolymer produced using the above mercapto compound is characterized by having a low molecular weight as compared with those of customary silyl ester copolymers to thereby cause the viscosity of its solution to be low.

Therefore, the antifouling coating composition comprising the (poly)oxyalkylene block silyl ester copolymer according to the present invention enables minimizing the use of solvent, thereby having advantageous properties such that the workability at coating operation is excellent.

In the (poly)oxyalkylene block silyl ester copolymer A for use in the present invention, the above component units (A) and/or (B) may be present each in a single type or in combination of at least two types.

In the (poly)oxyalkylene block silyl ester copolymer of the present invention, it is preferred that, providing that the sum of component units (A) and (B) is 100% by weight, the amount of silyl ester copolymer block units (A) be generally in the range of 40 to 99.9% by weight, especially 50 to 99.5% by weight, and still especially 70 to 99% by weight, while the amount of block units (B) constituted of the mercapto compound be generally in the range of 0.1 to 60% by weight, especially 0.5 to 50% by weight, and still especially 1 to 30% by weight.

When the amount of mercapto compound block units (B) is in the above ranges, the coating film tends to exhibit excellent antifouling properties and renewability, and also tends to be excellent in hardness, wear and other properties.

When the mercapto compound from which the component units (B) for constituting the (poly)oxyalkylene block silyl ester copolymer can be derived is a compound having one "SH" (compound of the above formula (1) or (2) wherein i is 1), it is presumed that, in the copolymer, one component unit (B) would exist in one end portion of the copolymer so as to seal one end of the component unit (A) (namely, A-B type, see the following formula).

Further, for example, when the mercapto compound from which the component units (B) can be derived is a compound having one "SH" at each of both ends thereof (compound of the above formula (1) or (2) wherein i is 2), it is presumed that, in the copolymer, one end of component unit (A) would be bonded with component unit (B), whose other end would further be bonded with one end of other component unit (A) (namely, A-B-A type, see the following formula).

In addition to these block copolymers, there would be a block copolymer wherein chain end portions of three or more component units (A) are bonded with three or more S elements of component unit (B), known as star type arrangement (see the following formula).

In the present invention, the A-B-A type and the star type are preferred as the (poly)oxyalkylene block silyl ester copolymer.

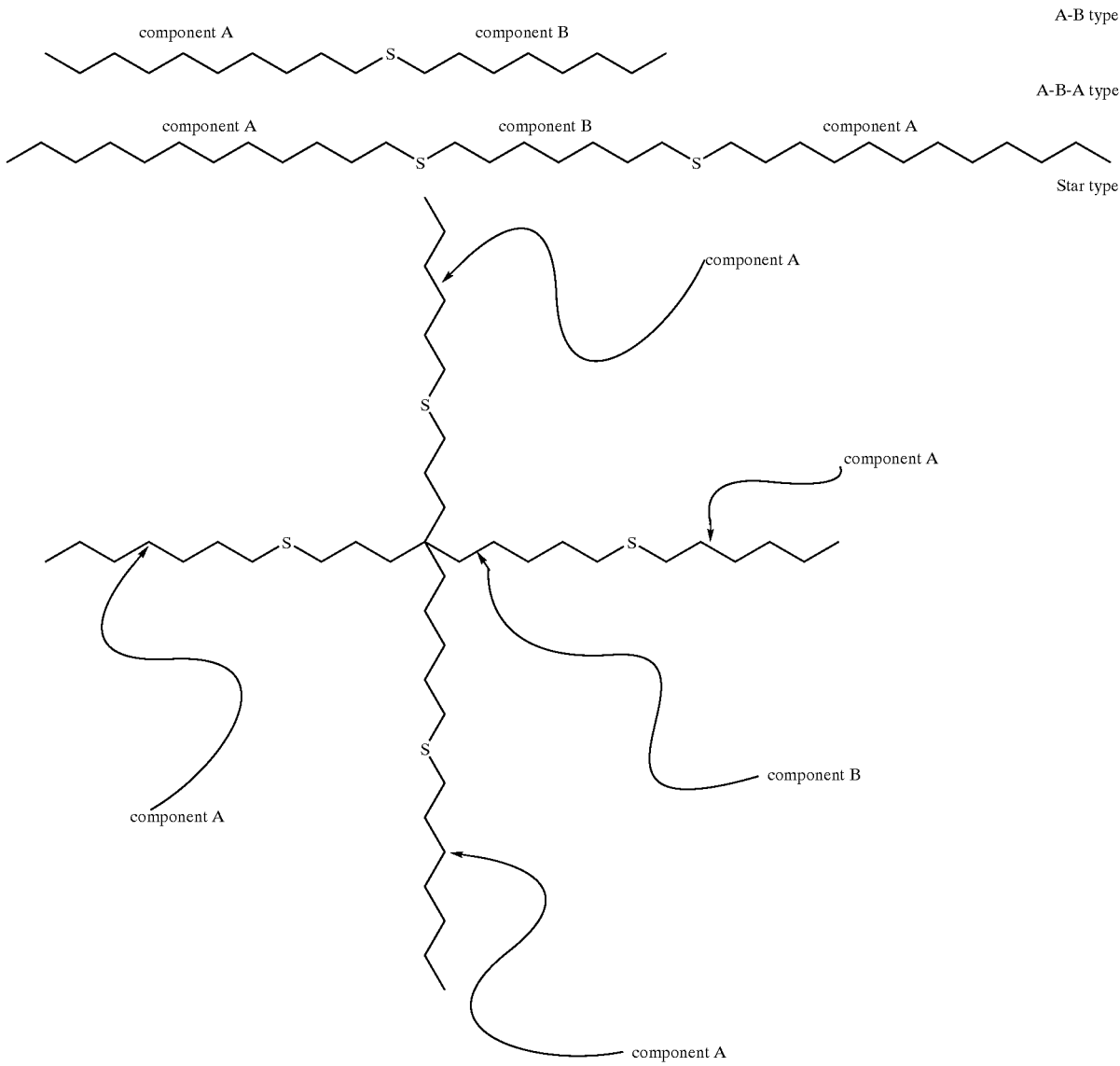

With respect to these block copolymers, from the viewpoint of coatability of a composition containing the copolymer and antisagging properties exhibited when dilution is effected with a solvent, it is preferred that the viscosity of, for example, a solution of 50% concentration at 25° C., although varied depending on the use of employed copolymer and not unconditionally determined, be generally in the range of 5 to 200,000 (200 thousand) cps, especially 10 to 50,000 (50 thousand) cps.

With respect to these block copolymers, it is preferred that the weight average molecular weight thereof be in the range of 500 to 200 thousand, especially 1000 to 100 thousand, and still especially 1500 to 80 thousand.

These (poly)oxyalkylene block silyl ester copolymers A can be produced by performing a block copolymerization of the above silyl ester copolymer component and the above mercapto compound.

The process for producing (poly)oxyalkylene block silyl ester copolymers will be described below.

Process for Producing (poly)oxyalkylene Block Silyl Ester Copolymer

In the production of (poly)oxyalkylene block silyl ester copolymer, a block copolymerization is performed while causing the mercapto compound (B) to be present in polymerization conditions of silyl ester copolymer component (A).

Specifically, use is made of the above polymerizable unsaturated carboxylic acid silyl ester (a) and the unsaturated monomer (b) other than the polymerizable unsaturated carboxylic acid silyl ester which are constituents of the silyl ester copolymer component (A). Based on the amount of silyl ester copolymer component (A), the polymerizable unsaturated carboxylic acid silyl ester (a) is used in an amount of 10 to 95% by weight, preferably 20 to 85% by weight, and the unsaturated monomer (b) is used in an amount of 5 to 90% by weight, preferably 15 to 80% by weight (providing that (a)+(b)=100% by weight). The mercapto compound (B) is used in an amount of 0.1 to 60% by weight, preferably 0.5 to 50% by weight, based on the amount of (poly)oxyalkylene block silyl ester copolymer. A block polymerization thereof is carried out through various common techniques, such as solution polymerization, bulk polymerization, emulsion polymerization and suspension polymerization, in the presence of a radical polymerization initiator.

The block polymer obtained through such polymerization techniques generally comprises random-copolymerized silyl ester copolymer component (A) chains and (poly) oxyalkylene block chains.

Conventional azo compounds and peroxides can widely be used as the radical polymerization initiator. Examples of the azo compounds include 2,2'-azobisisobutyronitrile, 2,2'-azobis(2-methylbutyronitrile) and 2,2'-azobis(2,4-dimethylvaleronitrile).

Examples of the peroxides include benzoyl peroxide, tert-butyl peroxyacetate, tert-butyl peroxyoctate, cumene hydroperoxide, tert-butyl peroxide, tert-butyl peroxybenzoate, tert-butyl peroxyisopropyl carbonate, tert-butyl hydroperoxide and persulfates (potassium and ammonium salts).

Further, use can be made of an initiator of the formula:

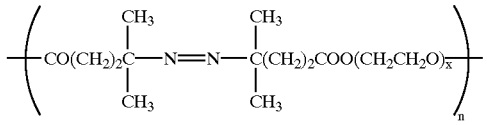

wherein each of x and n is an integer of 1 or greater.

The use of these initiators enables increasing the hydrophilicity of (poly)oxyalkylene block silyl ester copolymer and enables enhancing the antifouling performance and consumability of antifouling coating composition. With respect to the initiator of the above formula, it can effectively be used in cases where the above mercapto compound is not employed, for example, in the polymerization of an unsaturated carboxylic acid silyl ester intended for producing a silyl ester copolymer.

When the above polymer is used in an antifouling paint, the solution polymerization in which polymerization is carried out in an organic solvent, or the bulk polymerization is preferred among the above various polymerization techniques. The organic solvent used in the solution polymerization technique, although not particularly limited as long as it is inert and does not react with any of the monomers for copolymerization and as long as it can dissolve the monomers, can be, for example, any of:

aromatic hydrocarbons such as xylene and toluene;
aliphatic hydrocarbons such as hexane and heptane;
esters such as ethyl acetate and butyl acetate;
alcohols such as isopropyl alcohol and butyl alcohol;
ethers such as dioxane and diethyl ether; and
ketones such as methyl ethyl ketone and methyl isobutyl ketone. These solvents can be used individually or in combination.

The catalyst for copolymerization is used in an amount of, for example, 0.01 to 20 parts by weight, preferably 0.1 to 10 parts by weight, per 100 parts by weight of the sum of components constituting the (poly)oxyalkylene block silyl ester copolymer. This catalyst can be added once, or can be divided and added two or more times. Dividing the catalyst and effecting addition two or more times is preferred from the viewpoint of regulation of molecular weight, reaction efficiency and conversion ratio.

The solvent is used in an amount of, for example, 0 to 1000 parts by weight, preferably 10 to 500 parts by weight, per 100 parts by weight of the sum of monomers for copolymerization.

It is preferred that the weight average molecular weight of thus produced silyl ester copolymer A be in the range of 500 to 200 thousand, especially 1000 to 100 thousand, and still especially 1500 to 80 thousand.

In the above block polymerization toward a (poly) oxyalkylene block silyl ester copolymer, a terminal radical in the stage of growth of silyl ester copolymer (A) undergoes a chain transfer to the S atom of mercapto compound (B) to form thioehter bond —S—, for example, according to the formula. That is, the (poly)oxyalkylene block silyl ester copolymer has a structure that at least one carbon atom in main chain of the silyl ester copolymer block unit (A) bonds with block unit (B) drived from mercapto compound through —S—(thioether)bond:

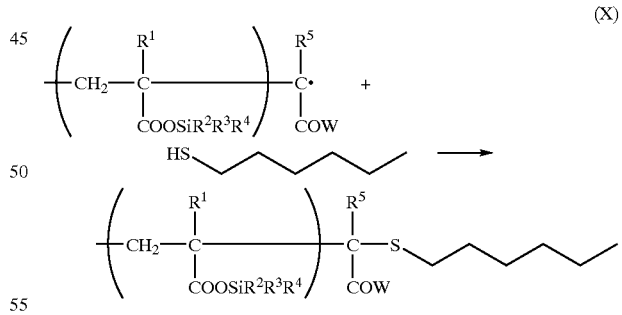

wherein the abbreviations have the same meaning as defined hereinbefore. Thus, the (poly)oxyalkylene block silyl ester copolymer of the present invention can be obtained.

The thus obtained (poly)oxyalkylene block silyl ester copolymer can be of the A-B type (monofunctional), A-B-A type (bifunctional type) or star type (trifunctional or greater functionality) in accordance with the functionality of mercapto group of mercapto compound (B).

In the present invention, although, in carrying out the above reaction, appropriate selection can be made with respect to the sequence of addition of each component and the presence of solvent, it is preferred that the reaction be performed in a solvent, with other components simultaneously charged, or appropriately divided and charged in sequence. The polymerization reaction can be conducted at, for example, 30 to 200° C., preferably 40 to 180° C., and still preferably 50 to 150° C., for about 30 min to 24 hr, thereby obtaining the (poly)oxyalkylene block silyl ester copolymer of the present invention.

The (poly)oxyalkylene block silyl ester copolymer obtained by the above process generally has the block structure of the A-B type, A-B-A type or star type.

Identification as to the above reaction can be effected by measurement using, for example, GPC, IR spectroscopy or NMR spectroscopy.

The described (poly)oxyalkylene block silyl ester copolymer of the present invention can be used as either a vehicle of antifouling coating composition, a slowly released medicine, or an agricultural polymer. It is especially useful as a vehicle of antifouling paint.

Antifouling Coating Composition

The antifouling coating composition of the present invention comprises, as a coating forming component, the (poly)oxyalkylene block silyl ester copolymer A which comprises silyl ester copolymer block units (A-1) and block units (A-2), the silyl ester copolymer block units (A-1) comprising (a) component units derived from a polymerizable unsaturated carboxylic acid silyl ester, and (b) polymerizable unsaturated monomer units other than the component units (a), the block units (A-2) derived from a specified mercapto compound.

The use of the antifouling coating composition containing the (poly)oxyalkylene block silyl ester copolymer leads the formation of an antifouling coating film exhibiting less cracking tendency, excellent adherence so as to ensure less peeling tendency and desirably controlled hydrolysis rate so as to be extremely excellent in antifouling properties in highly fouling environment and long-term-maintained antifouling properties.

The antifouling coating composition (P) of the present invention comprises the above (poly)oxyalkylene block silyl ester copolymer A as an indispensable component. The antifouling coating composition may further contain components other than the (poly)oxyalkylene block silyl ester copolymer (A), for example, an antifouling agent (B), zinc oxide (zinc white) (C), an inorganic dehydrating agent (D), an antisagging/antisetting agent, a leaching accelerating agent such as rosin, a plasticizer such as chlorinated paraffin, various pigments such as a color pigment and a body pigment, various resins such as an acrylic resin and a polyalkyl vinyl ether (vinyl ether (co)polymer), and various additives such as a defoamer, an antiflooding agent and a leveling agent.

Components and various additives other than the (poly)oxyalkylene block silyl ester copolymer A will be described below.

Antifouling Agent (B)

Although common antifouling agents, which may be inorganic or organic, can be widely used as the antifouling agent (B), it is preferred in the present invention to employ copper and/or a copper compound (B-1), a metal pyrithione (B-2) and other organic antifouling agents.

The copper and/or copper compound (B-1) (excluding pyrithiones, the same applies hereinafter) to be added to the antifouling coating composition of the present invention will now be described. Those whose molecular weight is generally in the range of 63.5 to 2000, preferably 63.5 to 1000, are used as the copper and/or copper compound.

Both organic and inorganic copper compounds can be used as the copper compound (B-1). Examples of the inorganic copper compounds include cuprous oxide, copper thiocyanate (cuprous thiocyanate or copper rhodanate), basic copper sulfate, copper chloride and copper oxide.

Examples of the organic copper compounds include basic copper acetate, oxine copper, copper nonylphenolsulfonate, copper bis(ethylenediamine) -bis(dodecylbenzenesulfonate), copper naphthenate, copper rodinate and copper bis(pentachlorophenolate). Inorganic cuprous oxide and copper thiocyanate (copper rhodanate) are preferably used.

These copper compounds, in place of copper or together with copper, can be used individually or in combination (copper compounds (B-1) do not include copper pyrithione).

In the antifouling coating composition of the present invention, it is preferred that these copper and/or copper compounds, in total, be generally contained in an amount of 1 to 70% by weight, especially 3 to 65% by weight. Per 100 parts by weight of (poly)oxyalkylene block silyl ester copolymer A contained in the antifouling coating composition, it is preferred that these copper and/or copper compounds (B-1), in total, be generally contained in an amount of 3 to 1400 parts by weight, especially 10 to 1300 parts by weight.

When the amount of copper and/or copper compound contained in the antifouling coating composition is within the above ranges, an antifouling coating film having excellent antifouling properties can be formed.

In the present invention, use can be made of an organic antifouling agent together with the copper and/or copper compound (B-1) or in place of the copper and/or copper compound (B-1). As the organic antifouling agent, there can be employed, for example, metal pyrithiones (B-2). Examples of the metal pyrithiones include sodium, magnesium, calcium, barium, aluminum, copper, zinc, iron and lead pyrithiones. Of these metal pyrithiones, copper pyrithione and zinc pyrithione are preferred. Copper pyrithione is especially preferred.

In the antifouling coating composition of the present invention, it is preferred that these pyrithione compounds (B-2), in total, be generally contained in an amount of 0.1 to 50% by weight, especially 0.5 to 30% by weight. Per 100 parts by weight of (poly)oxyalkylene block silyl ester copolymer A contained in the antifouling coating composition, it is preferred that these pyrithione compounds (B-2), in total, be generally contained in an amount of 0.3 to 300 parts by weight, especially 2 to 200 parts by weight.

In the present invention, the following other antifouling agents may be contained together with the pyrithione compounds (B-2) or in place of the pyrithione compounds (B-2). Conventional various antifouling agents can be used as the other antifouling agents.

Examples of the other antifouling agents include tetramethylthiuram disulfide, carbamate compounds (e.g., zinc dimethyldithiocarbamate and manganese 2-ethylenebisdithiocarbamate), 2,4,5,6-tetrachloroisophthalonitrile, N,N-dimethyldichlorophenylurea, 2-methylthio-4-tert-butylamino-6-cyclopropylamino-s-triazine, 4,5-dichloro-2-n-octyl-4-isothiazolin-3-one, 2,4,6-trichlorophenylmaleimide, pyridine-triphenylborane and amine-triphenylborane.

In the present invention, these antifouling agents can be used individually or in combination, together with pyrithione compounds (metal pyrithiones) such as zinc pyrithione (in the formula (IV), $R^1$ to $R^4$=H, M=Zn and n=2) and copper pyrithione (in the formula (IV), $R^1$ to $R^4$=H, M=Cu and n=2). For example, copper pyrithione and/or zinc pyrithione can be used in combination with 4,5-dichloro-2-n-octyl-4-isothiazolin-3-one.

The total content of various antifouling agents, such as copper and/or copper compounds (B-1) and pyrithione compounds (B-2), in the antifouling coating composition, although depends on the types of coating film forming copolymer and antifouling agent used in the preparation of antifouling coating composition and the type of, for example, marine vessel to be coated with the antifouling coating composition (with respect to marine vessel, its sea route, speed, operation rate, size and location of ship bottom) and cannot be unconditionally determined, is preferably in the range of 10 to 1400 parts by weight, still preferably 20 to 1300 parts by weight, per 100 parts by weight of the above (poly)oxyalkylene block silyl ester copolymer A.

For example, when zinc pyrithione is used in combination with cuprous oxide ($Cu_2O$) as the antifouling agent in the antifouling coating composition, the zinc pyrithione may be contained in an amount of 2 to 200 parts by weight per 100 parts by weight of (poly)oxyalkylene block silyl ester copolymer A while the cuprous oxide may be generally contained in an amount of about 10 to 1300 parts by weight per 100 parts by weight of (poly)oxyalkylene block silyl ester copolymer A in the antifouling coating composition. Even if the zinc pyrithione and cuprous oxide are contained, the antifouling coating composition because of containing the specific copolymer having the block unit derived from mercapto compound is excellent in storage stability and does not suffer viscosity increase or gelation during storage, as different from the aforementioned antifouling paints of the prior art.

Moreover, for example, when copper pyrithione is used in combination with cuprous oxide ($Cu_2O$) as the antifouling agent in the antifouling coating composition, the copper pyrithione may be contained in an amount of 2 to 200 parts by weight per 100 parts by weight of (poly)oxyalkylene block silyl ester copolymer (A) while the cuprous oxide may be generally contained in an amount of about 10 to 1300 parts by weight per 100 parts by weight of (poly)oxyalkylene block silyl ester copolymer A in the antifouling coating composition.

Zinc Oxide (Zinc White) (C)

Zinc oxide (zinc white) (C) may be contained in the antifouling coating composition of the present invention. In the use of the antifouling coating composition wherein zinc oxide is contained, the obtained coating film strength is enhanced, and the abradability of coating film can be effectively controlled.

From the viewpoint of regulation of consumability and regulation of coating film hardness, it is generally preferred that zinc oxide be contained in the antifouling coating composition in an amount of 0.5 to 35% by weight, especially 1 to 25% by weight.

Inorganic Dehydrating Agent (D)

The antifouling coating composition of the present invention may be loaded with an inorganic or organic dehydrating agent, preferably an inorganic dehydrating agent (inorganic dehydrating agent (D)). The antifouling coating composition loaded with a dehydrating agent exhibits an enhanced storage stability.

The dehydrating agent can be, for example, any of anhydrous gypsum ($CaSO_4$), synthetic zeolite adsorbents (trade name: Molecular Sieve), orthoesters such as methyl orthoformate and methyl orthoacetate, orthoboric esters, silicates and isocyanates (trade name: Additive TI). In particular, anhydrous gypsum and Molecular Sieve are preferably used as the inorganic dehydrating agent (D). Such inorganic dehydrating agents can be used individually or in combination.

It is generally preferred that the above dehydrating agent, especially the inorganic dehydrating agent, be added in an amount of 0.02 to 100 parts by weight, especially 0.2 to 50 parts by weight, per 100 parts by weight of (poly)oxyalkylene block silyl ester copolymer A.

Further, it is generally preferred that such inorganic dehydrating agents, in total, be contained in an amount of 0.01 to 10% by weight, especially 0.1 to 5% by weight, based on the antifouling coating composition. When the inorganic dehydrating agents are contained in the antifouling coating composition in the above amount, the storage stability thereof tends to be increased.

Leaching Accelerating Component (E)

The antifouling coating composition of the present invention may contain a leaching accelerating component (E). The leaching accelerating component (E) can be, for example, any of rosins, rosin derivatives, organic carboxylic acids and metal salts of organic carboxylic acids.

Examples of the rosins include gum rosin, wood rosin and tall oil rosin. All of these can be used in the present invention. Examples of the rosin derivatives include disproportionated rosin, low-melting-point disproportionated rosin, hydrogenated rosin, polymerized rosin, maleic rosin, aldehyde-modified rosin, polyoxyalkylene esters of rosin, reduced rosin (rosin alcohol), metal salts of rosin (e.g., copper, zinc, magnesium and potassium salts of rosin) and rosin amine. These rosins and derivatives thereof can be used individually or in combination.

As the organic carboxylic acids, there can be mentioned, for example, natural and synthetic fatty acids having about 5 to 30 carbon atoms. Examples of the organic carboxylic acids include pivalic acid, lauric acid, stearic acid, oleic acid, isononanoic acid, versatic acid, tall oil fatty acid, isostearic acid, naphthenic acid, 2-ethylhexanoic acid, coconut oil fatty acid and soybean fatty acid. Examples of the metal salts of organic carboxylic acids include copper, zinc, magnesium and calcium salts of the above acids.

Among these leaching accelerating components, rosins and rosin derivatives are preferred. These leaching accelerating components can be used individually or in combination.

It is preferred that these leaching accelerating components be contained in an amount of 0.1 to 30 parts by weight, especially 0.1 to 20 parts by weight, and still especially 0.5 to 15 parts by weight, per 100 parts by weight of antifouling coating composition. The content of leaching accelerating components is preferred to fall within these ranges from the viewpoint of coating film strength, antifouling performance and water resistance.

Per 100 parts by weight of (poly)oxyalkylene block silyl ester copolymer A contained in the antifouling coating composition, it is generally preferred that the leaching accelerating components, in total, be contained in an amount of 0.3 to 600 parts by weight, especially 2 to 300 parts by weight.

When the content of leaching accelerating components in the antifouling coating composition is within these ranges, the antifouling performance and coating film consumability tend to be improved.

Vinyl Ether (Co)polymer (F)

The vinyl ether (co)polymer, when added to the antifouling coating composition of the present invention, contributes to enhancement of the cracking resistance, peeling resistance and leaching velocity stability of obtained coating film and further functions as a coating film forming component.

The vinyl ether (co)polymer can be, for example, any of polyvinyl methyl ether, polyvinyl ethyl ether, polyvinyl isopropyl ether and polyvinyl isobutyl ether.

It is generally preferred that the vinyl ether (co)polymer (F) in total be contained in an amount of 0.1 to 10 parts by weight, especially 0.2 to 5 parts by weight, per 100 parts by weight of antifouling coating composition. Per 100 parts by weight of silyl ester copolymer A contained in the antifouling coating composition, it is generally preferred that the vinyl ether (co)polymer be contained in an amount of 0.3 to 60 parts by weight, especially 0.6 to 40 parts by weight.

Moreover, various polymers having a hydrophilic group can be used in place of the vinyl ether (co)polymer or together with the vinyl ether (co)polymer. The polymers having a hydrophilic group can be, for example, various (alkoxy)polyalkylene glycol mono(meth)acrylate (co) polymers such as (methoxy)polyethylene glycol mono (meth)acrylate (co)polymer. The same effect as exerted by the vinyl ether (co)polymer can be realized by the use of these polymers.

Plasticizer (G)

As the plasticizer, there can be employed plasticizers customarily used in paints, such as orthophosphoric acid esters, chlorinated paraffin, phthalic acid esters and adipic acid esters. These plasticizers can be used individually or in combination.

When these plasticizers are used, they are added to the antifouling coating composition in an amount of, for example, 0.1 to 10% by weight.

These plasticizers contribute to enhancement of the cracking resistance of coating film (also referred to as "antifouling coating film" herein) formed from the resultant antifouling coating composition. Among the above plasticizers, chlorinated paraffin and orthophosphoric acid esters such as tricresyl phosphate (TCP) are preferred.

The chlorinated paraffin may be linear or branched, and may be liquid or solid (powdery) at room temperature. As the chlorinated paraffin, there can be mentioned, for example, "Toyoparax 150" and "Toyoparax A-70" produced by Tosoh Corporation. In the present invention, two or more chlorinated paraffins which are different from each other in chlorine content and number of carbon atoms can be used in appropriate combination. When two or more chlorinated paraffins are used in combination, the number of carbon atoms and chlorination ratio of chlorinated paraffin refer to averages of the respective numbers of carbon atoms or chlorination ratios of chlorinated paraffins contained in the antifouling coating composition.

When the above chlorinated paraffin is used as the plasticizer (G), it is generally preferred that the chlorinated paraffin be contained in an amount of 0.05 to 20 parts by weight, especially 0.1 to 15 parts by weight, per 100 parts by weight of antifouling coating composition. Per 100 parts by weight of silyl ester copolymer A contained in the antifouling coating composition, it is preferred that the chlorinated paraffin be contained in an amount of 1 to 50 parts by weight, especially 2 to 40 parts by weight. When the amount of chlorinated paraffin is within these ranges, the effect of suppressing coating film cracking, coating film strength and damaging (impact) resistance are enhanced.

When an orthophosphoric ester is used as the plasticizer (G), it is generally preferred that the orthophosphoric ester be contained in an amount of 0.05 to 20 parts by weight, especially 0.1 to 15 parts by weight, per 100 parts by weight of antifouling coating composition.

Per 100 parts by weight of silyl ester copolymer A contained in the antifouling coating composition, it is preferred that the orthophosphoric ester be contained in an amount of 1 to 50 parts by weight, especially 2 to 40 parts by weight.

When the orthophosphoric ester is contained as the plasticizer (G), a coating which hardly cracks and peels can be formed, and the consumability of coating film can be enhanced.

Dehydrating Agent (H)

This antifouling coating composition may be loaded with an inorganic or organic dehydrating agent. The antifouling coating composition loaded with a dehydrating agent exhibits an enhanced storage stability.

The dehydrating agent can be, for example, any of anhydrous gypsum ($CaSO_4$), synthetic zeolite adsorbents (trade name: Molecular Sieve), orthoesters such as methyl orthoformate and methyl orthoacetate, orthoboric esters, silicates and isocyanates (trade name: Additive TI). In particular, anhydrous gypsum and Molecular Sieve are preferably used as the inorganic dehydrating agent (H). Such dehydrating agents can be used individually or in combination.

It is generally preferred that the above dehydrating agent be added in an amount of 0.02 to 100 parts by weight, especially 0.2 to 50 parts by weight, per 100 parts by weight of (poly)oxyalkylene block silyl ester copolymer A.

Further, it is generally preferred that such dehydrating agents, in total, be contained in an amount of 0.01 to 20% by weight, especially 0.1 to 8% by weight, based on the antifouling coating composition. When the dehydrating agents are contained in the antifouling coating composition in the above amount, the storage stability thereof tends to be increased.

Other Component

The antifouling coating composition of the present invention may be loaded with the following components, other than the above components, for example, an antisagging/ antisetting agent, various pigments such as a color pigment and a body pigment, various resins such as acrylic resins (excluding the above vinyl ether (co)polymer) and various additives such as a defoamer, an antiflooding agent and a leveling agent.

Antisagging/Antisetting Agent

The antifouling coating composition may be loaded with conventional antisagging/antisetting agents in arbitrary amounts. Examples of suitable antisagging/antisetting agents include salts such as Al, Ca and Zn stearates, lecithinates and alkylsulfonates, polyethylene wax, hydrogenated castor oil wax, polyamide wax, mixtures of these waxes, synthetic particulate silica and polyethylene oxide wax. Of these, hydrogenated castor oil wax, polyamide wax, synthetic particulate silica and polyethylene oxide wax are preferred. Further, use can be made of antisagging/antisetting agents commercially available by the trade names, for example, "Disparlon A-603-20X" and "Disparlon 4200-20", which are produced by Kusumoto Chemicals, Ltd.

Pigment and Solvent

Various conventional organic and inorganic pigments (e.g., titanium white, red iron oxide, organic red pigments and talc) can be used as the pigment in the antifouling coating composition. In addition, various colorants such as dyes may be incorporated in the antifouling coating composition.

The cracking resistance of coating film can be enhanced by the use of pigments with needle, flat and flake forms.

Various solvents customarily used in antifouling paints, such as aliphatic, aromatic (e.g., xylene and toluene), ketone, ester and ether solvents, can be incorporated in the antifouling coating composition. The solvent used in the preparation of silyl ester copolymer may be contained in the solvent.

Various Resins

Examples of suitable resins include an acrylic resin, a chlorinated polyolefin resin, a chlorinated rubber resin, a petroleum resin, a vinyl chloride resin, a vinyl acetate resin, a polystyrene resin, a butyral resin and an ionomer resin.

Production of Antifouling Coating Composition

The antifouling coating composition of the present invention can be produced by appropriately employing customary techniques. For example, the antifouling coating composition can be obtained by subjecting the (poly)oxyalkylene block silyl ester copolymer A and, per 100 parts by weight of (poly)oxyalkylene block silyl ester copolymer (A), 3 to 1400 parts by weight of copper and/or a copper compound (B), 0.07 to 1200 parts by weight of an organic antifouling agent (C), 2 to 700 parts by weight of zinc oxide (D), 0 to 600 parts by weight of a leaching accelerating component (E), 0.3 to 200 parts by weight of a vinyl ether (co)polymer (F), 1 to 50 parts by weight of a plasticizer (G), 0.03 to 200 parts by weight of a dehydrating agent (e.g., anhydrous gypsum and Molecular Sieve) (H) and appropriate amounts of an antisagging/antisetting agent, a pigment, a solvent, etc. to addition conducted once or in arbitrary sequence and to agitation, mixing, dispersion, etc.

The thus obtained antifouling coating composition is of the one package type and has excellent storage stability. Further, the antifouling coating composition satisfies various requirements for performance such as antifouling coating adherence, durability and antifouling properties.

For example, hulls and marine structures covered with an antifouling coating film having excellent cracking resistance and antifouling properties can be obtained by applying the above antifouling coating composition to the surface of various shaped items (bases), such as an underwater/floating structure, namely, a marine structure (e.g., plumbing port of a nuclear power station), a sludge diffusion preventive film for use in various ocean civil works for a bayshore road, an undersea tunnel, port facilities, a canal/channel, etc., a marine vessel and a fishing gear (e.g., a rope and a fishing net), once or a plurality of times according to the customary procedure, and drying the applied antifouling coating composition. This antifouling coating compositions may be directly applied to the surface of hulls and marine structures, or applied to the surface of hulls and marine structures precoated with an undercoating material such as a rust preventive or a primer. Moreover, the antifouling coating composition of the present invention may be applied as a top coat for repair to the surface of hulls and marine structures previously coated with the conventional antifouling paint or the antifouling coating composition of the present invention. Although the thickness of the antifouling coating thus formed on the surface of hulls and marine structures is not particularly limited, for example, it ranges from about 30 to 150 $\mu$m for each application.

Effect of the Invention

The (poly)oxyalkylene block silyl ester copolymer of the present invention, when used in an antifouling paint, is excellent in self-polishing properties (consumability) and long-term antifouling performance, especially long-term antifouling performance in highly fouling sea area, and also excellent in coating cracking resistance and peeling resistance. Moreover, the (poly)oxyalkylene block silyl ester copolymer, because of the containing of block units derived from a mercapto compound, enables reduction of the use of solvents, thereby exhibiting such excellent performance as enhanced coating efficiency (i.e., enhanced sprayability, roller applicability and brush applicability).

According to the present invention, there is provided an antifouling coating composition which enables forming such an antifouling coating as exhibits less cracking tendency, excellent adherence so as to ensure less peeling tendency and desirably controlled hydrolysis rate so as to be excellent in antifouling properties, in particular, antifouling properties in highly fouling environment and long-term antifouling properties, which antifouling coating film is further excellent in a balance of these properties.

Further, according to the present invention, there is provided a coating film with the above excellent properties, and provided a hull or underwater structure covered with the coating film to thereby have the above excellent properties.

Still further, according to the present invention, there is provided an antifouling method wherein the above antifouling coating composition is employed to thereby enable rendering the danger of environmental pollution extremely low.

EXAMPLE

The present invention will further be illustrated below with reference to the following Examples which in no way limit the scope of the invention. In the following Examples and Comparative Examples, the term "parts" means "parts by weight".

Example 1

(poly)oxyalkylene Block Silyl Ester Copolymer (BP-1)

100 parts of xylene was charged in a reaction vessel equipped with an stirrer, a condenser, a thermometer, a dropping device, a nitrogen introduction tube and a heating/cooling jacket, and heated under stirring at 85° C. while blowing nitrogen thereinto. A mixture of 40 parts of triisopropylsilyl acrylate, 55 parts of methyl methacrylate, 1.5 parts of mercapto compound M-1 defined below and 1 part of 2,2'-azobisisobutyronitrile as an initiator was dropped through the dropping device into the reaction vessel while maintaining the above temperature over a period of 2 hr. The stirring was continued at the same temperature for 4 hr. Further, 0.4 part of 2,2'-azobisisobutyronitrile was added, and the agitation was continued at the same temperature for 4 hr. Thus, a colorless transparent solution of (poly) oxyalkylene block silyl ester copolymer (BP-1) was obtained.

The heating residue (residue resulting from drying in a hot air dryer at 105° C. for 3 hr) from the obtained solution of (poly)oxyalkylene block silyl ester copolymer (BP-1) amounted to 50.5% by weight. The viscosity at 25° C. thereof was 72 cps, and the weight average molecular weight (Mw) and number average molecular weight (Mn), measured by GPC, of the residue were 5603 and 2748, respectively.

Figure 2:
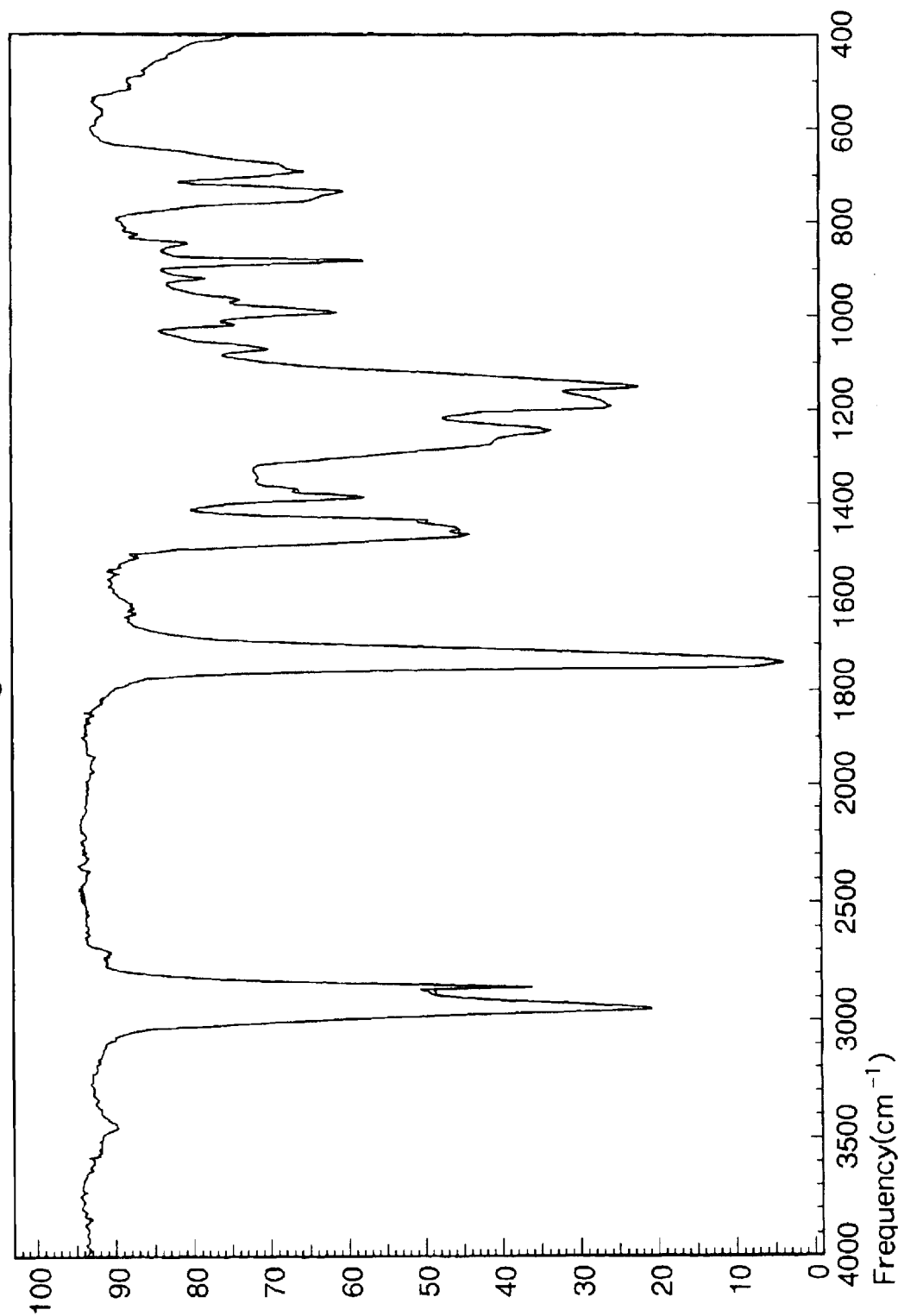
FIG. 2 is an IR spectral chart of silyl ester copolymer BP-1.
Figure 3:
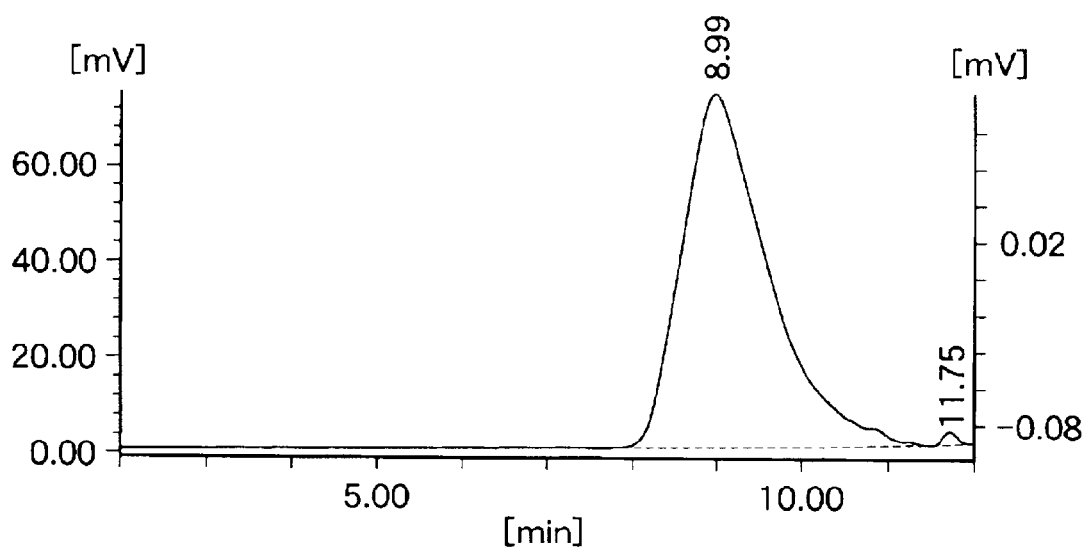
FIG. 3 is a GPC chromatogram of silyl ester copolymer BP-2.
Figure 4:
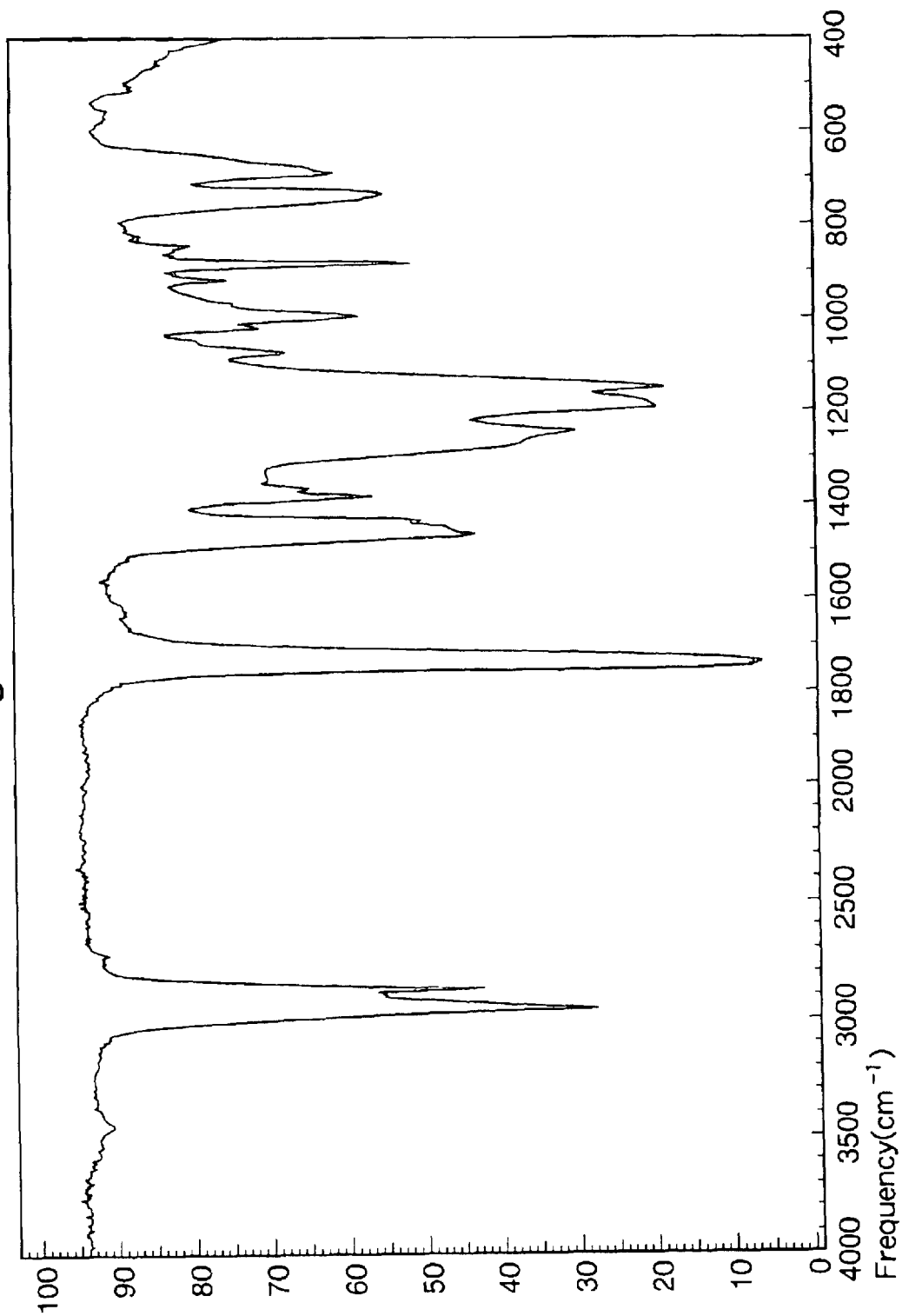
FIG. 4 is an IR spectral chart of silyl ester copolymer BP-2.
Figure 5:
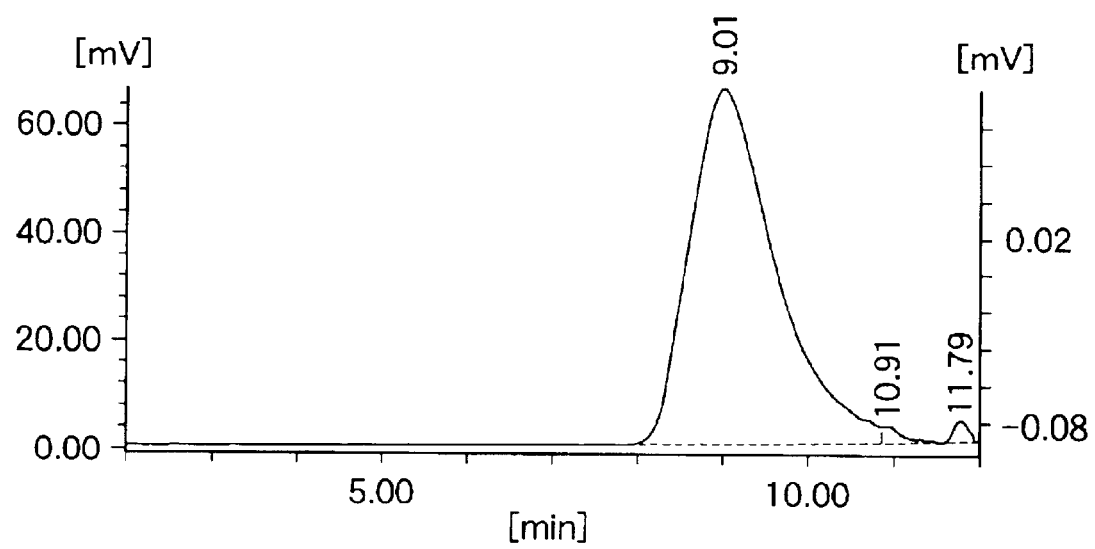
FIG. 5 is a GPC chromatogram of silyl ester copolymer BP-3.
Figure 6:
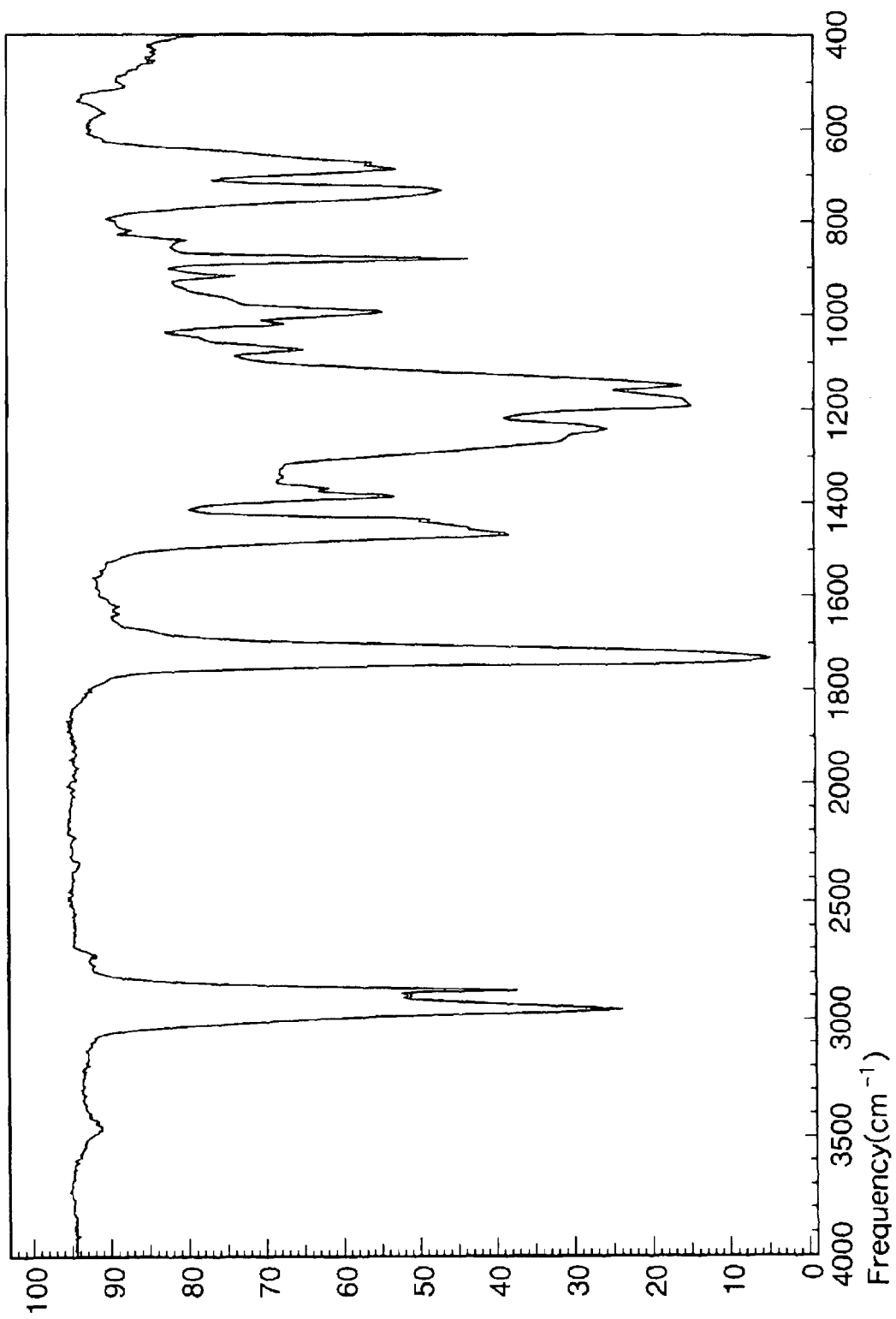
FIG. 6 is an IR spectral chart of silyl ester copolymer BP-3.
Figure 7:
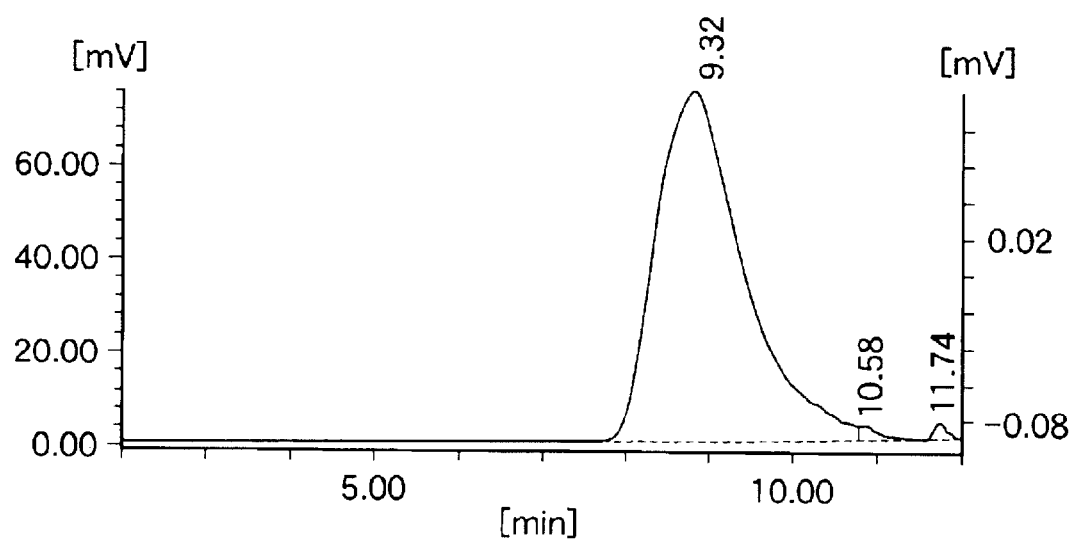
FIG. 7 is a GPC chromatogram of silyl ester copolymer BP-4.
Figure 8:
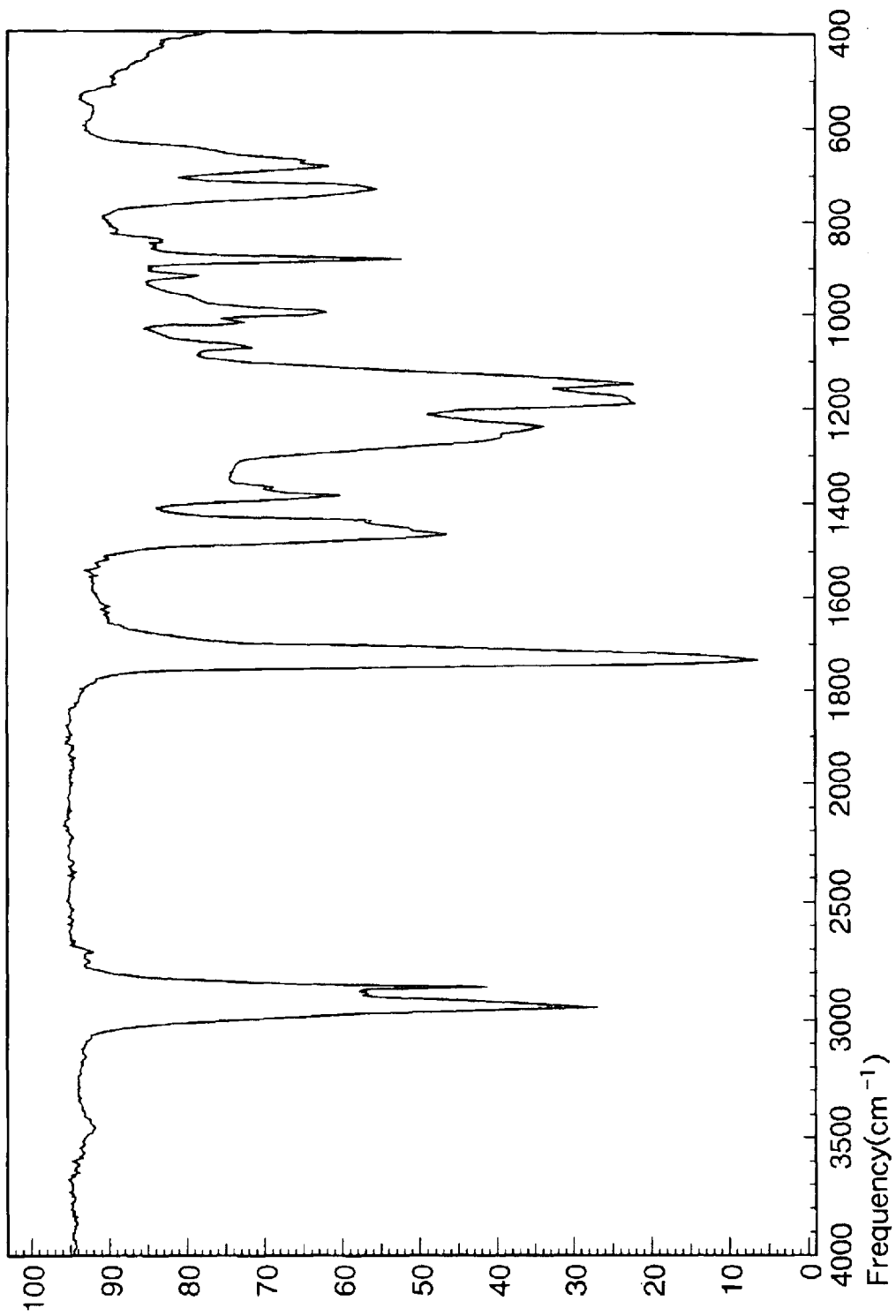
FIG. 8 is an IR spectral chart of silyl ester copolymer BP-4.
Figure 9:
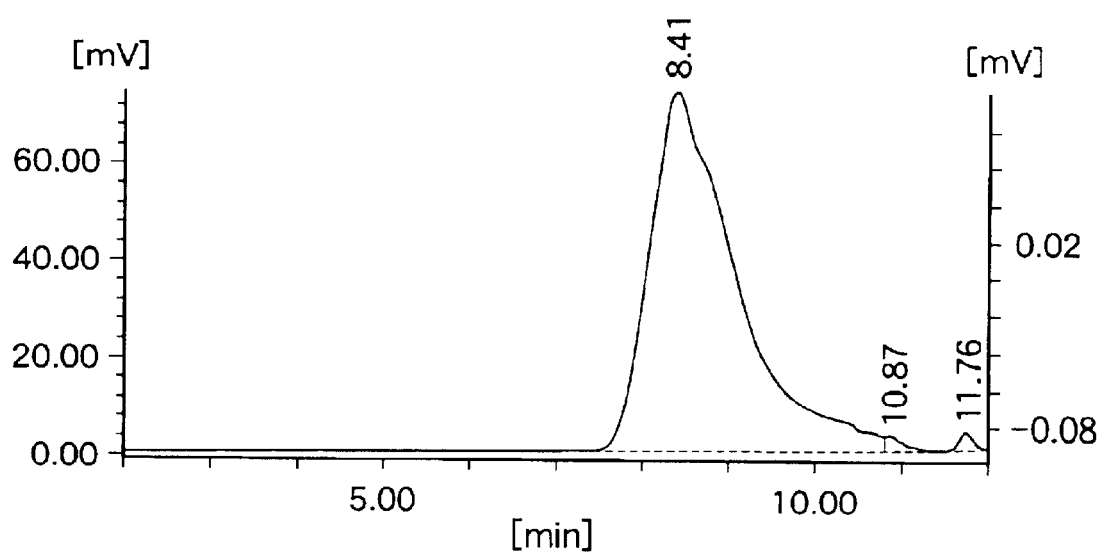
FIG. 9 is a GPC chromatogram of silyl ester copolymer BP-5.
Figure 10:
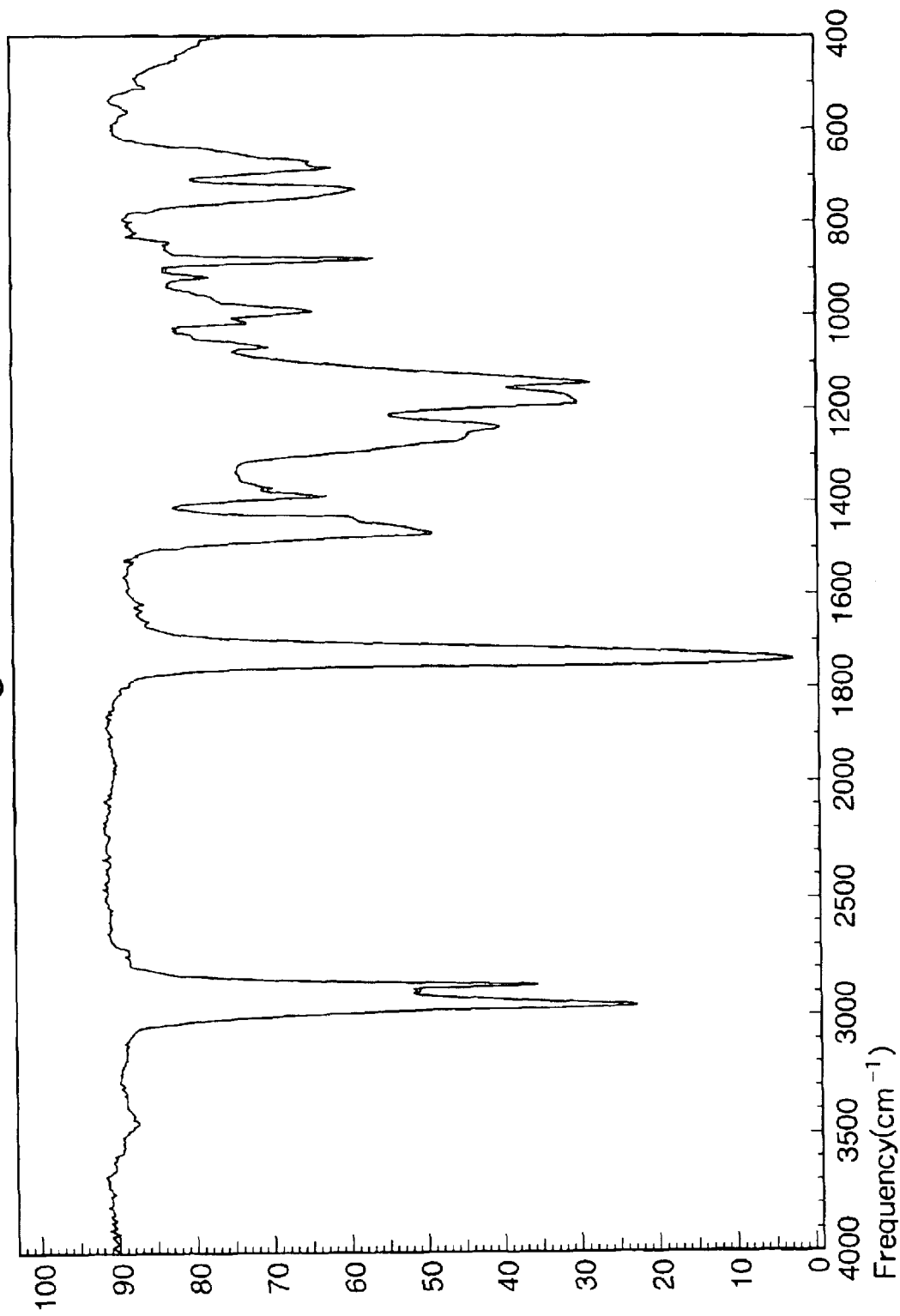
FIG. 10 is an IR spectral chart of silyl ester copolymer BP-5.
Figure 11:
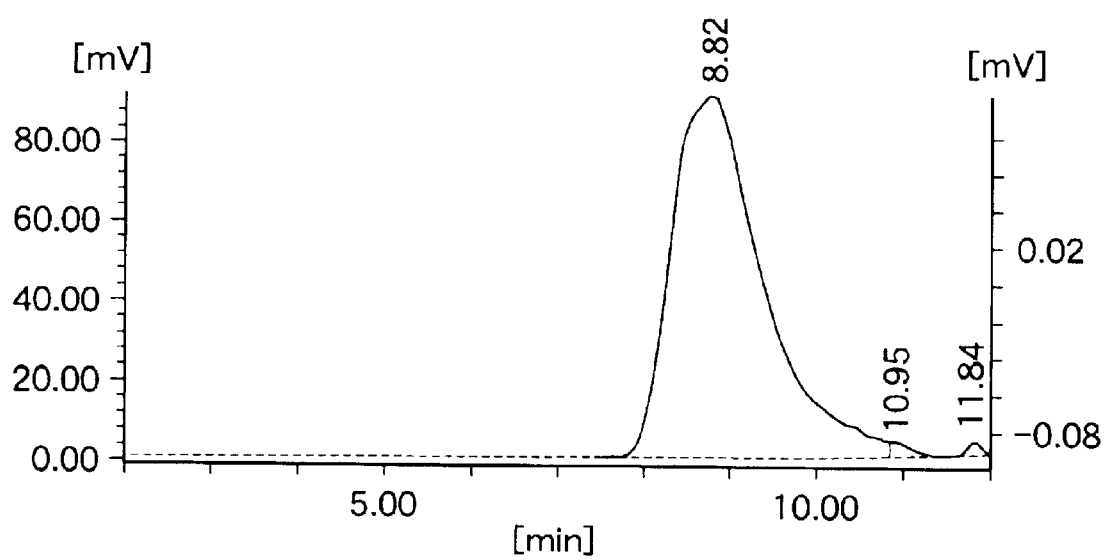
FIG. 11 is a GPC chromatogram of silyl ester copolymer BP-6.
Figure 12:
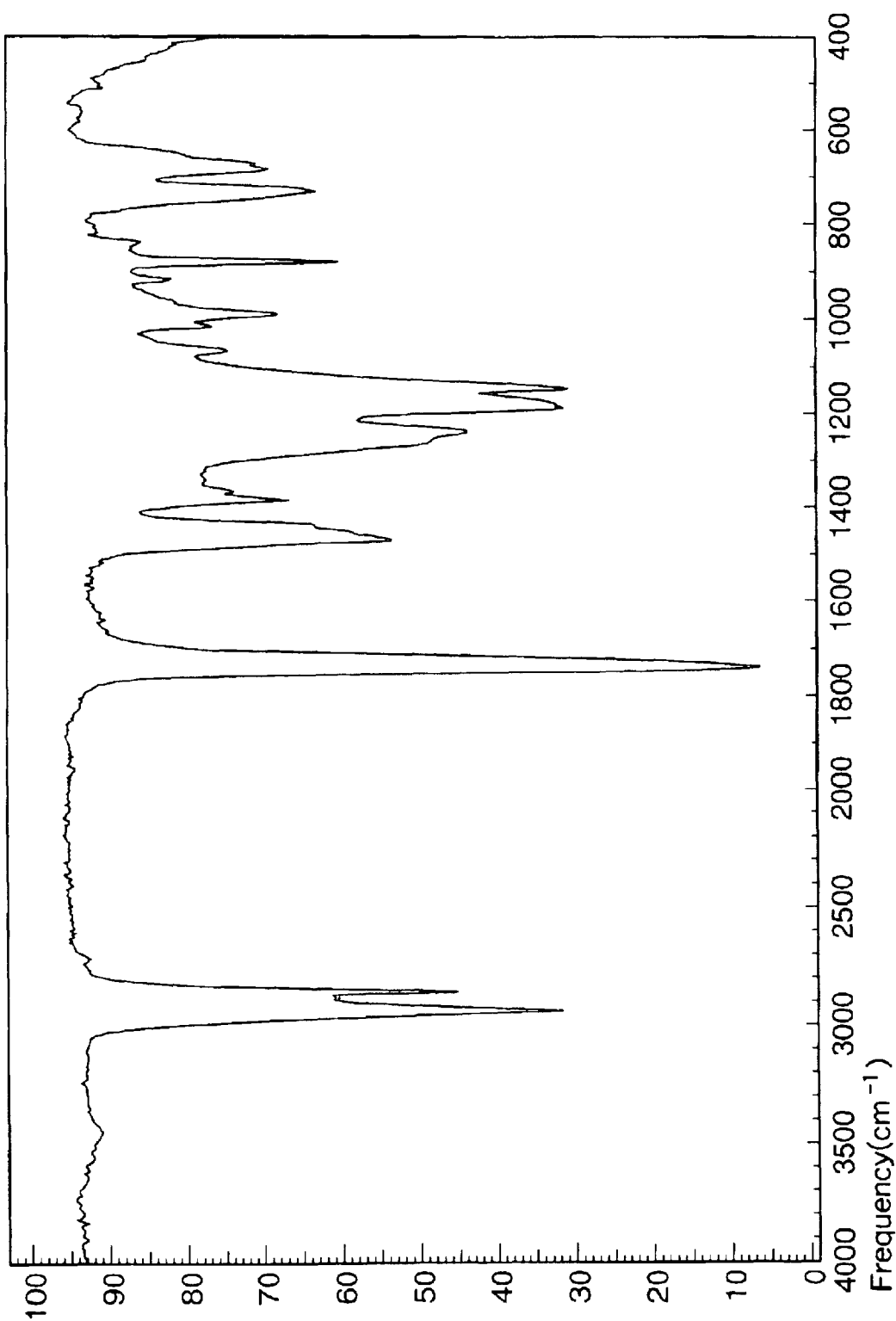
FIG. 12 is an IR spectral chart of silyl ester copolymer BP-6.
Figure 13:
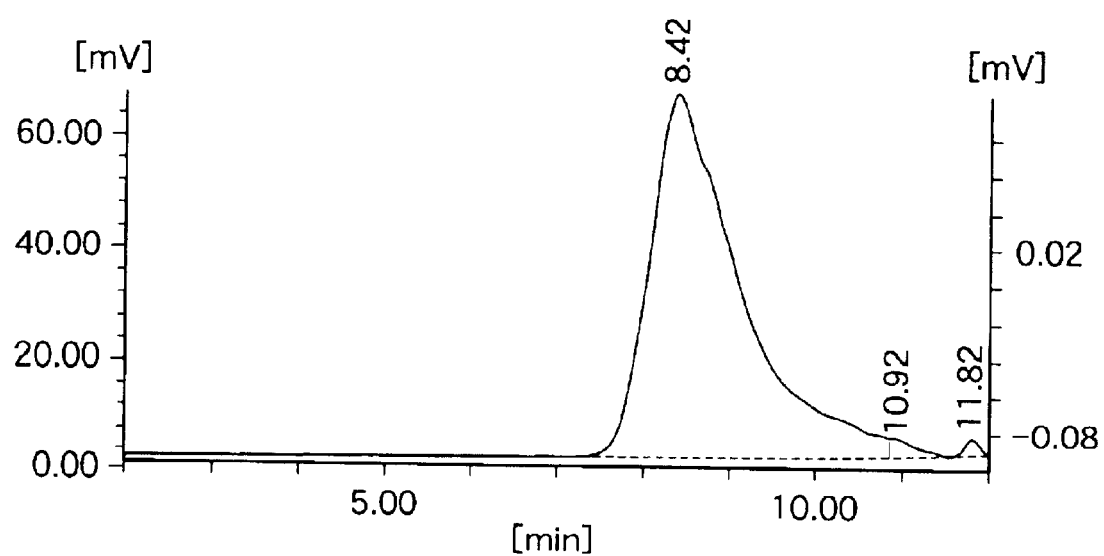
FIG. 13 is a GPC chromatogram of silyl ester copolymer BP-7.
Figure 14:
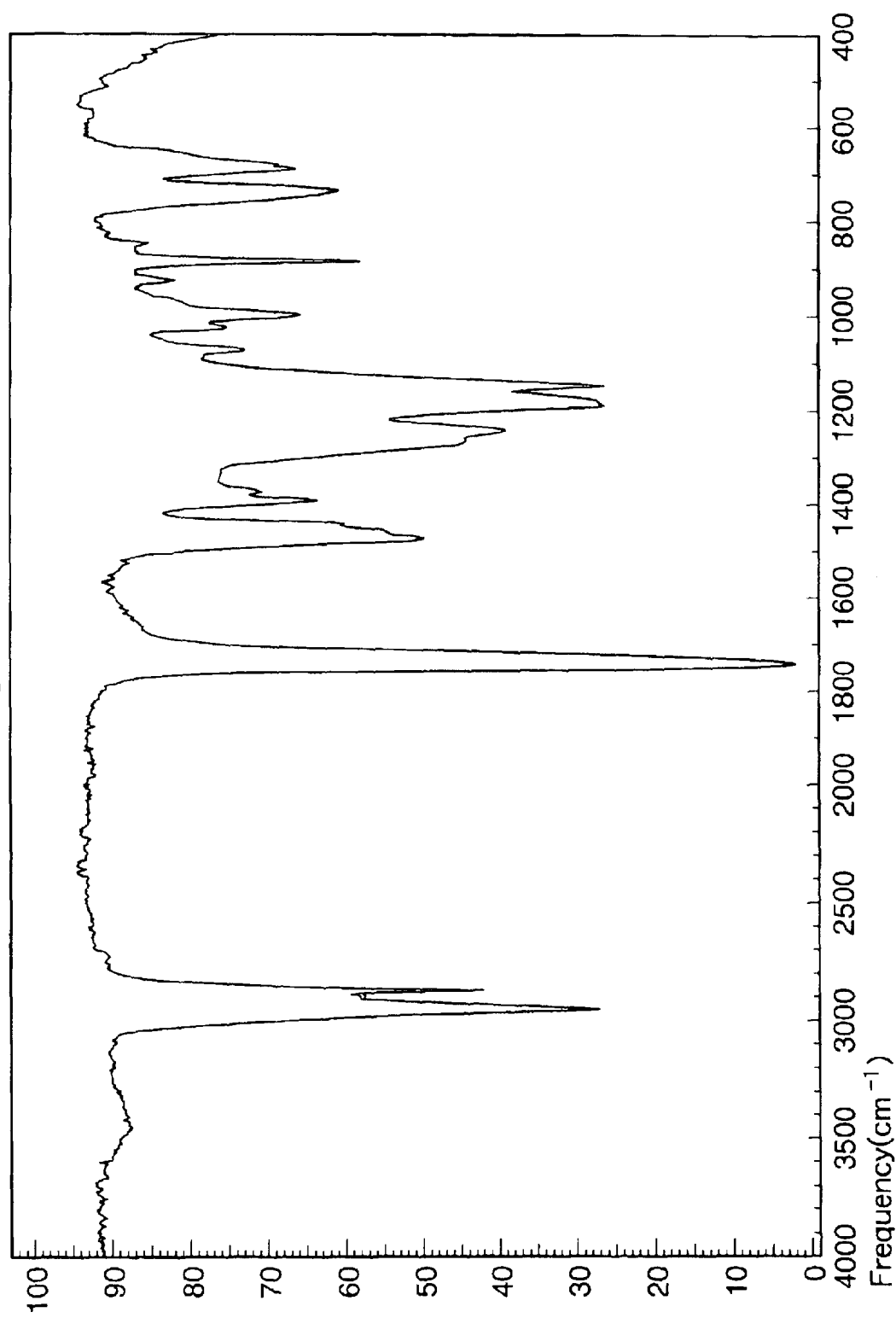
FIG. 14 is an IR spectral chart of silyl ester copolymer BP-7.
Figure 15:
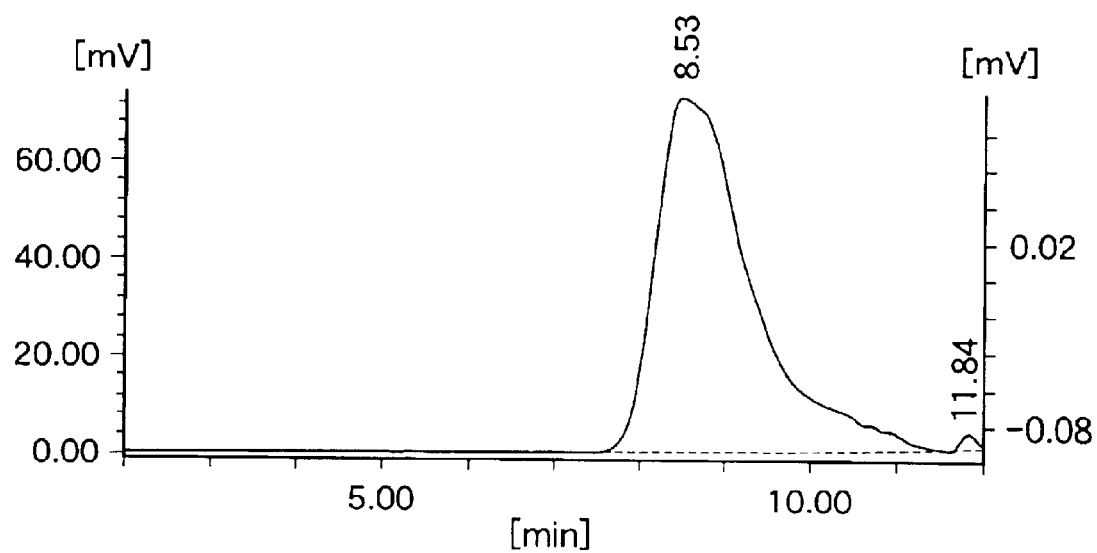
FIG. 15 is a GPC chromatogram of silyl ester copolymer BP-8.
Figure 16:
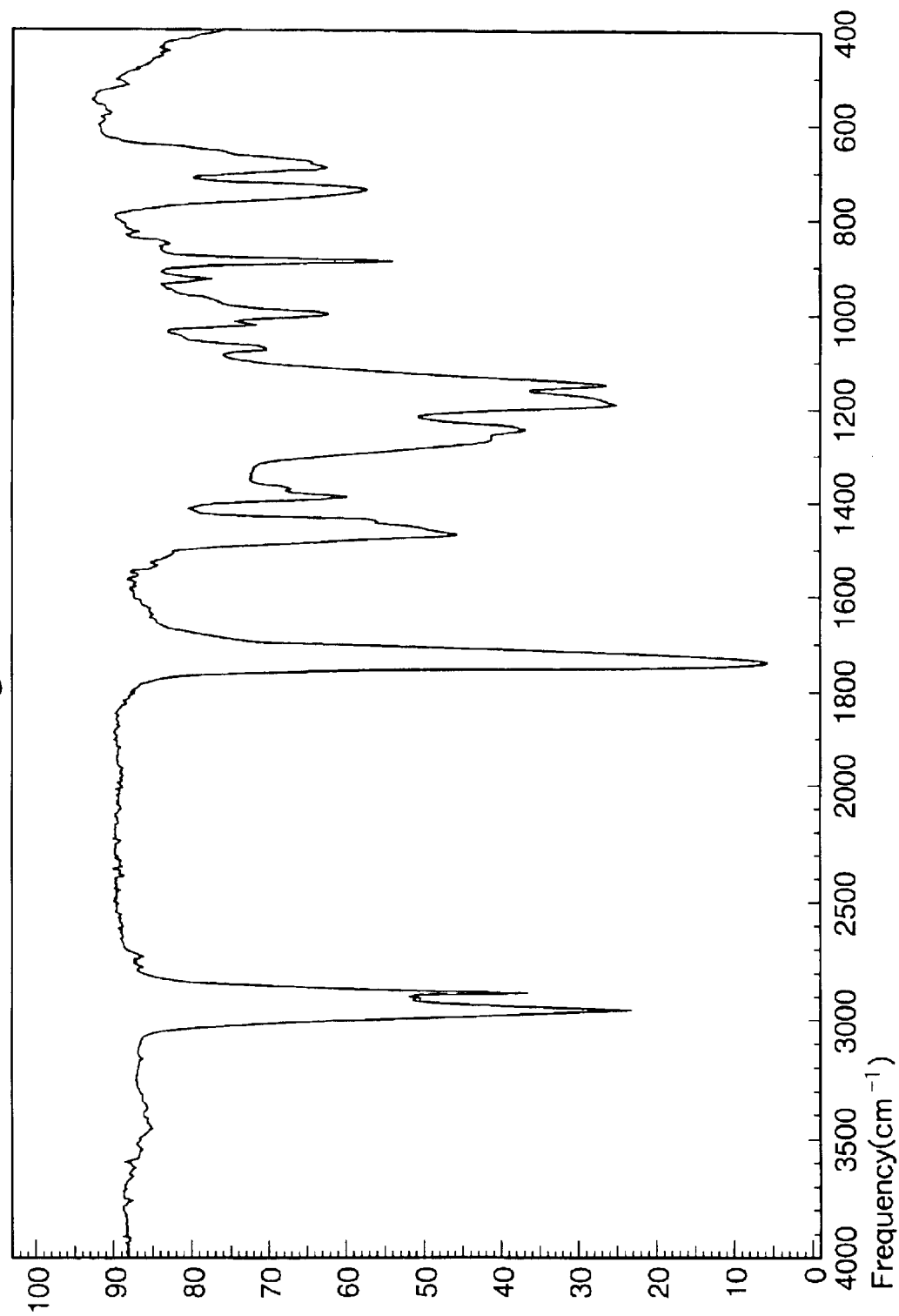
FIG. 16 is an IR spectral chart of silyl ester copolymer BP-8.
Figure 17:
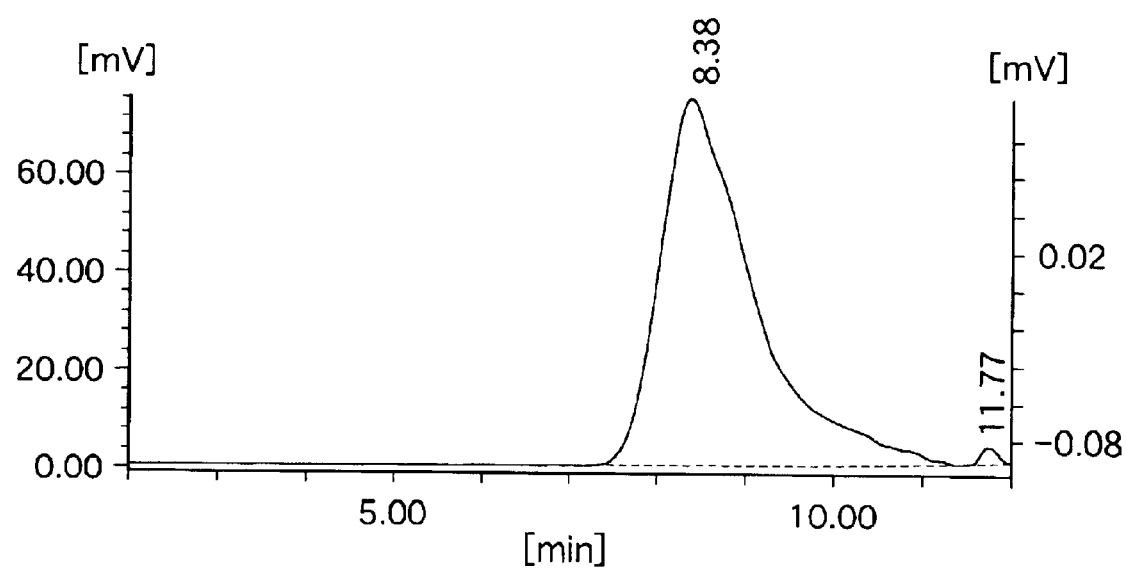
FIG. 17 is a GPC chromatogram of silyl ester copolymer BP-9.
Figure 18:
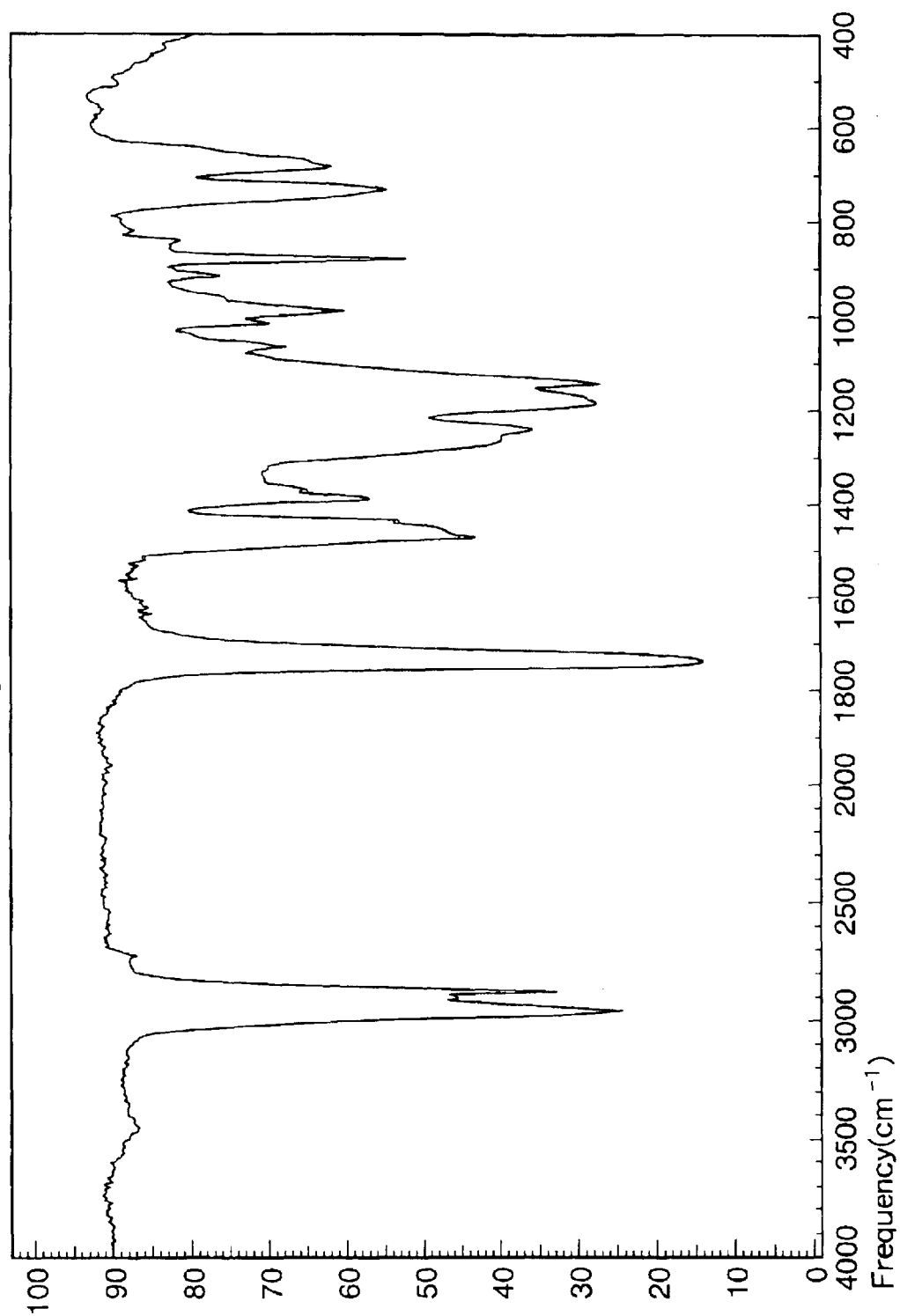
FIG. 18 is an IR spectral chart of silyl ester copolymer BP-9.
Figure 19:
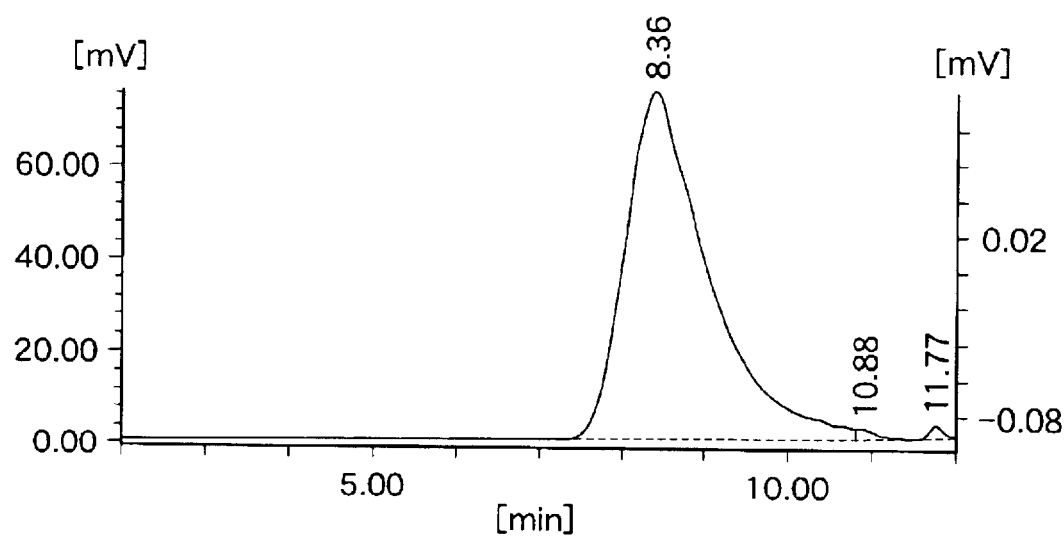
FIG. 19 is a GPC chromatogram of silyl ester copolymer BP-10.
Figure 20:
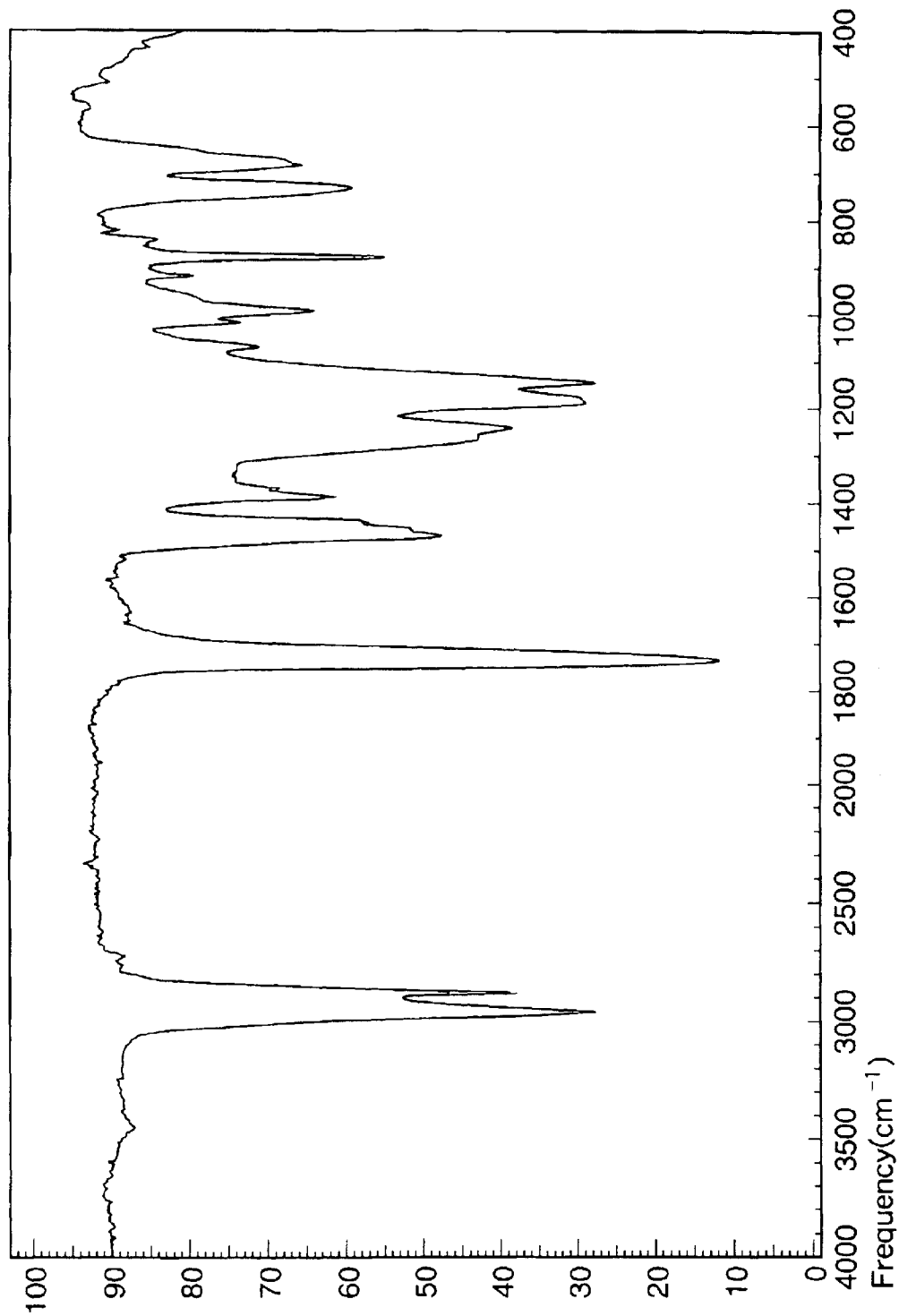
FIG. 20 is an IR spectral chart of silyl ester copolymer BP-10.
Figure 21:
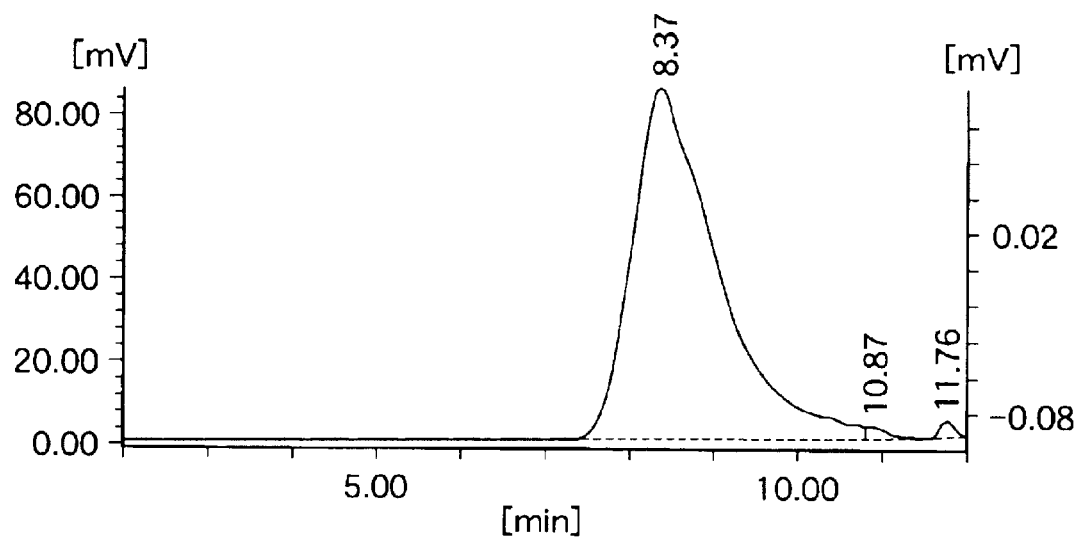
FIG. 21 is a GPC chromatogram of silyl ester copolymer BP-11.
Figure 22:
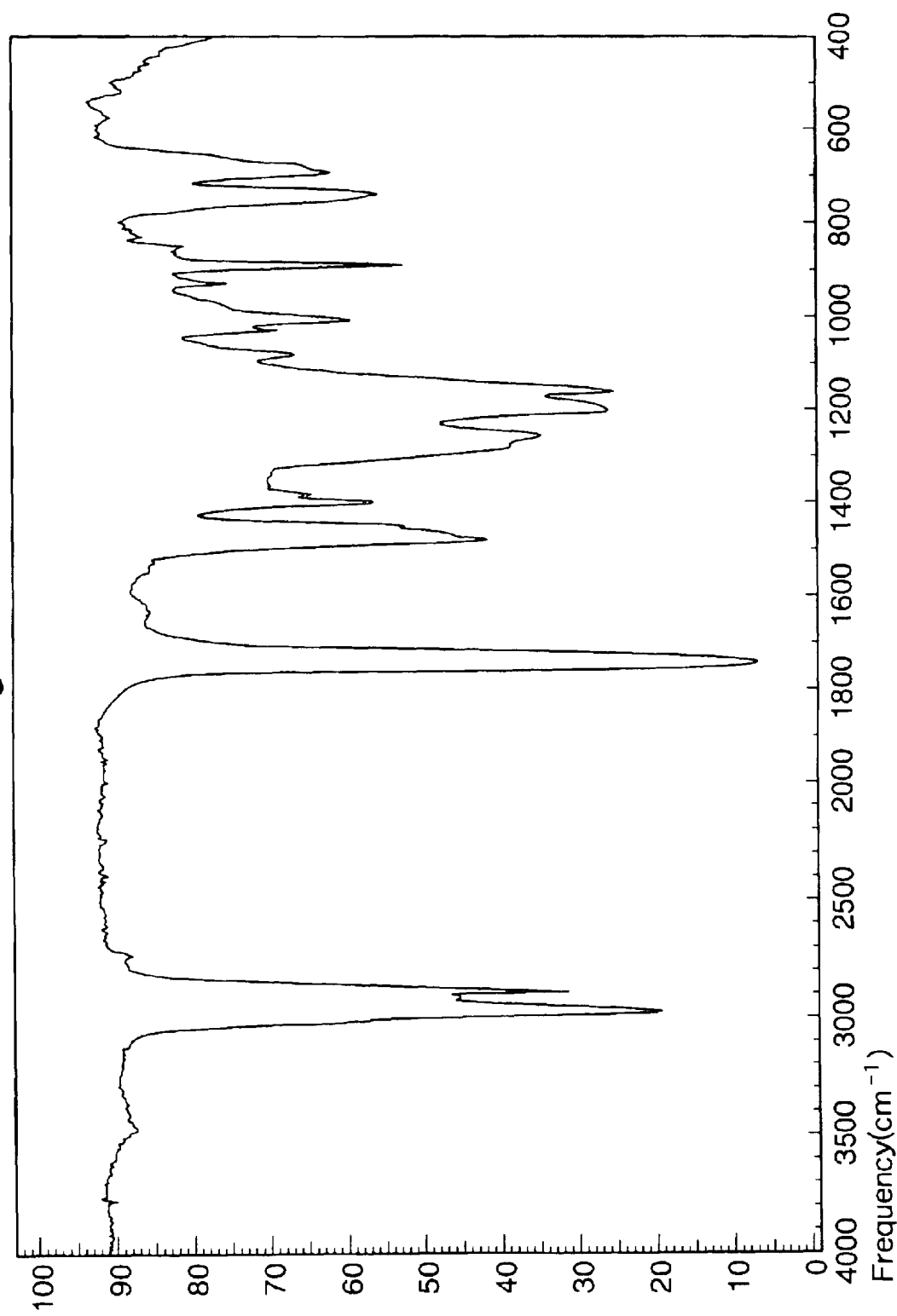
FIG. 22 is an IR spectral chart of silyl ester copolymer BP-11.
Figure 23:
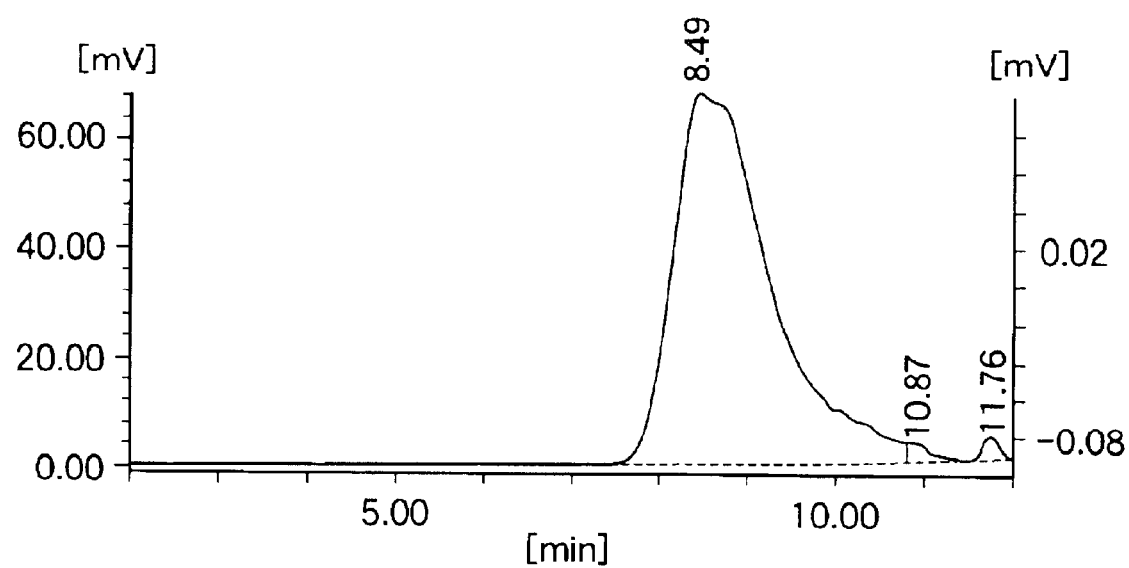
FIG. 23 is a GPC chromatogram of silyl ester copolymer BP-12.
Figure 24:
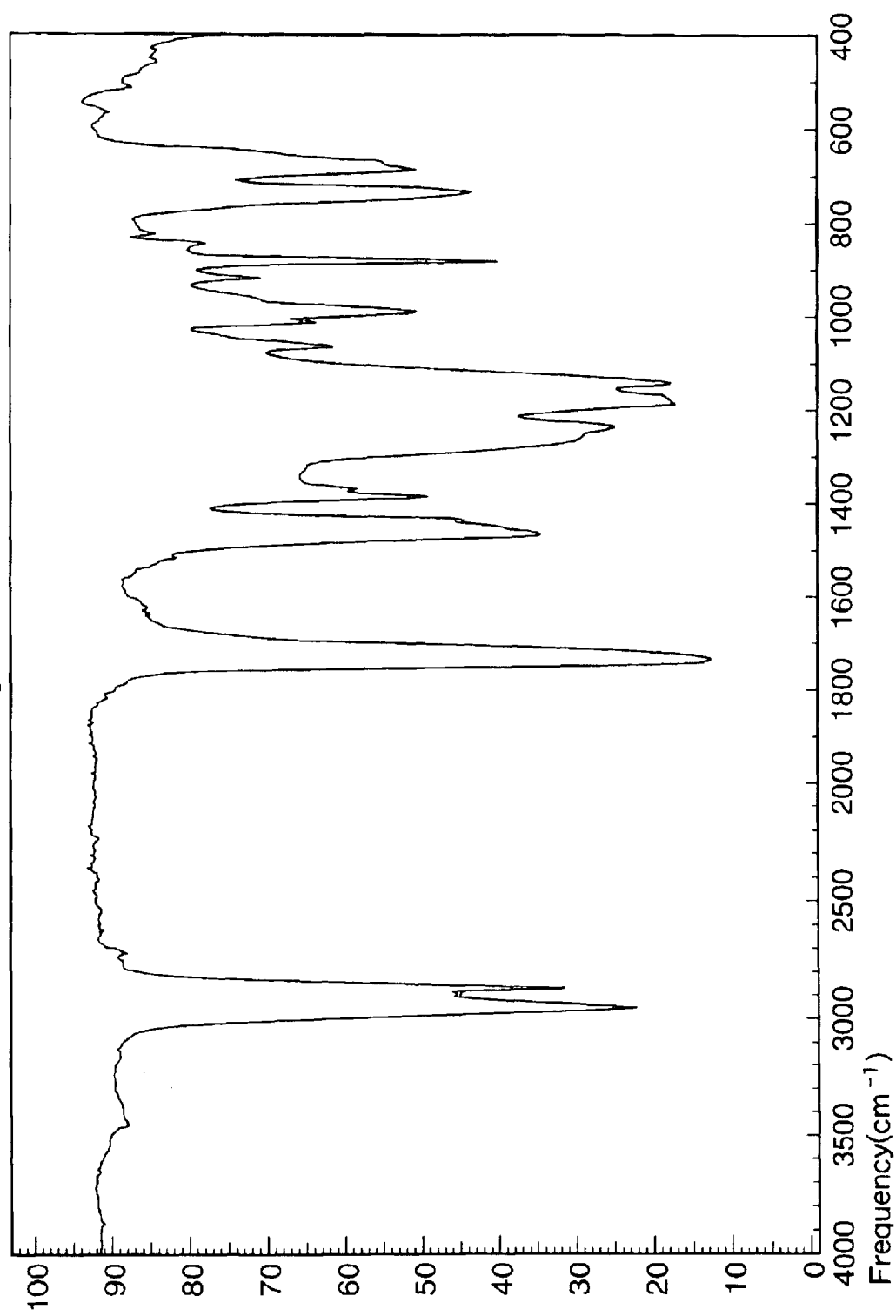
FIG. 24 is an IR spectral chart of silyl ester copolymer BP-12.
Figure 25:
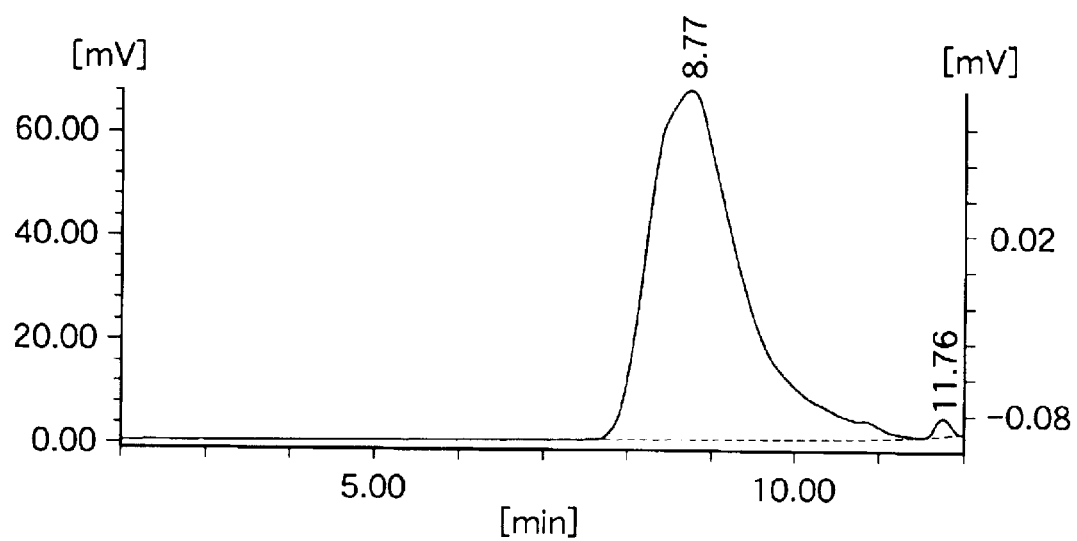
FIG. 25 is a GPC chromatogram of silyl ester copolymer BP-13.
Figure 26:
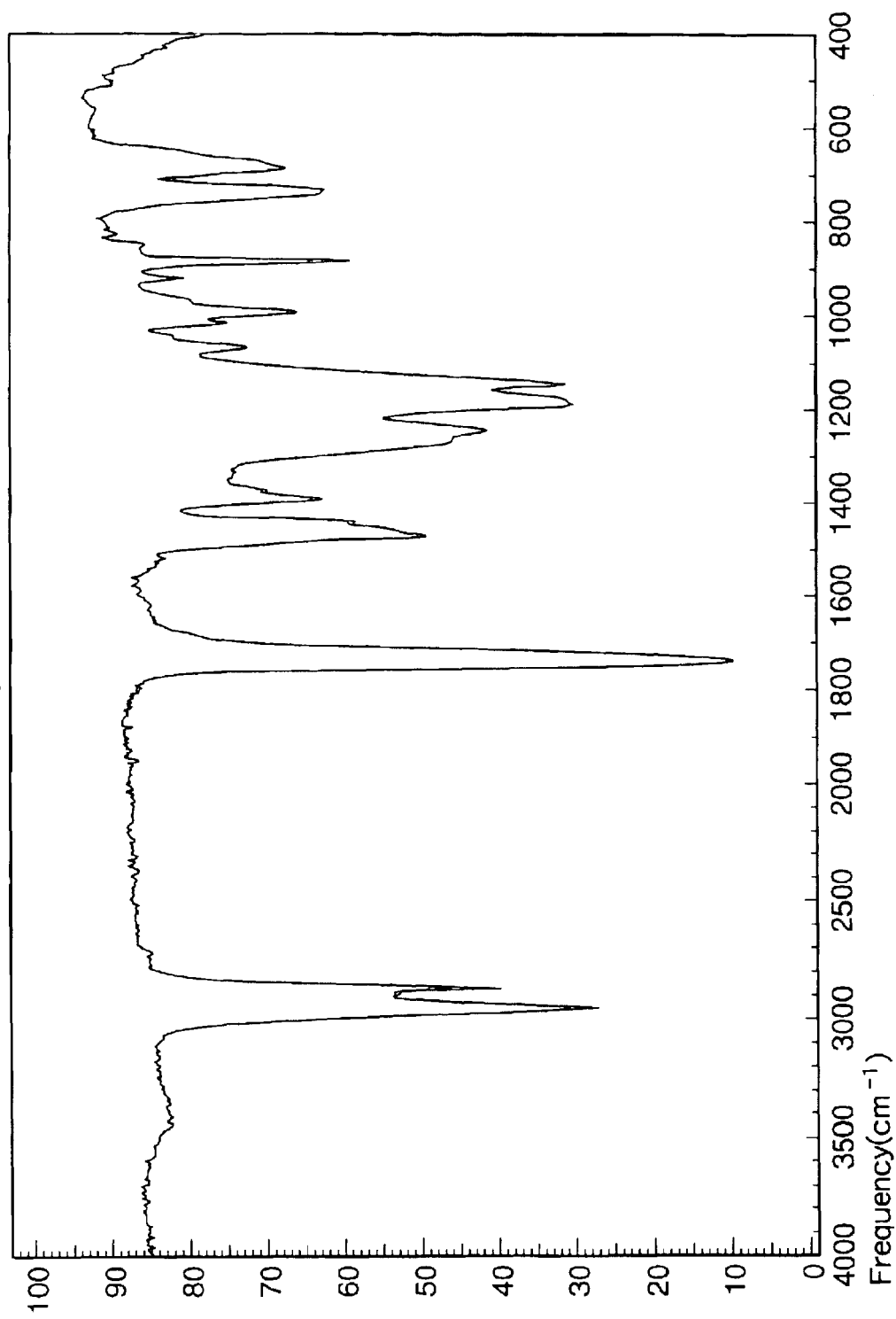
FIG. 26 is an IR spectral chart of silyl ester copolymer BP-13.

GPC chromatogram and IR spectral chart of (poly) oxyalkylene block silyl ester copolymer (BP-1) are given in FIGS. 1 and 2, respectively.

GPC and IR measurements were performed under the following conditions.

(Conditions for GPC measurement)

Instrument: HLC-8120 GPC manufactured by Tosoh Corporation,

Column: Super H2000+H4000, 6 mm inside diameter and 15 cm, manufactured by Tosoh Corporation, Eluant: THF, Flow rate: 0.500 ml/min, Detector: RI, and Temperature of column thermostat: 40° C.

(Conditions for IR measurement)

Instrument: Hitachi infrared spectrophotometer, model 270-30, manufactured by Hitachi, Ltd., and Measuring method: KBr cell, coating method.

Compound M-1:

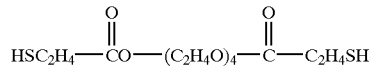

Examples 2 to 20 and Comparative Examples 1 and 2

Copolymers (BP-2) to (BP-20) and Copolymers (H-1) and (H-2)

These (poly)oxyalkylene block silyl ester copolymers (BP-2) to (BP-20) and comparative copolymers (H-1) and (H-2) were produced in the same manner as in the preparation of (poly)oxyalkylene block silyl ester copolymer (BP-1), except that the composition of dropping component mixture was changed as specified in Table 1. The properties of these copolymers (solutions) were also measured in the same manner.

The formulae for mercapto compounds M-2 to M-12 used in the preparation of these copolymers are given below. The results are also specified in Table 1.

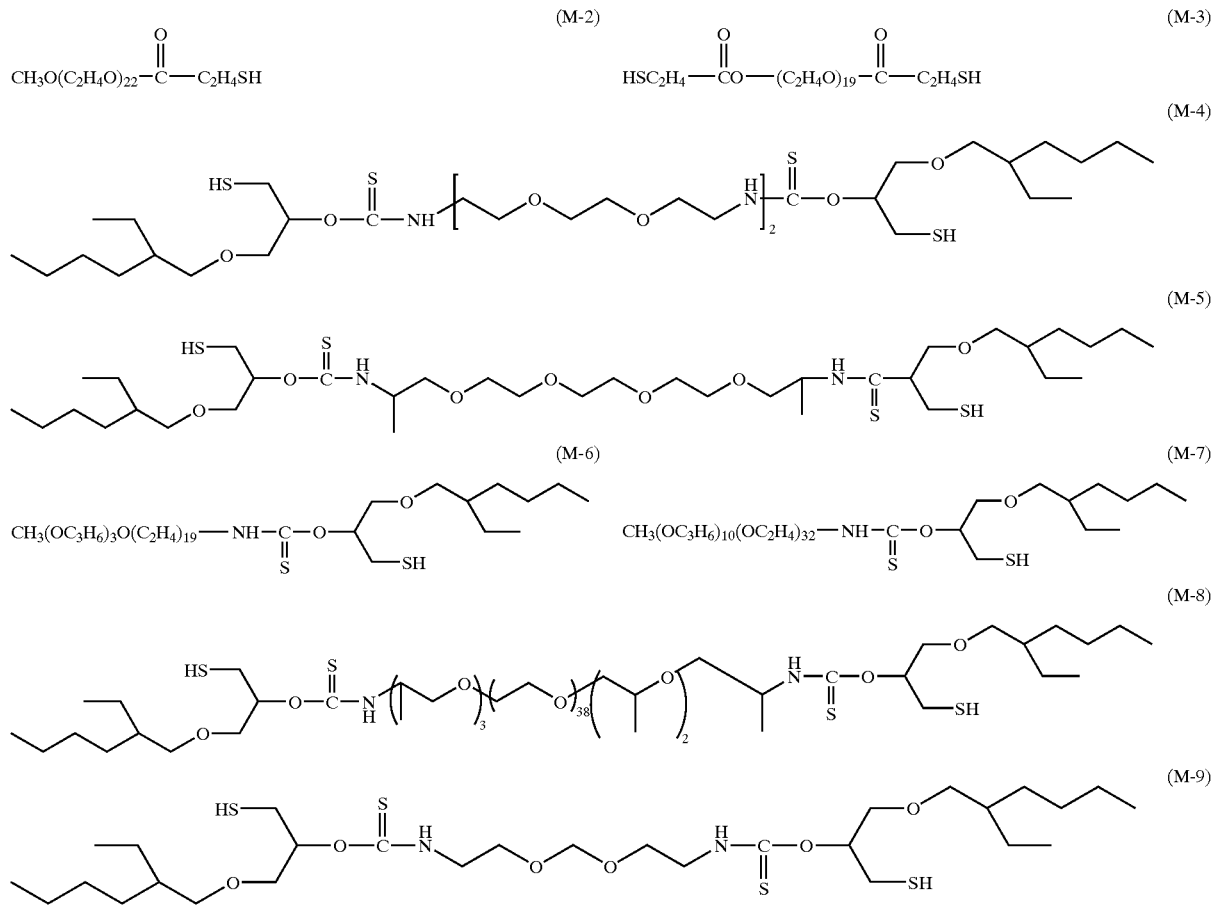

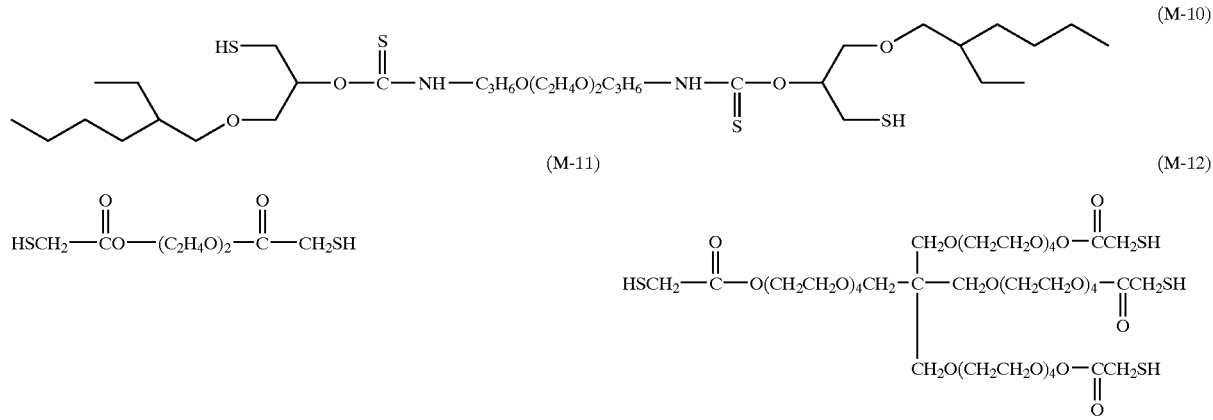

TABLE 1 (1)

| | | | | Example | | | | | | | | | | |
|---|---|---|---|---|---|---|---|---|---|---|---|---|---|---|
| | | | | 1 | 2 | 3 | 4 | 5 | 6 | 7 | 8 | 9 | 10 | 11 |
| dropping component copolymerization component (pts. wt.) | solvent | | xylene | 100 | 100 | 100 | 100 | 100 | 100 | 100 | 100 | 100 | 100 | 100 |
| | silyl ester copolymer (A) | component (a) | triisopropylsilyl acrylate | 40 | 45 | 50 | 50 | 50 | 50 | 50 | 50 | 50 | 50 | 50 |
| | | | triisobutylsilyl methacrylate | | | | | | | | | | | |
| | | | tri-sec-butylsilyl methacrylate | | | | | | | | | | | |
| | | | tri-n-butylsilyl methacrylate | | | | | | | | | | | |
| | | component (b) | methyl methacrylate | 55 | 50 | 45 | 47 | 45 | 45 | 45 | 45 | 45 | 45 | 45 |
| | | | ethyl acrylate | | | | | | | | | | | |
| | | | glycidyl methacrylate | | | | | | | | | | | |
| | | | methoxypolyethylene glycol monomethacrylate (n = 35) | | | | | | | | | | | |
| | | | N-ethoxymethylacrylamide | | | | | | | | | | | |
| | | | 2-hydroxypropyl acrylate | | | | | | | | | | | |
| | | | 2-methoxyethyl acrylete | | | | | | | | | | | |
| | mercapto compd. (B) | | M-1 | 5 | 5 | 5 | 3 | | | | | | | |
| | | | M-2 | | | | | 5 | | | | | | |
| | | | M-3 | | | | | | 5 | | | | | |
| | | | M-4 | | | | | | | 5 | | | | |
| | | | M-5 | | | | | | | | 5 | | | |
| | | | M-6 | | | | | | | | | 5 | | |
| | | | M-7 | | | | | | | | | | 5 | |
| | | | M-8 | | | | | | | | | | | 5 |
| | | | M-9 | | | | | | | | | | | |
| | | | M-10 | | | | | | | | | | | |

TABLE 1 (1)-continued

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| | | M-11 | | | | | | | | | | | |
| | | M-12 | | | | | | | | | | | |
| | | initiator: 2,2'-azobisisobutyronitrile | 1 | 1 | 1 | 1 | 1 | 1 | 1 | 1 | 1 | 1 | 1 |
| | | total | 201 | 201 | 201 | 201 | 201 | 201 | 201 | 201 | 201 | 201 | 201 |
| | | copolymer soln. | BP-1 | BP-2 | BP-3 | BP-4 | BP-5 | BP-6 | BP-7 | BP-8 | BP-9 | BP-10 | BP-11 |
| properties of product | | heating residue (wt %) | 50.5 | 50.2 | 50 | 50.4 | 50.2 | 50.3 | 51 | 50.6 | 50.2 | 50.4 | 50.2 |
| | | viscosity at 25° C. (cps) | 72 | 55 | 46 | 76 | 144 | 89 | 152 | 111 | 154 | 174 | 184 |
| | | Mn | 2748 | 2678 | 2589 | 3281 | 3968 | 3364 | 3683 | 3349 | 4109 | 4505 | 4405 |
| | | Mw | 5603 | 5503 | 5296 | 7775 | 12319 | 8065 | 12095 | 9340 | 13316 | 14296 | 14234 |
| | | Mw/Mn | 2.04 | 2.05 | 2.05 | 2.37 | 3.10 | 2.40 | 3.28 | 2.79 | 3.24 | 3.17 | 3.23 |

TABLE 1 (2)

| | | | | | Example | | | | | | | | Comp. Ex. | |
|---|---|---|---|---|---|---|---|---|---|---|---|---|---|---|
| | | | | | 12 | 13 | 14 | 15 | 16 | 17 | 18 | 19 | 20 | 1 | 2 |
| dropping component copolymerization component (pts. wt.) | solvent | | xylene | | 100 | 100 | 100 | 100 | 100 | 100 | 100 | 100 | 100 | 100 | 100 |
| | silyl ester copolymer (A) | component (a) | triisopropylsilyl acrylate | | 50 | 50 | | | 45 | 45 | 40 | 40 | 45 | 60 | 60 |
| | | | triisobutylsilyl methacrylate | | | | 50 | | | | | | | | |
| | | | tri-sec-butylsilyl methacrylate | | | | | 55 | | | | | | | |
| | | | tri-n-butylsilyl methacrylate | | | | | | | 5 | | | | | |
| | | component (b) | methyl methacrylate | | 45 | 45 | 45 | 40 | 40 | 40 | 52 | 53 | 47 | 40 | 35 |
| | | | ethyl acrylate | | | | | | 5 | | | | | | |
| | | | glycidyl methacrylate | | | | | | | 10 | | | | | |
| | | | methoxypolyethylene glycol monomethacrylate (n = 35) | | | | | | | | | 3 | | | |
| | | | N-ethoxymethylacrylamide | | | | | | | | | | 2 | | |
| | | | 2-hydroxypropyl acrylate | | | | | | | | | | | 3 | |
| | | | 2-methoxyethyl acrylate | | | | | | | | | | | | 5 |
| | mercapto compd. (B) | | M-1 | | | | | | 5 | 5 | 5 | 5 | 5 | | |
| | | | M-2 | | | | | | | | | | | | |
| | | | M-3 | | | | | | | | | | | | |
| | | | M-4 | | | | | | | | | | | | |
| | | | M-5 | | | | | | | | | | | | |
| | | | M-6 | | | | | | | | | | | | |
| | | | M-7 | | | | | | | | | | | | |
| | | | M-8 | | | | | | | | | | | | |
| | | | M-9 | | 5 | | | | | | | | | | |
| | | | M-10 | | | 5 | | | | | | | | | |
| | | | M-11 | | | | 5 | | | | | | | | |
| | | | M-12 | | | | | 5 | | | | | | | |
| | | initiator: 2,2'-azobisisobutyronitrile | | | 1 | 1 | 1 | 1 | 1 | 1 | 1 | 1 | 1 | 1 | 1 |
| | | total | | | 201 | 201 | 201 | 201 | 201 | 201 | 201 | 201 | 201 | 201 | 201 |
| | | copolymer soln. | | | BP-12 | BP-13 | BP-14 | BP-15 | BP-16 | BP-17 | BP-18 | BP-19 | BP-20 | H-1 | H-2 |
| properties of product | | heating residue (wt %) | | | 50.2 | 50.2 | 50.6 | 50.3 | 50.1 | 50.3 | 50.2 | 50.5 | 50 | 50.7 | 49.9 |
| | | viscosity at 25° C. (cps) | | | 110 | 90 | 64 | 58 | 48 | 56 | 69 | 70 | 54 | 183 | 180 |
| | | Mn | | | 3479 | 3402 | 2807 | 3815 | 2592 | 2703 | 2681 | 2705 | 2608 | 5022 | 5012 |
| | | Mw | | | 10119 | 8750 | 5309 | 9150 | 5275 | 5610 | 5573 | 5596 | 5457 | 18749 | 17976 |
| | | Mw/Mn | | | 2.91 | 2.57 | 1.89 | 2.40 | 2.04 | 2.08 | 2.08 | 2.07 | 2.09 | 3.73 | 3.59 |

Examples 21 to 48

Preparation of Antifouling Coating Composition

The components of each of the formulations of Table 2 were charged into a paint shaker packed with glass beads as media, shaken for 2 hr, and filtered through a 100-mesh filter, thereby obtaining the desired antifouling coating compositions.

With respect to each of the antifouling coating compositions, the storage stability exhibited after storage at room temperature for two months was evaluated.

The results are also given in Table 2.

Evaluation of storage stability was made on the basis of an increment of viscosity (Ku value at 25° C. measured by a Stormer viscometer) exhibited by storage at room temperature for two months after the paint production by the following measure.

(Criterion for Evaluation)
5: viscosity increment is less than 10,
4: viscosity increment is in the range of 10 to less than 20,
3: viscosity increment is in the range of 20 to less than 30,
2: viscosity increment is 30 or greater, and
1: there is no fluidity, and measuring of Ku value was impossible.

Furthermore, with respect to each of the antifouling coating compositions, the antifouling performance and consumability were evaluated in the following manners.

The results are also given in Table 2.

Evaluation of Antifouling Performance

There was provided a sandblasted steel plate of 70 ×200×3 mm having been machined to have such a bending that it can be mounted on the side of a rotary drum installed in the seawater in the Bay of Hiroshima.

An epoxy-based zinc-rich primer, an epoxy-based anticorrosive paint and a vinyl binder coat were successively applied in this order to the sandblasted steel plate so that the respective film thicknesses were 20, 150 and 50 µm, respectively, in the dry state. Thereafter, each antifouling coating composition to be tested was radially applied onto the coated steel plate in the radius direction from the center thereof by the use of an applicator with a clearance of 500 µm, and dried indoors for 7 days. Thus, specimen plates were obtained.

This specimen plate was mounted on the rotary drum, and an antifouling test in highly fouling environment for 12 months was carried out by rotating the rotary drum at a peripheral speed of 5 knots and at a 50% operation (alternate operation comprising 12-hr working during the night and 12-hr stop during the daytime).

The antifouling performance was evaluated by visual inspection according to the following criteria.

(Criterion for Evaluation)
5: no adherent matter is observed on the coating surface,
4: thin slime adherence is observed on the coating surface,
3: thick slime adherence is observed on the coating surface,
2: slime adherence and partial adherence of Ectocarpales and other plants are observed on the coating surface, and
1: all the coating surface is covered with Ectocarpales and other plants.

The consumability was investigated under the following conditions.

(Evaluation of Consumability)

An epoxy-based zinc-rich primer, an epoxy-based anticorrosive paint and a vinyl binder coat were applied in this order at an interval of one day to a disk-shaped sandblasted steel plate of 300 mm diameter and 3 mm thickness so that the respective film thicknesses were 20, 150 and 50 µm, respectively, in the dry state. The obtained coated steel plate was dried indoors for 7 days. Thereafter, each antifouling coating composition to be tested was radially applied onto the coated steel plate in the radius direction from the center thereof by the use of an applicator with a clearance of 500 µm, and dried indoors for 7 days. Thus, specimen plates were obtained.

Each of the specimen plates was secured to a motor and rotated in a thermostat filled with 25° C. seawater at a peripheral speed of 15 knots for 12 months. The degree of consumption (decrease of coating film thickness) in the vicinity of the circumference of specimen plates was measured.

The evaluation results are also given in Table 2.

Furthermore, the condition of each coating film at the time of measuring the decrease of coating film thickness was evaluated by visual inspection according to the following criteria.

(Criterion for Evaluation)
5: no abnormality is on the coating,
4: some tiny cracks are observed,
3: tiny cracks are observed overall,
2: some clear cracks are observed, and
1: clear cracks are observed overall.

The evaluation results are also given in Table 2.

Component nomenclatures employed in Table 2 are as follows:

(1) "Toyoparax 150"
chlorinated paraffin produced by Tosoh Corporation, having 14.5 carbon atoms on the average, a chlorine content of 50%, a viscosity of 12 ps at 25° C. and a specific gravity of 1.25 at 25° C.;

(2) "Lutonal A-25"
polyvinyl ethyl ether produced by BASF AG, having a viscosity of 2.5 to 6.0 Pa·s at 23° C. and a specific gravity of 0.96 at 20° C.;

(3) "Rosin solution"
50% solution of WW rosin in xylene;

(4) "Copper naphthenate solution"
solution of copper naphthenate in xylene, having a copper content in solution of 8%;

(5) "Soluble anhydrous gypsum D-1"
IIICaSO$_4$ white powder of 15 µm average particle diameter, produced by Noritake Co., Ltd.;

(6) "Disparlon 4200-20"
polyethylene oxide wax (20% xylene paste), produced by Kusumoto Chemicals, Ltd.;

(7) "Disparlon A603-20X"
fatty acid amide wax (20% xylene paste), produced by Kusumoto Chemicals, Ltd.;

(8) "Kyowanoic N"
3,5,5-trimethylhexanoic acid (isononanoic acid), produced by Kyowa Yuka Co., Ltd.;

(9) "Versatic 10 (versatic acid)"
tertiary synthetic fatty acid (10 carbon atoms on the average), produced by Shell Chemical; and

(10) Naphthenic acid (acid value 200).

Comparative Examples 3 and 4

Antifouling coating compositions were prepared in the same manner as in Examples 21 to 48, except that the formulations thereof were changed as specified in Table 2. With respect to the obtained antifouling coating compositions, the storage stability and antifouling performance were evaluated in the same manner.

TABLE 2 (1)

| | | | Example | | | | | | | | | |
|---|---|---|---|---|---|---|---|---|---|---|---|---|
| | | | 21 | 22 | 23 | 24 | 25 | 26 | 27 | 28 | 29 | 30 |
| formulation compsn. (pts. wt.) | copolymer soln. (A) | BP-1 | 26 | | | | | | | | | |
| | | BP-2 | | 26 | | | | | | | | |
| | | BP-3 | | | 26 | | | | | | | |
| | | BP-4 | | | | 26 | | | | | | |
| | | BP-5 | | | | | 24 | | | | | |
| | | BP-6 | | | | | | 22 | | | | |
| | | BP-7 | | | | | | | 26 | | | |
| | | BP-8 | | | | | | | | 26 | | |
| | | BP-9 | | | | | | | | | 26 | |
| | | BP-10 | | | | | | | | | | 26 |
| | | BP-11 | | | | | | | | | | |
| | | BP-12 | | | | | | | | | | |
| | | BP-13 | | | | | | | | | | |
| | | BP-14 | | | | | | | | | | |
| | | BP-15 | | | | | | | | | | |
| | | BP-16 | | | | | | | | | | |
| | | BP-17 | | | | | | | | | | |
| | | BP-18 | | | | | | | | | | |
| | | BP-19 | | | | | | | | | | |
| | | BP-20 | | | | | | | | | | |
| | | H-1 | | | | | | | | | | |
| | | H-2 | | | | | | | | | | |
| | antifouling agent (B) | cuprous oxide | 43 | 43 | 43 | 43 | 43 | 43 | 43 | 43 | 43 | 43 |
| | | copper pyrithione | 3 | 3 | 3 | 3 | 3 | 3 | 3 | 3 | 3 | 3 |
| | | zinc pyrithione | | | | | | | | | | |
| | | 4,5-dichloro-2-n-octyl-4-isothiazol-in-3-one | | | | | | | | | | |
| | | zinc oxide (C) | 6 | 6 | 6 | 6 | 6 | 6 | 6 | 6 | 6 | 6 |
| | dehydrating agent (D): anhydrous gypsum D-1 | | 1 | 1 | 1 | 1 | 1 | 1 | 1 | 1 | 1 | 1 |
| formulation compsn. (pts. wt.) | leaching accelerating component (E) | rosin soln. | | | | | | | | | | |
| | | copper naphthenate soln. | | | | | | | | | 0.5 | |
| | vinyl ether copolmer (F): Lutonal A-25 | | | | | | 1 | 2 | | | | |
| | plasticizer (G): Toyoparax 150 | | | | | | | | | | | |
| | pigment | red iron oxide | 0.2 | 0.2 | 0.2 | 0.2 | 0.2 | 0.2 | 0.2 | 0.2 | 0.2 | 0.2 |
| | | titanium white | 1.8 | 1.8 | 1.8 | 1.8 | 1.8 | 1.8 | 1.8 | 1.8 | 1.8 | 1.8 |
| | antisagging agent | Disparlon 4200-20 | 1.5 | 1.5 | 1.5 | 1.5 | 1.5 | 1.5 | 1.5 | 1.5 | 1.5 | 1.5 |
| | | Disparlon A603-20X | 4 | 4 | 4 | 4 | 4 | 4 | 4 | 4 | 4 | 4 |
| | Solvent | xylene | 13.5 | 13.5 | 13.5 | 13.5 | 14.5 | 15.5 | 13.5 | 13.5 | 13.5 | 13.5 |
| | total | | 100 | 100 | 100 | 100 | 100 | 100 | 100 | 100.5 | 100 | 100 |
| evaluation result | storage stability | | 5 | 5 | 5 | 5 | 5 | 5 | 5 | 5 | 5 | 5 |
| | antifouling performance | | 4 | 5 | 5 | 5 | 5 | 5 | 5 | 5 | 5 | 5 |
| | consumability | | 76 | 108 | 125 | 107 | 120 | 189 | 131 | 136 | 99 | 111 |
| | condition of coating | | 5 | 5 | 5 | 5 | 4 | 5 | 5 | 4 | 5 | 5 |

TABLE 2 (2)

| | | | Example | | | | | | | | | |
|---|---|---|---|---|---|---|---|---|---|---|---|---|
| | | | 31 | 32 | 33 | 34 | 35 | 36 | 37 | 38 | 39 | 40 |
| formulation compsn. (pts. wt.) | copolymer soln. (A) | BP-1 | | | | | | | | | | |
| | | BP-2 | | | | | | | | | | |
| | | BP-3 | | | | | | | | | | |
| | | BP-4 | | | | | | | | | | |
| | | BP-5 | | | | | | | | | | |
| | | BP-6 | | | | | | | | | | |
| | | BP-7 | | | | | | | | | | |
| | | BP-8 | | | | | | | | | | |
| | | BP-9 | | | | | | | | | | |
| | | BP-10 | | | | | | | | | | |
| | | BP-11 | 26 | | | | | | | | | |
| | | BP-12 | | 24 | | | | | | | | |
| | | BP-13 | | | 26 | | | | | | | |
| | | BP-14 | | | | 26 | | | | | | |
| | | BP-15 | | | | | 26 | | | | | |
| | | BP-16 | | | | | | 26 | | | | |
| | | BP-17 | | | | | | | 26 | | | |

TABLE 2 (2)-continued

| | | | Example | | | | | | | | | |
|---|---|---|---|---|---|---|---|---|---|---|---|---|
| | | | 31 | 32 | 33 | 34 | 35 | 36 | 37 | 38 | 39 | 40 |
| | | BP-18 | | | | | | | | 26 | | |
| | | BP-19 | | | | | | | | | 26 | |
| | | BP-20 | | | | | | | | | | 26 |
| | | H-1 | | | | | | | | | | |
| | | H-2 | | | | | | | | | | |
| | antifouling agent (B) | cuprous oxide | 43 | 43 | 43 | 43 | 43 | 43 | 43 | 43 | 43 | 43 |
| | | copper pyrithione | 3 | 3 | 3 | 3 | 3 | 3 | 3 | 3 | 3 | 3 |
| | | zinc pyrithione | | | | | | | | | | |
| | | 4,5-dichloro-2-n-octyl-4-isothiazol-in-3-one | | | | | | | | | | |
| | zinc oxide (C) | | 6 | 6 | 6 | 6 | 6 | 6 | 6 | 6 | 6 | 6 |
| formulation compsn. (pts. wt.) | dehydrating agent (D): anhydrous gypsum D-1 | | 1 | 1 | 1 | 1 | 1 | 1 | 1 | 1 | 1 | 1 |
| | leaching accelerating component (E) | rosin soln. | | | | | | | | | | |
| | | copper naphthenate soln. | | | | | | | | | | |
| | vinyl ethercopolymer (F): Lutonal A-25 | | | | | | | | | | | |
| | plasticizer (G): Toyoparax 150 | | | 1 | | | | 1 | | | | |
| | pigment | red iron oxide | 0.2 | 0.2 | 0.2 | 0.2 | 0.2 | 0.2 | 0.2 | 0.2 | 0.2 | 0.2 |
| | | titanium white | 1.8 | 1.8 | 1.8 | 1.8 | 1.8 | 1.8 | 1.8 | 1.8 | 1.8 | 1.8 |
| | antisagging agent | Disparlon 4200-20 | 1.5 | 1.5 | 1.5 | 1.5 | 1.5 | 1.5 | 1.5 | 1.5 | 1.5 | 1.5 |
| | | Disparlon A603-20X | 4 | 4 | 4 | 4 | 4 | 4 | 4 | 4 | 4 | 4 |
| | Solvent | xylene | 13.5 | 14.5 | 13.5 | 13.5 | 13.5 | 12.5 | 13.5 | 13.5 | 13.5 | 13.5 |
| | total | | 100 | 100 | 100 | 100 | 100 | 100 | 100 | 100 | 100 | 100 |
| evaluation result | storage stability | | 5 | 5 | 5 | 5 | 5 | 5 | 5 | 5 | 5 | 5 |
| | antifouling performance | | 5 | 5 | 5 | 5 | 5 | 5 | 5 | 5 | 5 | 5 |
| | consumability | | 140 | 147 | 119 | 91 | 125 | 123 | 102 | 115 | 118 | 121 |
| | condition of coating | | 5 | 4 | 4 | 5 | 5 | 5 | 5 | 5 | 5 | 5 |

TABLE 2(3)

| | | | Example | | | | | | | | Comp. Ex. | |
|---|---|---|---|---|---|---|---|---|---|---|---|---|
| | | | 41 | 42 | 43 | 44 | 45 | 46 | 47 | 48 | 3 | 4 |
| formulation compsn. (pts. wt.) | copolymer soln. (A) | BP-1 | 20 | | | | | | 26 | 26 | | |
| | | BP-2 | | 20 | | 20 | | | | | | |
| | | BP-3 | | | 20 | | 20 | 18 | | | | |
| | | BP-4 | | | | | | | | | | |
| | | BP-5 | | | | | | | | | | |
| | | BP-6 | | | | | | | | | | |
| | | BP-7 | | | | | | | | | | |
| | | BP-8 | | | | | | | | | | |
| | | BP-9 | | | | | | | | | | |
| | | BP-10 | | | | | | | | | | |
| | | BP-11 | | | | | | | | | | |
| | | BP-12 | | | | | | | | | | |
| | | BP-13 | | | | | | | | | | |
| | | BP-14 | | | | | | | | | | |
| | | BP-15 | | | | | | | | | | |
| | | BP-16 | | | | | | | | | | |
| | | BP-17 | | | | | | | | | | |
| | | BP-18 | | | | | | | | | | |
| | | BP-19 | | | | | | | | | | |
| | | BP-20 | | | | | | | | | | |
| | | H-1 | | | | | | | | | 26 | |
| | | H-2 | | | | | | | | | | 26 |
| | antifouling agent (B) | cuprous oxide | 43 | 43 | 43 | 43 | 43 | 43 | 43 | 35 | 43 | 43 |
| | | copper pyrithione | 3 | 3 | 3 | 3 | 3 | 3 | | 7 | 3 | 3 |
| | | zinc pyrithione | | | | | | | 3 | | | |
| | | 4,5-dichloro-2-n-octyl-4-isothiazol-in-3-one | | | | | | | 3 | 1 | | |
| | zinc oxide (C) | | 6 | 6 | 6 | 6 | 6 | 6 | 6 | 6 | 6 | 6 |
| formulation compsn. (pts. wt.) | dehydrating agent (D): anhydrous gypsum D-1 | | 1 | 1 | 1 | 1 | 1 | 1 | 1 | 1 | 1 | 1 |
| | leaching accelerating component (E) | rosin soln. | 6 | | | | | | | | | |
| | | copper naphthenate soln. | | 6 | | | | | | | | |
| | | Kyowanoic N | | | 3 | | | | | | | |
| | | Versatic 10 | | | | 3 | | | | | | |

TABLE 2(3)-continued

|  |  | Example | | | | | | | | Comp. Ex. | |
|---|---|---|---|---|---|---|---|---|---|---|---|
|  |  | 41 | 42 | 43 | 44 | 45 | 46 | 47 | 48 | 3 | 4 |
|  | tall oil fatty acid |  |  |  |  | 3 |  |  |  |  |  |
|  | naphthenic acid |  |  |  |  |  | 4 |  |  |  |  |
| vinyl ether copolymer (F): Lutonal A-25 |  |  |  |  |  |  |  |  |  |  |  |
| plasticizer (G): Toyoparax 150 |  |  |  |  |  |  |  |  |  |  |  |
| pigment | red iron oxide | 0.2 | 0.2 | 0.2 | 0.2 | 0.2 | 0.2 | 0.2 | 0.2 | 0.2 | 0.2 |
|  | titanium white | 1.8 | 1.8 | 1.8 | 1.8 | 1.8 | 1.8 | 1.8 | 1.8 | 1.8 | 1.8 |
| antisagging | Disparlon 4200-20 | 1.5 | 1.5 | 1.5 | 1.5 | 1.5 | 1.5 | 1.5 | 1.5 | 1.5 | 1.5 |
| agent | Disparlon A603-20X | 4 | 4 | 4 | 4 | 4 | 4 | 4 | 4 | 4 | 4 |
| Solvent | xylene | 13.5 | 13.5 | 16.5 | 16.5 | 16.5 | 17.5 | 10.5 | 16.5 | 13.5 | 13.5 |
|  | total | 100 | 100 | 100 | 100 | 100 | 100 | 100 | 100 | 100 | 100 |
| evaluation | storage stability | 5 | 5 | 5 | 5 | 5 | 5 | 5 | 5 | 5 | 5 |
| result | antifouling performance | 5 | 5 | 5 | 5 | 5 | 5 | 5 | 5 | 1 | 2 |
|  | consumability | 109 | 147 | 185 | 184 | 136 | 135 | 84 | 77 | 26 | 35 |
|  | condition of coating | 5 | 5 | 5 | 5 | 5 | 5 | 5 | 5 | 5 | 5 |

What is claimed is:

1. A (poly)oxyalkylene block silyl ester copolymer comprising silyl ester copolymer block units (A) and block units (B), said silyl ester copolymer block units (A) comprising:
(a) component units derived from a polymerizable unsaturated carboxylic acid silyl ester, and
(b) polymerizable unsaturated monomer units other than the component units (a), said block units (B) derived from a mercapto compound represented by the formula:

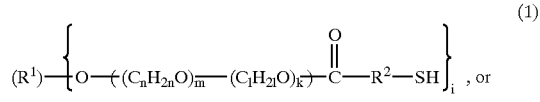

(1)

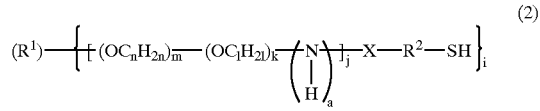

(2)

wherein $R^1$ represents a hydrocarbon group or ether-bond-containing hydrocarbon group having a valency of 1 or higher and having 1 to 30 carbon atoms; $R^2$ represents a bivalent hydrocarbon group having 1 to 30 carbon atoms or a group of the formula $-CH(R^3)-$ wherein $R^3$ represents a group of the formula $R^4-O-R^5$, $R^4$ representing a bivalent hydrocarbon group having 1 to 30 carbon atoms, and $R^5$ representing a monovalent hydrocarbon group having 1 to 30 carbon atoms; X represents:

$$-\underset{\underset{S}{\|}}{C}-O-, \text{ or } -\underset{\underset{H}{|}}{N}-\underset{\underset{S}{\|}}{C}-O-;$$

n is an integer of 1 to 5; m is an integer of 1 to 100; l is an integer of 1 to 5; k is an integer of 0 to 100; a is an integer of 0 or 1; j is an integer of 1 to 50; and i is the valency of $R^1$.

2. The (poly)oxyalkylene block silyl ester copolymer as claimed in claim 1, wherein the component units derived from a polymerizable unsaturated carboxylic acid silyl ester (a) contain component units (a-1) derived from a silyl (meth)acrylate are represented by the formula:

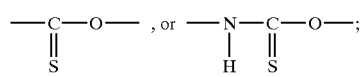

(I)

wherein R represents a hydrogen atom or a methyl group; and $R^a$, $R^b$ and $R^c$ may be identical with or different from each other and each represent a linear alkyl group, a branched alkyl group, a cycloalkyl group, a substituted or unsubstituted phenyl group or a trimethylsilyloxy group.

3. The (poly)oxyalkylene block silyl ester copolymer as claimed in claim 2, wherein at least one of the $R^a$, $R^b$ and $R^c$ of the formula (I) represents a branched alkyl group or a cycloalkyl group.

4. An antifouling coating composition comprising a (poly)oxyalkylene block silyl ester copolymer, which (poly)oxyalkylene block silyl ester copolymer comprises silyl ester copolymer block units (A-1) and block units (A-2), said silyl ester copolymer block units (A-1) comprising:
(a) component units derived from a polymerizable unsaturated carboxylic acid silyl ester, and
(b) polymerizable unsaturated monomer units other than the component units (a), said block units (A-2) derived from a mercapto compound represented by the formula:

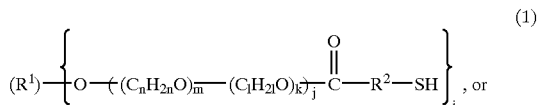

(1)

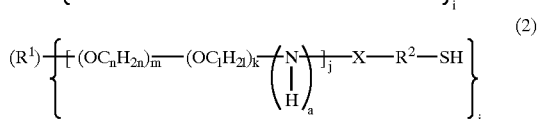

(2)

wherein $R^1$ represents a hydrocarbon group or ether-bond-containing hydrocarbon group having a valency of 1 or higher and having 1 to 30 carbon atoms; $R^2$ represents a bivalent hydrocarbon group having 1 to 30 carbon atoms or a group of the formula $-CH(R^3)-$ wherein $R^3$ represents a group of the formula $R^4-O-R^5$, $R^4$ representing a bivalent hydrocarbon group having 1 to 30 carbon atoms, and $R^5$ representing a monovalent hydrocarbon group having 1 to 30 carbon atoms; X represents:

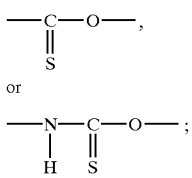

n is an integer of 1 to 5; m is an integer of 1 to 100; l is an integer of 1 to 5; k is an integer of 0 to 100; a is an integer of 0 or 1; j is an integer of 1 to 50; and i is the valency of $R^1$.

5. The antifouling coating composition as claimed in claim 4, wherein the component units derived from a polymerizable unsaturated carboxylic acid silyl ester (a) contain component units (a-1) derived from a silyl (meth)acrylate are represented by the formula:

$$—CH_2—CR(COOSiR^a R^b R^c)—  \qquad (I)$$

wherein R represents a hydrogen atom or a methyl group; and $R^a$, $R^b$ and $R^c$ may be identical with or different from each other and each represent a linear alkyl group, a branched alkyl group, a cycloalkyl group, a substituted or unsubstituted phenyl group or a trimethylsilyloxy group.

6. The antifouling coating composition as claimed in claim 5, wherein at least one of the $R^a$, $R^b$ and $R^c$ of the formula (I) represents a branched alkyl group or a cycloalkyl group.

7. The (poly)oxyalkylene block silyl ester copolymer as claimed in claim 1, wherein the component units derived from a polymerizable unsaturated carboxylic acid silyl ester (a) comprise:

silyl (meth)acrylate component units (a-2) of the formula:

$$—CH_2—CR(COOSiR^{11}R^{12}R^{13})—  \qquad (II)$$

wherein R represents a hydrogen atom or a methyl group; each of $R^{11}$ and $R^{12}$ independently represents a linear alkyl group having 1 to 10 carbon atoms, a substituted or unsubstituted phenyl group, or a trimethylsilyloxy group; and $R^{13}$ represents an alkyl group having 1 to 18 carbon atoms which may have a ring structure or branch, a substituted or unsubstituted phenyl group having 6 to 10 carbon atoms, or a trimethylsilyloxy group, and silyl (meth)acrylate component units (a-3) of the formula:

$$—CH_2—CR(COOSiR^{14}R^{15}R^{16})—  \qquad (III)$$

wherein R represents a hydrogen atom or a methyl group; each of $R^{14}$ and $R^{15}$ independently represents a branched alkyl or cycloalkyl group having 3 to 10 carbon atoms; and $R^{16}$ represents a linear alkyl group having 1 to 10 carbon atoms, a branched alkyl or cycloalkyl group having 3 to 10 carbon atoms, a substituted or unsubstituted phenyl group having 6 to 10 carbon atoms, or a trimethylsilyloxy group.

8. The (poly)oxyalkylene block silyl ester copolymer as claimed in claim 2, wherein the component units derived from a polymerizable unsaturated carboxylic acid silyl ester (a) comprise:

silyl (meth)acrylate component units (a-2) of the formula:

$$—CH_2—CR(COOSiR^{11}R^{12}R^{13})—  \qquad (II)$$

wherein R represents a hydrogen atom or a methyl group; each of $R^{11}$ and $R^{12}$ independently represents a linear alkyl group having 1 to 10 carbon atoms, a substituted or unsubstituted phenyl group, or a trimethylsilyloxy group; and $R^{13}$ represents an alkyl group having 1 to 18 carbon atoms which may have a ring structure or branch, a substituted or unsubstituted phenyl group having 6 to 10 carbon atoms, or a trimethylsilyloxy group, and silyl (meth)acrylate component units (a-3) of the formula:

$$—CH_2—CR(COOSiR^{14}R^{15}R^{16})—  \qquad (III)$$

wherein R represents a hydrogen atom or a methyl group; each of $R^{14}$ and $R^{15}$ independently represents a branched alkyl or cycloalkyl group having 3 to 10 carbon atoms; and $R^{16}$ represents a linear alkyl group having 1 to 10 carbon atoms, a branched alkyl or cycloalkyl group having 3 to 10 carbon atoms, a substituted or unsubstituted phenyl group having 6 to 10 carbon atoms, or a trimethylsilyloxy group.

9. The (poly)oxyalkylene block silyl ester copolymer as claimed in claim 3, wherein the component units derived from a polymerizable unsaturated carboxylic acid silyl ester (a) comprise:

silyl (meth)acrylate component units (a-2) of the formula:

$$—CH_2—CR(COOSiR^{11}R^{12}R^{13})—  \qquad (II)$$

wherein R represents a hydrogen atom or a methyl group; each of $R^{11}$ and $R^{12}$ independently represents a linear alkyl group having 1 to 10 carbon atoms, a substituted or unsubstituted phenyl group, or a trimethylsilyloxy group; and $R^{13}$ represents an alkyl group having 1 to 18 carbon atoms which may have a ring structure or branch, a substituted or unsubstituted phenyl group having 6 to 10 carbon atoms, or a trimethyisilyloxy group, and silyl (meth)acrylate component units (a-3) of the formula:

$$—CH_2—CR(COOSiR^{14}R^{15}R^{16})—  \qquad (III)$$

wherein R represents a hydrogen atom or a methyl group; each of $R^{14}$ and $R^{15}$ independently represents a branched alkyl or cycloalkyl group having 3 to 10 carbon atoms; and $R^{16}$ represents a linear alkyl group having 1 to 10 carbon atoms, a branched alkyl or cycloalkyl group having 3 to 10 carbon atoms, a substituted or unsubstituted phenyl group having 6 to 10 carbon atoms, or a trimethylsilyloxy group.

10. The (poly)oxyalkylene block silyl ester copolymer as claimed in claim 1, wherein the polyrnerizable unsaturated monomer units (b) other than the component units (a) comprise component units (b-1) derived from an acrylic unsaturated monomer containing a polar group.

11. The (poly)oxyalkylefle block silyl ester copolymer as claimed in claim 2, wherein the polymerizable unsaturated monomer units (b) other than the component units (a) comprise component units (b-1) derived from an acrylic unsaturated monomer containing a polar group.

12. The (poly)oxyalkylene block silyl ester copolymer as claimed in claim 3, wherein the polymerizable unsaturated monomer units (b) other than the component units (a) comprise component units (b-1) derived from an acrylic unsaturated monomer containing a polar group.

13. The (poly)oxyalkylene block silyl ester copolymer as claimed in claim 7, wherein the polymerizable unsaturated monomer units (b) other than the component units (a) comprise component units (b-1) derived from an acrylic unsaturated monomer containing a polar group.

14. The (poly)oxyalkylene block silyl ester copolymer as claimed in claim 8, wherein the polymerizable unsaturated monomer units (b) other than the component units (a) comprise component units (b-1) derived from an acrylic unsaturated monomer containing a polar group.

15. The (poly)oxyalkylene block silyl ester copolymer as claimed in claim 9, wherein the polymerizable unsaturated monomer units (b) other than the component units (a) comprise component units (b-1) derived from an acrylic unsaturated monomer containing a polar group.

16. The (poly)oxyalkylene block silyl ester copolymer as claimed in claim 10, wherein the component units (b-1) derived from an acrylic unsaturated monomer containing a polar group have component units derived from an acrylic unsaturated monomer containing at least one polar group selected from the group consisting of a hydroxyl group, a hydroxyalkyl group, an alkoxyl group, a polyoxyalkylene group, an alkylpolyoxyalkylene group, an amino group, an N-substituted amino group, an amido group, an N-substituted amido group, an epoxy group, an oxirane group, an oxolane group, an oxetane group, a tetrahydrofurfuryl group and a morpholino group.

17. The (poly)oxyalkylene block silyl ester copolymer as claimed in claim 11, wherein the component units (b-1) derived from an acrylic unsaturated monomer containing a polar group have component units derived from an acrylic unsaturated monomer containing at least one polar group selected from the group consisting of a hydroxyl group, a hydroxyalkyl group, an alkoxyl group, a polyoxyalkylene group, an alkylpolyoxyalkylene group, an amino group, an N-substituted amino group, an amido group, an N-substituted amido group, an epoxy group, an oxirane group, an oxolane group, an oxetane group, a tetrahydrofurfuryl group and a morpholino group.

18. The (poly)oxyalkylene block silyl ester copolymer as claimed in claim 12, wherein the component units (b-1) derived from an acrylic unsaturated monomer containing a polar group have component units derived from an acrylic unsaturated monomer containing at least one polar group selected from the group consisting of a hydroxyl group, a hydroxyalkyl group, an alkoxyl group, a polyoxyalkylene group, an alkylpolyoxyalkylene group, an amino group, an N-substituted amino group, an amido group, an N-substituted amido group, an epoxy group, an oxirane group, an oxolane group, an oxetane group, a tetrahydrofurfuryl group and a morpholino group.

19. The (poly)oxyalkylerle block silyl ester copolymer as claimed in claim 13, wherein the component units (b-1) derived from an acrylic unsaturated monomer containing a polar group have component units derived from an acrylic unsaturated monomer containing at least one polar group selected from the group consisting of a hydroxyl group, a hydroxyalkyl group, an alkoxyl group, a polyoxyalkylene group, an alkylpolyoxyalkylene group, an amino group, an N-substituted amino group, an amido group, an N-substituted amido group, an epoxy group, an oxirane group, an oxolane group, an oxetane group, a tetrahydrofurfuryl group and a morpholino group.

20. The (poly)oxyalkylene block silyl ester copolymer as claimed in claim 14, wherein the component units (b-1) derived from an acrylic unsaturated monomer containing a polar group have component units derived from an acrylic unsaturated monomer containing at least one polar group selected from the group consisting of a hydroxyl group, a hydroxyalkyl group, an alkoxyl group, a polyoxyalkylene group, an alkylpolyoxyalkylene group, an amino group, an N-substituted amino group, an amido group, an N-substituted amido group, an epoxy group, an oxirane group, an oxolane group, an oxetane group, a tetrahydrofurfuryl group and a morpholino group.

21. The (poly)oxyalkylene block silyl ester copolymer as claimed in claim 15, wherein the component units (b-1) derived from an acrylic unsaturated monomer containing a polar group have component units derived from an acrylic unsaturated monomer containing at least one polar group selected from the group consisting of a hydroxyl group, a hydroxyalkyl group, an alkoxyl group, a polyoxyalkylene group, an alkylpolyoxyalkylene group, an amino group, an N-substituted amino group, an amido group, an N-substituted amido group, an epoxy group, an oxirane group, an oxolane group, an oxetane group, a tetrahydrofurfuryl group and a morpholino group.

22. The antifouling coating composition as claimed in claim 4, wherein the component units derived from a polymerizable unsaturated carboxylic acid silyl ester (a) comprise:

silyl (meth)acrylate component units (a-2) of the formula:

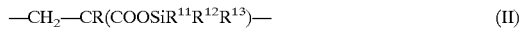
$$—CH_2—CR(COOSiR^{11}R^{12}R^{13})— \quad (II)$$

wherein R represents a hydrogen atom or a methyl group; each of $R^{11}$ and $R^{12}$ independently represents a linear alkyl group having 1 to 10 carbon atoms, a substituted or unsubstituted phenyl group, or a trimethylsilyloxy group; and $R^{13}$ represents an alkyl group having 1 to 18 carbon atoms which may have a ring structure or branch, a substituted or unsubstituted phenyl group having 6 to 10 carbon atoms, or a trimethylsilyloxy group, and silyl (meth)acrylate component units (a-3) of the formula:

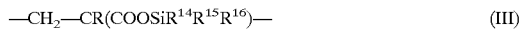
$$—CH_2—CR(COOSiR^{14}R^{15}R^{16})— \quad (III)$$

wherein R represents a hydrogen atom or a methyl group; each of $R^{14}$ and $R^{15}$ independently represents a branched alkyl or cycloalkyl group having 3 to 10 carbon atoms; and $R^{16}$ represents a linear alkyl group having 1 to 10 carbon atoms, a branched alkyl or cycloalkyl group having 3 to 10 carbon atoms, a substituted or unsubstituted phenyl group having 6 to 10 carbon atoms, or a trimethylsilyloxy group.

23. The antifouling coating composition as claimed in claim 5, wherein the component units derived from a polymerizable unsaturated carboxylic acid silyl ester (a) comprise:

silyl (meth)acrylate component units (a-2) of the formula:

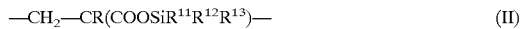
$$—CH_2—CR(COOSiR^{11}R^{12}R^{13})— \quad (II)$$

wherein R represents a hydrogen atom or a methyl group; each of $R^{11}$ and $R^{12}$ independently represents a linear alkyl group having 1 to 10 carbon atoms, a substituted or unsubstituted phenyl group, or a trimethylsilyloxy group; and $R^{13}$ represents an alkyl group having 1 to 18 carbon atoms which may have a ring structure or branch, a substituted or unsubstituted phenyl group having 6 to 10 carbon atoms, or a trimethylsilyloxy group, and silyl (meth)acrylate component units (a-3) of the formula:

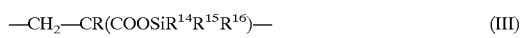
$$—CH_2—CR(COOSiR^{14}R^{15}R^{16})— \quad (III)$$

wherein R represents a hydrogen atom or a methyl group; each of $R^{14}$ and $R^{15}$ independently represents a branched alkyl or cycloalkyl group having 3 to 10 carbon atoms; and $R^{16}$ represents a linear alkyl group having 1 to 10 carbon atoms, a branched alkyl or cycloalkyl group having 3 to 10 carbon atoms, a substituted or unsubstituted phenyl group having 6 to 10 carbon atoms, or a trimethylsilyloxy group.

24. The antifouling coating composition as claimed in claim 6, wherein the component units derived from a polymerizable unsaturated carboxylic acid silyl ester (a) comprise:

silyl (meth)acrylate component units (a-2) of the formula:

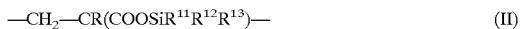

$$—CH_2—CR(COOSiR^{11}R^{12}R^{13})—\qquad (II)$$

wherein R represents a hydrogen atom or a methyl group; each of and $R^{12}$ independently represents a linear alkyl group having 1 to 10 carbon atoms, a substituted or unsubstituted phenyl group, or a trimethylsilyloxy group; and $R^{13}$ represents an alkyl group having 1 to 18 carbon atoms which may have a ring structure or branch, a substituted or unsubstituted phenyl group having 6 to 10 carbon atoms, or a trimethylsilyloxy group, and silyl (meth)acrylate component units (a-3) of the formula:

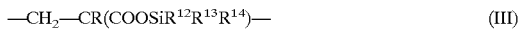

$$—CH_2—CR(COOSiR^{12}R^{13}R^{14})—\qquad (III)$$

wherein R represents a hydrogen atom or a methyl group; each of $R^{14}$ and $R^{15}$ independently represents a branched alkyl or cycloalkyl group having 3 to 10 carbon atoms; and $R^{16}$ represents a linear alkyl group having 1 to 10 carbon atoms, a branched alkyl or cycloalkyl group having 3 to 10 carbon atoms, a substituted or unsubstituted phenyl group having 6 to 10 carbon atoms, or a trimethylsilyloxy group.

25. The antifouling coating composition as claimed in claim 4, wherein the polymerizable unsaturated monomer units (b) other than the component units (a) comprise component units (b-1) derived from an acrylic unsaturated monomer containing a polar group.

26. The antifouling coating composition as claimed in claim 5, wherein the polymerizable unsaturated monomer units (b) other than the component units (a) comprise component units (b-1) derived from an acrylic unsaturated monomer containing a polar group.

27. The antifouling coating composition as claimed in claim 6, wherein the polymerizable unsaturated monomer units (b) other than the component units (a) comprise component units (b-1) derived from an acrylic unsaturated monomer containing a polar group.

28. The antifouling coating composition as claimed in claim 22, wherein the polymerizable unsaturated monomer units (b) other than the component units (a) comprise component units (b-1) derived from an acrylic unsaturated monomer containing a polar group.

29. The antifouling coating composition as claimed in claim 23, wherein the polymerizable unsaturated monomer units (b) other than the component units (a) comprise component units (b-1) derived from an acrylic unsaturated monomer containing a polar group.

30. The antifouling coating composition as claimed in claim 24, wherein the polymerizable unsaturated monomer units (b) other than the component units (a) comprise component units (b-1) derived from an acrylic unsaturated monomer containing a polar group.

31. The antifouling coating composition as claimed in claim 25, wherein the component units (b-1) derived from an acrylic unsaturated monomer containing a polar group are component units derived from an acrylic unsaturated monomer containing at least one polar group selected from the group consisting of a hydroxyl group, a hydroxyalkyl group, an alkoxyl group, a polyoxyalkylene group, an alkylpolyoxyalkylene group, an amino group, an N-substituted amino group, an amido group, an N-substituted amido group, an epoxy group, an oxirane group, an oxolane group, an oxetane group, a tetrahydrofurfuryl group and a morpholino group.

32. The antifouling coating composition as claimed in claim 26, wherein the component units (b-1) derived from an acrylic unsaturated monomer containing a polar group are component units derived from an acrylic unsaturated monomer containing at least one polar group selected from the group consisting of a hydroxyl group, a hydroxyalkyl group, an alkoxyl group, a polyoxyalkylene group, an alkylpolyoxyalkylene group, an amino group, an N-substituted amino group, an amido group, an N-substituted amido group, an epoxy group, an oxirane group, an oxolane group, an oxetane group, a tetrahydrofurfuryl group and a morpholino group.

33. The antifouling coating composition as claimed in claim 27, wherein the component units (b-1) derived from an acrylic unsaturated monomer containing a polar group are component units derived from an acrylic unsaturated monomer containing at least one polar group selected from the group consisting of a hydroxyl group, a hydroxyalkyl group, an alkoxyl group, a polyoxyalkylene group, an alkylpolyoxyalkylene group, an amino group, an N-substituted amino group, an amido group, an N-substituted amido group, an epoxy group, an oxirane group, an oxolane group, an oxetane group, a tetrahydrofurfuryl group and a morpholino group.

34. The antifouling coating composition as claimed in claim 28, wherein the component units (b-1) derived from an acrylic unsaturated monomer containing a polar group are component units derived from an acrylic unsaturated monomer containing at least one polar group selected from the group consisting of a hydroxyl group, a hydroxyalkyl group, an alkoxyl group, a polyoxyalkylene group, an alkylpolyoxyalkylene group, an amino group, an N-substituted amino group, an amido group, an N-substituted amido group, an epoxy group, an oxirane group, an oxolane group, an oxetane group, a tetrahydrofurfuryl group and a morpholino group.

35. The antifouling coating composition as claimed in claim 29, wherein the component units (b-1) derived from an acrylic unsaturated monomer containing a polar group are component units derived from an acrylic unsaturated monomer containing at least one polar group selected from the group consisting of a hydroxyl group, a hydroxyalkyl group, an alkoxyl group, a polyoxyalkylene group, an alkylpolyoxyalkylene group, an amino group, an N-substituted amino group, an amido group, an N-substituted amido group, an epoxy group, an oxirane group, an oxolane group, an oxetane group, a tetrahydrofurfuryl group and a morpholino group.

36. The antifouling coating composition as claimed in claim 30, wherein the component units (b-1) derived from an acrylic unsaturated monomer containing a polar group are component units derived from an acrylic unsaturated monomer containing at least one polar group selected from the group consisting of a hydroxyl group, a hydroxyalkyl group, an alkoxyl group, a polyoxyalkylene group, an alkylpolyoxyalkylene group, an amino group, an N-substituted amino group, an amido group, an N-substituted amido group, an epoxy group, an oxirane group, an oxolane group, an oxetane group, a tetrahydrofurfuryl group and a morpholino group.

37. The antifouling coating composition as claimed in claim 4, which further comprises an antifouling agent (B).

38. The antifouling coating composition as claimed in claim 4, which further comprises zinc oxide (C).

39. The antifouling coating composition as claimed in claim 37, which further comprises zinc oxide (C).

40. The antifouling coating composition as claimed in claim 4, which further comprises an inorganic dehydrating agent (D).

41. The antifouling coating composition as claimed in claim 37, which further comprises an inorganic dehydrating agent (D).

42. The antifouling coating composition as claimed in claim 38, which further comprises an inorganic dehydrating agent (D).

43. The antifouling coating composition as claimed in claim 39, which further comprises an inorganic dehydrating agent (D).

44. The antifouling coating composition as claimed in claim 4, which further comprises a leaching accelerating component (E).

45. The antifouling coating composition as claimed in claim 37, which further comprises a leaching accelerating component (E).

46. The antifouling coating composition as claimed in claim 38, which further comprises a leaching accelerating component (E).

47. The antifouling coating composition as claimed in claim 39, which further comprises a leaching accelerating component (E).

48. The antifouling coating composition as claimed in claim 40, which further comprises a leaching accelerating component (E).

49. The antifouling coating composition as claimed in claim 41, which further comprises a leaching accelerating component (E).

50. The antifouling coating composition as claimed in claim 42, which further comprises a leaching accelerating component (E).

51. The antifouling coating composition as claimed in claim 43, which further comprises a leaching accelerating component (E).

52. An antifouling coating film formed from an antifouling coating composition comprising a (poly)oxyalkylene block silyl ester copolymer, which (poly)oxyalkylene block silyl ester copolymer comprises silyl ester copolymer block units (A-1) and block units (A-2), said silyl ester copolymer block units (A-1) comprising:
(a) component units derived from a polymerizable unsaturated carboxylic acid silyl ester, and
(b) polymerizable unsaturated monomer units other than the component units (a), said block units (A-2) derived from a mercapto compound represented by the formula:

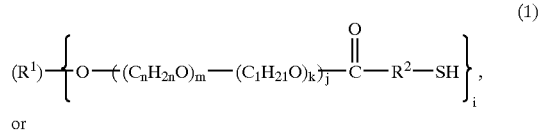

or

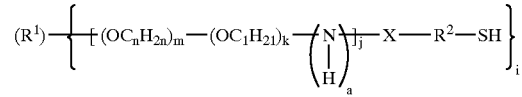

wherein $R^1$ represents a hydrocarbon group or ether-bond-containing hydrocarbon group having a valency of 1 or higher and having 1 to 30 carbon atoms; $R^2$ represents a bivalent hydrocarbon group having 1 to 30 carbon atoms or a group of the formula —CH($R^3$)— wherein $R^3$ represents a group of the formula $R^4$-O-$R^5$, $R^4$ representing a bivalent hydrocarbon group having 1 to 30 carbon atoms, and $R^5$ representing a monovalent hydrocarbon group having 1 to 30 carbon atoms; X represents:

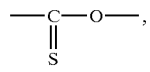

or

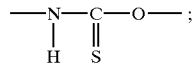

n is an integer of 1 to 5; m is an integer of 1 to 100; l is an integer of 1 to 5; k is an integer of 0 to 100; a is an integer of 0 or 1; j is an integer of 1 to 50; and i is the valency of $R^1$.

53. The antifouling coating film of claim 52 wherein the component units derived from a polymerizable unsaturated carboxylic acid silyl ester (a) contain component units (a-1) derived from a silyl (meth)acrylate are represented by the formula:

wherein R represents a hydrogen atom or a methyl group; and $R^a$, $R^b$ and $R^c$ may be identical with or different from each other and each represent a linear alkyl group, a branched alkyl group, a cycloalkyl group, a substituted or unsubstituted phenyl group or a trimethylsilyloxy group.

54. The antifouling coating film of claim 53 wherein at least one of the $R^a$, $R^b$ and $R^c$ of the formula (I) represents a branched alkyl group or a cycloalkyl group.

55. The antifouling coating film of aim wherein the component units derived from a polymerizable unsaturated carboxylic acid silyl ester (a) comprise:

silyl (meth)acrylate component units (a-2) of the formula:

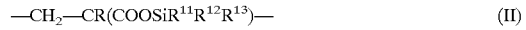

wherein R represents a hydrogen atom or a methyl group; each of $R^{11}$ and $R^{12}$ independently represents a linear alkyl group having 1 to 10 carbon atoms, a substituted or unsubstituted phenyl group, or a trimethylsilyloxy group; and $R^{13}$ represents an alkyl group having 1 to 18 carbon atoms which may have a ring structure or branch, a substituted or unsubstituted phenyl group having 6 to 10 carbon atoms, or a trimethylsilyloxy group, and silyl (meth)acrylate component units (a-3) of the formula:

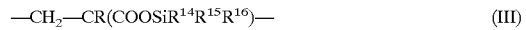

wherein R represents a hydrogen atom or a methyl group; each of $R^{14}$ and $R^{15}$ independently represents a branched alkyl or cycloalkyl group having 3 to 10 carbon atoms; and $R^{16}$ represents a linear alkyl group having 1 to 10 carbon atoms, a branched alkyl or cycloalkyl group having 3 to 10 carbon atoms, a substituted or unsubstituted phenyl group having 6 to 10 carbon atoms, or a trimethylsilyloxy group.

56. The antifouling coating film of claim 53 wherein the component units derived from a polymerizable unsaturated carboxylic acid silyl ester (a) comprise:

silyl (meth)acrylate component units (a-2) of the formula:

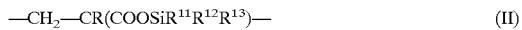

$$-CH_2-CR(COOSiR^{11}R^{12}R^{13})-\quad\quad (II)$$

wherein R represents a hydrogen atom or a methyl group; each of $R^{11}$ and $R^{12}$ independently represents a linear alkyl group having 1 to 10 carbon atoms, a substituted or unsubstituted phenyl group, or a trimethylsilyloxy group; and $R^{13}$ represents an alkyl group having 1 to 18 carbon atoms which may have a ring structure or branch, a substituted or unsubstituted phenyl group having 6 to 10 carbon atoms, or a trimethylsilyloxy group, and silyl (meth)acrylate component units (a-3) of the formula:

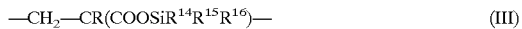

$$-CH_2-CR(COOSiR^{14}R^{15}R^{16})-\quad\quad (III)$$

wherein R represents a hydrogen atom or a methyl group; each of $R^{14}$ and $R^{15}$ independently represents a branched alkyl or cycloalkyl group having 3 to 10 carbon atoms; and $R^{16}$ represents a linear alkyl group having 1 to 10 carbon atoms, a branched alkyl or cycloalkyl group having 3 to 10 carbon atoms, a substituted or unsubstituted phenyl group having 6 to 10 carbon atoms, or a trimethylsilyloxy group.

57. The antifouling coating film of claim 54, wherein the component units derived from a polymerizable unsaturated carboxylic acid silyl ester (a) comprise:

silyl(meth)acrYlate component units (a-2) of the formula:

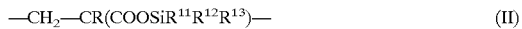

$$-CH_2-CR(COOSiR^{11}R^{12}R^{13})-\quad\quad (II)$$

wherein R represents a hydrogen atom or a methyl group; each of $R^{11}$ and $R^{12}$ independently represents a linear alkyl group having 1 to 10 carbon atoms, a substituted or unsubstituted phenyl group, or a trimethylsilyloxy group; and $R^{13}$ represents an alkyl group having 1 to 18 carbon atoms which may have a ring structure or branch, a substituted or unsubstituted phenyl group having 6 to 10 carbon atoms, or a trimethylsilyloxy group, and silyl (meth)acrylate component units (a-3) of the formula:

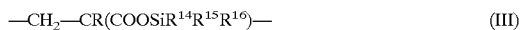

$$-CH_2-CR(COOSiR^{14}R^{15}R^{16})-\quad\quad (III)$$

wherein R represents a hydrogen atom or a methyl group; each of $R^{14}$ and $R^{15}$ independently represents a branched alkyl or cycloalkyl group having 3 to 10 carbon atoms; and $R^{16}$ represents a linear alkyl group having 1 to 10 carbon atoms, a branched alkyl or cycloalkyl group having 3 to 10 carbon atoms, a substituted or unsubstituted phenyl group having 6 to 10 carbon atoms, or a trimethylsilyloxy group.

58. The antifouling coating film of claim 52, wherein the polymerizable unsaturated monomer units (b) other than the component units (a) comprise component units (b-1) derived from an acrylic unsaturated monomer containing a polar group.

59. The antifouling coating film of claim 53 wherein the polymerizable unsaturated monomer units (b) other than the component units (a) comprise component units (b-1) derived from an acrylic unsaturated monomer containing a polar group.

60. The antifouling coating film of claim 54 wherein the polymerizable unsaturated monomer units (b) other than the component units (a) comprise component units (b-1) derived from an acrylic unsaturated monomer containing a polar group.

61. The antifouling coating film of claim 55 wherein the polymerizable unsaturated monomer units (b) other than the component units (a) comprise component units (b-1) derived from an acrylic unsaturated monomer containing a polar group.

62. The antifouling coating film of claim 56 wherein the polymerizable unsaturated monomer units (b) other than the component units (a) comprise component units (b-1) derived from an acrylic unsaturated monomer containing a polar group.

63. The antifouling coating film of claim 57 wherein the polymerizable unsaturated monomer units (b) other than the component units (a) comprise component units (b-1) derived from an acrylic unsaturated monomer containing a polar group.

64. A marine vessel, an underwater structure, a fishing gear or a fishing net, having a surface covered with the antifouling coating film of claim 52.

65. A marine vessel, an underwater structure, a fishing gear or a fishing net, having a surface covered with an antifouling coating film formed from the antifouling coating composition claimed in claim 4.

66. A method of rendering antifouling a marine vessel, an underwater structure, a fishing gear or a fishing net, which comprises applying the antifouling coating composition of claim 4 to a base surface of a marine vessel, an underwater structure, a fishing gear or a fishing net and drying the applied antifouling coating composition so that a formed antifouling coating film covers the base surface.

67. A method of rendering antifouling a marine vessel, an underwater structure, a fishing gear or a fishing net, which comprises applying the antifouling coating film of claim 52 to a base surface of a marine vessel, an underwater structure, a fishing gear or a fishing net and drying the applied antifouling coating composition so that a formed antifouling coating film covers the base surface.

* * * * *